United States Patent
Hayward

(10) Patent No.: US 10,055,985 B1
(45) Date of Patent: *Aug. 21, 2018

(54) BROADCASTING INFORMATION RELATED TO HAZARDS IMPACTING VEHICLE TRAVEL

(71) Applicant: STATE FARM MUTUAL AUTOMOBILE INSURANCE COMPANY, Bloomington, IL (US)

(72) Inventor: Gregory Hayward, Bloomington, IL (US)

(73) Assignee: STATE FARM MUTUAL AUTOMOTIVE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,107

(22) Filed: Oct. 30, 2017

Related U.S. Application Data

(63) Continuation of application No. 14/990,228, filed on Jan. 7, 2016, now Pat. No. 9,842,496.

(Continued)

(51) Int. Cl.
  *G08G 1/09*   (2006.01)
  *G07C 5/00*   (2006.01)
  *G01S 19/13*  (2010.01)

(52) U.S. Cl.
  CPC .............. *G08G 1/091* (2013.01); *G01S 19/13* (2013.01); *G07C 5/008* (2013.01)

(58) Field of Classification Search
  CPC .......... G08G 1/091; G01S 19/13; G07C 5/008
  See application file for complete search history.

(56) References Cited

U.S. PATENT DOCUMENTS 6,437,688 B1   8/2002  Kobayashi
8,935,036 B1 *  1/2015  Christensen ........... G07C 5/008
                                                      701/29.1

(Continued)

OTHER PUBLICATIONS

U.S. Appl. No. 14/798,609, Methods of Providing Insurance Savings Based Upon Telematics and Anonymous Driver Data, filed Jul. 14, 2015.

(Continued)

*Primary Examiner* — Yuen H Wong
(74) *Attorney, Agent, or Firm* — Marshall, Gerstein & Borun LLP; Randall G. Rueth

(57) ABSTRACT

A system of broadcasting information related to hazards impacting vehicle travel may include a mobile device configured to: (1) mount within a vehicle dashboard cradle so that the mobile device is positioned to take images forward of a vehicle; (2) collect telematics data, with customer permission or affirmative consent, when the vehicle is moving, including GPS location, speed, heading, lane, braking, cornering, acceleration, and/or route data of the vehicle; (3) generate an alert based upon the telematics data and the images, and/or broadcast data including the images and the telematics data; and/or (4) broadcast the alert and/or the data collected to (a) a nearby vehicle(s) and/or (b) a smart infrastructure component(s) to facilitate warning of hazards upon the nearby vehicle(s) and/or the smart infrastructure component(s) receiving and processing the alert and/or the broadcasted data. Insurance discounts may be generated based upon the risk mitigation or prevention functionality.

20 Claims, 6 Drawing Sheets

Related U.S. Application Data

(60) Provisional application No. 62/250,286, filed on Nov. 3, 2015, provisional application No. 62/247,334, filed on Oct. 28, 2015, provisional application No. 62/232,035, filed on Sep. 24, 2015, provisional application No. 62/232,045, filed on Sep. 24, 2015, provisional application No. 62/232,054, filed on Sep. 24, 2015, provisional application No. 62/232,050, filed on Sep. 24, 2015, provisional application No. 62/232,065, filed on Sep. 24, 2015, provisional application No. 62/232,097, filed on Sep. 24, 2015, provisional application No. 62/232,083, filed on Sep. 24, 2015, provisional application No. 62/232,075, filed on Sep. 24, 2015, provisional application No. 62/232,090, filed on Sep. 24, 2015, provisional application No. 62/207,561, filed on Aug. 20, 2015, provisional application No. 62/204,749, filed on Aug. 13, 2015, provisional application No. 62/113,749, filed on Feb. 9, 2015, provisional application No. 62/105,468, filed on Jan. 20, 2015.

(56) References Cited

U.S. PATENT DOCUMENTS

| | | | |
|---|---|---|---|
| 9,047,778 B1* | 6/2015 | Cazanas | G08G 1/166 |
| 9,129,449 B2 | 9/2015 | Davidson | |
| 9,679,487 B1 | 6/2017 | Hayward | |
| 9,783,159 B1 | 10/2017 | Potter et al. | |
| 9,786,154 B1 | 10/2017 | Potter et al. | |
| 2007/0054685 A1 | 3/2007 | Kellum | |
| 2007/0159354 A1 | 7/2007 | Rosenberg | |
| 2010/0015963 A1 | 1/2010 | Hesse et al. | |
| 2010/0191391 A1 | 7/2010 | Zeng | |
| 2010/0286864 A1 | 11/2010 | Kawauchi et al. | |
| 2013/0030642 A1 | 1/2013 | Bradley et al. | |
| 2013/0090139 A1 | 4/2013 | McHenry et al. | |
| 2013/0169812 A1* | 7/2013 | Lu | B60Q 1/1423 348/148 |
| 2014/0081675 A1 | 3/2014 | Ives et al. | |
| 2014/0320260 A1 | 10/2014 | Van Wiemeersch et al. | |
| 2015/0077236 A1 | 3/2015 | Le Masurier | |
| 2015/0145995 A1 | 5/2015 | Shahraray et al. | |
| 2015/0179062 A1* | 6/2015 | Ralston | G01C 21/26 701/117 |
| 2015/0262487 A1 | 9/2015 | Cazanas et al. | |
| 2016/0021178 A1 | 1/2016 | Liu et al. | |
| 2016/0232791 A1 | 8/2016 | Tosa et al. | |
| 2016/0277601 A1 | 9/2016 | Seymour | |
| 2016/0334227 A1 | 11/2016 | Davidson | |

OTHER PUBLICATIONS

U.S. Appl. No. 14/798,615, Methods of Providing Insurance Savings Based Upon Telematics and Driving Behavior Identification, filed Jul. 14, 2015.
U.S. Appl. No. 14/798,626, Methods of Providing Insurance Savings Based Upon Telematics and Usage-Based Insurance, filed Jul. 14, 2015.
U.S. Appl. No. 14/798,633, Methods of Providing Insurance Savings Based Upon Telematics and Insurance Incentives, filed Jul. 14, 2015.
U.S. Appl. No. 14/798,741, Methods of Determining Accident Cause and/or Fault Using Telematics Data, filed Jul. 14, 2015.
U.S. Appl. No. 14/798,745, Methods of Reconstructing an Accident Scene Using Telematics Data filed Jul. 14, 2015.
U.S. Appl. No. 14/798,750, Methods of Insurance Claim Buildup Detection Using Telematics Data, filed Jul. 14, 2015.
U.S. Appl. No. 14/798,757, Methods of Facilitating Emergency Assistance, filed Jul. 14, 2015.
U.S. Appl. No. 14/798,763, Methods of Intelligent Routing, filed Jul. 14, 2015.
U.S. Appl. No. 14/798,769, Methods of Theft Prevention or Mitigation, filed Jul. 14, 2015.
U.S. Appl. No. 14/798,770, Methods of Pre-Generating Insurance Claims, filed Jul. 14, 2015.
U.S. Appl. No. 14/989,946, Alert Notifications Utilizing Broadcasted Telematics Data, filed Jan. 7, 2016.
U.S. Appl. No. 14/989,946, Nonfinal Office Action, dated Dec. 9, 2016.
U.S. Appl. No. 14/989,946, Notice of Allowance, dated Mar. 17, 2017.
U.S. Appl. No. 14/989,950, Advisory Action, dated Jun. 21, 2017.
U.S. Appl. No. 14/989,950, Broadcasting Telematics Data to Nearby Mobile Computing Devices, Vehicles, and Infrastructure, filed Jan. 7, 2016.
U.S. Appl. No. 14/989,950, Final Office Action, dated Apr. 19, 2017.
U.S. Appl. No. 14/989,950, Nonfinal Office Action, dated Nov. 18, 2016.
U.S. Appl. No. 14/989,950, Notice of Allowance, dated Sep. 12, 2017.
U.S. Appl. No. 14/989,979, Advisory Action, dated Jun. 26, 2017.
U.S. Appl. No. 14/989,979, Determining Abnormal Traffic Conditions from a Broadcast of Telematics Data Originating from Another Vehicle, filed Jan. 7, 2016.
U.S. Appl. No. 14/989,979, Final Office Action, dated Apr. 24, 2017.
U.S. Appl. No. 14/989,979, Nonfinal Office Action, dated Nov. 30, 2016.
U.S. Appl. No. 14/989,979, Notice of Allowance, dated Sep. 14, 2017.
U.S. Appl. No. 14/989,990, Taking Corrective Action Based Upon Telematics Data Broadcast from Another Vehicle, filed Jan. 7, 2016.
U.S. Appl. No. 14/990,056, Advisory Action, dated Jul. 6, 2017.
U.S. Appl. No. 14/990,056, Analyzing Telematics Data to Determine Travel Events and Corrective Actions, filed Jan. 7, 2016.
U.S. Appl. No. 14/990,056, Final Office Action, dated Apr. 21, 2017.
U.S. Appl. No. 14/990,056, Nonfinal Office Action, dated Dec. 1, 2016.
U.S. Appl. No. 14/990,056, Notice of Allowance, dated Sep. 13, 2017.
U.S. Appl. No. 14/990,073, Providing Insurance Discounts Based Upon Usage of Telematics Data-Based Risk Mitigation and Prevention Functionality, filed Jan. 7, 2016.
U.S. Appl. No. 14/990,116, Notice of Allowance, dated Sep. 13, 2017.
U.S. Appl. No. 14/990,116, Advisory Action, dated Jun. 28, 2017.
U.S. Appl. No. 14/990,116, Determining Corrective Actions Based Upon Broadcast of Telematics Data Originating From Another Vehicle, filed Jan. 7, 2016.
U.S. Appl. No. 14/990,116, Final Office Action, dated Apr. 19, 2017.
U.S. Appl. No. 14/990,116, Nonfinal Office Action, dated Nov. 25, 2016.
U.S. Appl. No. 14/990,121, Advisory Action, dated Jul. 17, 2017.
U.S. Appl. No. 14/990,121, Facilitating Safer Vehicle Travel Utilizing Telematics Data, filed Jan. 7, 2016.
U.S. Appl. No. 14/990,121, Final Office Action, dated Apr. 19, 2017.
U.S. Appl. No. 14/990,121, Nonfinal Office Action, dated Dec. 15, 2016.
U.S. Appl. No. 14/990,121, Notice of Allowance, dated Oct. 10, 2017.
U.S. Appl. No. 14/990,139, Final Office Action, dated Apr. 19, 2017.
U.S. Appl. No. 14/990,139, Nonfinal Office Action, dated Nov. 18, 2016.
U.S. Appl. No. 14/990,139, Notice of Allowance, dated Aug. 14, 2017.
U.S. Appl. No. 14/990,139, Using Train Telematics Data to Reduce Accident Risk, filed Jan. 7, 2016.
U.S. Appl. No. 14/990,165, Final Office Action, dated Apr. 19, 2017.
U.S. Appl. No. 14/990,165, Nonfinal Office Action, dated Nov. 23, 2016.
U.S. Appl. No. 14/990,165, Notice of Allowance, dated Aug. 10, 2017.

(56) References Cited

OTHER PUBLICATIONS

U.S. Appl. No. 14/990,165, Using Train Telematics Data to Provide Information in One or More Vehicles to Reduce Accident Risk, filed Jan. 7, 2016.
U.S. Appl. No. 14/990,209, Corrected Notice of Allowability, dated Aug. 28, 2017.
U.S. Appl. No. 14/990,209, Final Office Action, dated Apr. 20, 2017.
U.S. Appl. No. 14/990,209, Nonfinal Office Action, dated Nov. 18, 2016.
U.S. Appl. No. 14/990,209, Notice of Allowance, dated Aug. 16, 2017.
U.S. Appl. No. 14/990,209, Using Emergency Response System (EMS) Vehicle Telematics Data to Reduce Accident Risk, filed Jan. 7, 2016.
U.S. Appl. No. 14/990,228, Broadcasting Information Related to Hazards Impacting Vehicle Travel, filed Jan. 7, 2016.
U.S. Appl. No. 14/990,228, Final Office Action, dated Apr. 20, 2017.
U.S. Appl. No. 14/990,228, Nonfinal Office Action, dated Dec. 15, 2016.
U.S. Appl. No. 14/990,228, Notice of Allowance, dated Aug. 31, 2017.
U.S. Appl. No. 15/484,791, Alert Notifications Utilizing Broadcasted Telematics Data, filed Apr. 11, 2017.
U.S. Appl. No. 15/484,791, Nonfinal Office Action, dated Oct. 18, 2017.
U.S. Appl. No. 15/787,293, Broadcasting Telematics Data to Nearby Mobile Computing Devices, Vehicles, and Infrastructure, filed Oct. 18, 2017.
U.S. Appl. No. 15/787,305, Determining Abnormal Traffic Conditions From a Broadcast of Telematics Data Originating From Another Vehicle, filed Oct. 18, 2017.
U.S. Appl. No. 15/787,311, Analyzing Telematics Data to Determine Travel Events and Corrective Actions, filed Oct. 18, 2017.
U.S. Appl. No. 15/787,317, Determining Corrective Actions Based Upon Broadcast of Telematics Data Originating From Another Vehicle, filed Oct. 18, 2017.
U.S. Appl. No. 15/798,019, Using Train Telematics Data to Reduce Accident Risk, filed Oct. 30, 2017.
U.S. Appl. No. 15/798,062, Using Train Telematics Data to Provide Information in One or More Vehicles to Reduce Accident Risk, filed Oct. 30, 2017.
U.S. Appl. No. 15/798,093, Using Emergency Response System (EMS) Vehicle Telematics Data to Reduce Accident Risk, filed Oct. 30, 2017.

* cited by examiner

BROADCASTING INFORMATION RELATED TO HAZARDS IMPACTING VEHICLE TRAVEL

CROSS REFERENCE TO RELATED APPLICATIONS

This application is a continuation of U.S. patent application Ser. No. 14/990,228, which is entitled "Broadcasting Information Related To Hazards Impacting Vehicle Travel," which was filed Jan. 7, 2016, and which claims the benefit of (1) U.S. Provisional Patent Application No. 62/105,468, entitled "Broadcasting Telematics Data To Nearby Mobile computing devices, Vehicles, And Infrastructure," filed Jan. 20, 2015, (2) U.S. Provisional Patent Application No. 62/113,749, entitled "Broadcasting Telematics Data To Nearby Mobile computing devices, Vehicles, And Infrastructure," filed Feb. 9, 2015, (3) U.S. Provisional Patent Application No. 62/204,749, entitled "Broadcasting Telematics Data To Nearby Mobile computing devices, Vehicles, And Infrastructure," filed Aug. 13, 2015, (4) U.S. Provisional Patent Application No. 62/207,561, entitled "Generating Alert Notifications By Broadcasting Telematics Data To Nearby Mobile computing devices, Vehicles, And Infrastructure," filed Aug. 20, 2015, (5) U.S. Provisional Patent Application No. 62/232,035 entitled "Generating Alert Notifications By Broadcasting Telematics Data To Nearby Mobile computing devices, Vehicles, And Infrastructure," filed Sep. 24, 2015, (6) U.S. Provisional Patent Application No. 62/232,045, entitled "Generating Alert Notifications By Broadcasting Telematics Data To Nearby Mobile computing devices, Vehicles, And Infrastructure," filed Sep. 24, 2015, (7) U.S. Provisional Patent Application No. 62/232,050, entitled "Determining Abnormal Traffic Conditions From A Broadcast Of Telematics Data Originating From Another Vehicle," filed Sep. 24, 2015, (8) U.S. Provisional Patent Application No. 62/232,054, entitled "Taking Corrective Action Based Upon Telematics Data Broadcast From Another Vehicle," filed Sep. 24, 2015, (9) U.S. Provisional Patent Application No. 62/232,065, entitled "Analyzing Telematics Broadcast To Determine Travel Events And Corrective Actions," filed Sep. 24, 2015, (10) U.S. Provisional Patent Application No. 62/232,075, entitled "Providing Insurance Discounts Based Upon Usage Of Telematics Data-Based Risk Mitigation And Prevention Functionality," filed Sep. 24, 2015, (11) U.S. Provisional Patent Application No. 62/232,083, entitled "Determining Corrective Actions Based Upon Broadcast Of Telematics Data Originating From Another Vehicle," filed Sep. 24, 2015, (12) U.S. Provisional Patent Application No. 62/232,090, entitled "Determining Corrective Actions Based Upon Telematics Data Broadcast From Another Vehicle," filed Sep. 24, 2015, (13) U.S. Provisional Patent Application No. 62/232,097, entitled "Generating Alert Notifications By Broadcasting Train Telematics Data To Nearby Mobile computing devices, Vehicles, And Infrastructure," filed Sep. 24, 2015, (14) U.S. Provisional Patent Application No. 62/247,334, entitled "Generating Alert Notifications By Broadcasting Train Telematics Data To Nearby Mobile computing devices, Vehicles, And Infrastructure," filed Oct. 28, 2015, and (15) U.S. Provisional Patent Application No. 62/250,286, entitled "Generating Alert Notifications By Broadcasting Train Telematics Data To Nearby Mobile computing devices, Vehicles, And Infrastructure," filed Nov. 3, 2015. The disclosure of each of the aforementioned applications is hereby expressly incorporated by reference herein in its entirety.

FIELD OF THE DISCLOSURE

The present disclosure generally relates to vehicle travel and, more particularly, to using data related to vehicle travel to facilitate safer vehicle travel.

BACKGROUND

Conventional telematics devices may collect certain types of data that relate to operation of a vehicle. However, conventional telematics devices and data gathering techniques may have several drawbacks.

BRIEF SUMMARY

In one aspect, telematics data, geographic location data, and/or image, audio, and/or video data may be collected, monitored, measured, and/or generated by one or more computing devices associated with a vehicle. The telematics data may include various metrics that indicate the direction, speed, and/or motion of the vehicle with which the data is associated. The geographic location data may include a geographic location of the vehicle, such as latitude and longitude coordinates, for example. The image, audio, and/or video data may include data collected by the one or more computing devices when the one or more computing devices are positioned to take images and/or collect audio and/or video data forward of and/or in a vicinity of the vehicle. For instance, the one or more computing devices may be mounted in a vehicle dashboard cradle(s). In various aspects, the one or more computing devices may collect such image, audio, and/or video data associated with an interior and/or an exterior of the vehicle.

The one or more computing devices may include a mobile computing device positioned within the vehicle, a smart vehicle control system or components thereof, an on-board computer integrated within the vehicle, and/or a combination of these devices working in conjunction with one another. The one or more computing devices may broadcast the telematics data, the geographic location data, and/or the image, audio, and/or video data to one or more other devices, such as one or more other computing devices, nearby vehicles, and/or infrastructure components (e.g., "smart" infrastructure, as further discussed below), etc. Additionally or alternatively, the one or more computing devices may generate an alert when a hazard is detected from analysis of the telematics data, the geographic location data, and/or the image, audio, and/or video data, as further discussed below. In some aspects, the one or more computing devices may additionally or alternatively broadcast the alert to one or more other computing devices, nearby vehicles, and/or infrastructure components, etc.

The telematics data, the geographic location data, and/or the image, audio, and/or video data may be received and/or processed by one or more other computing devices to determine whether an anomalous condition exists, such as a traffic accident, for example. These one or more other computing devices may be external computing devices (e.g., a remote server), another mobile computing device(s) (e.g., associated with a nearby vehicle(s)), a smart vehicle control system(s) or components thereof (e.g., associated with a nearby vehicle(s)), an infrastructure component (e.g., a traffic light, which may be a "smart" traffic light as further discussed below), etc. If an anomalous condition is detected, the geographic location of the vehicle associated with the telematics data may be used as a condition to decide whether to generate an alert at (or send an alert notification to) the one or more other computing devices. Additionally or alternatively, the alert may be broadcast as discussed above, and may be received and/or processed by the one or more other computing devices to facilitate warning other drivers and/or smart vehicles of the anomalous condition.

In one aspect, a system of broadcasting information related to hazards impacting vehicle travel may be provided. A system may include: a mobile computing device configured to: (1) mount within a vehicle dashboard cradle so that the mobile computing device is positioned to take images forward of a vehicle; (2) collect telematics data of the vehicle when the vehicle is moving, the telematics data including at least one of Global Positioning System (GPS) location, speed, heading, lane, braking, cornering, acceleration, or route data of the vehicle; (3) generate at least one of (i) an alert based upon the telematics data and the images, or (ii) broadcasting data including the images and the telematics data; and/or (4) broadcast the at least one of the alert or the broadcasting data to at least one of (i) at least one nearby vehicle or (ii) at least one smart infrastructure component via wireless communication or data transmission to facilitate warning at least one of drivers or smart vehicles of at least one of hazardous conditions or vehicle accidents upon the at least one of the at least one nearby vehicle or the at least one smart infrastructure component receiving and processing the at least one of the alert or the broadcasting data. The system may include additional or alternate components, including those discussed elsewhere herein. The mobile computing device may be configured to perform additional, fewer, or alternate actions, including those discussed elsewhere herein.

In another aspect, a mobile computing device for facilitating safer vehicle travel may be provided. A mobile computing device may include: (a) a controller configured to: (1) determine whether the mobile computing device is mounted in a vehicle; (2) collect, when it is determined that the mobile computing device is mounted in the vehicle, telematics data associated with the vehicle, and digital data including at least one of digital image, digital audio, or digital video data associated with at least one of an interior or exterior of the vehicle; (3) analyze the telematics data and digital data collected to determine whether a hazard is associated with a road on which the vehicle is being driven; and/or (4) generate an alert when the hazard is detected from the analysis of the telematics data and the digital data; and/or (b) a display configured to issue the alert to notify a driver of the vehicle of the hazard when the hazard is detected to facilitate safer vehicle travel and vehicle collision avoidance. The mobile computing device may include additional, fewer, or alternate components, including those discussed elsewhere herein. The controller may be configured to perform additional, fewer, or alternate actions, including those discussed elsewhere herein. The display may be configured to perform additional, fewer, or alternate actions, including those discussed elsewhere herein.

In yet another aspect, a computer-implemented method of broadcasting information related to hazards impacting vehicle travel may be provided. A method may include: (1) collecting images forward of a vehicle, via at least one of a mobile device camera or one or more mobile device processors of a mobile device that is mounted within a vehicle dashboard cradle and positioned to take the images forward of the vehicle; (2) collecting, via at least one of the one or more mobile device processors or a telematics app, telematics data, including at least one of Global Positioning System (GPS) location, speed, heading, lane, braking, cornering, acceleration, or route data of the vehicle while the vehicle is moving; (3) generating, via the one or more mobile device processors, at least one of (i) an alert based upon the images forward of the vehicle and the telematics data or (ii) a broadcast including the images forward of the vehicle and the telematics data; and/or (4) broadcasting, via at least one of the one or more mobile device processors, a communication unit, or a transceiver, the at least one of the alert or the broadcast via wireless communication or data transmission to at least one of (i) at least one nearby vehicle or (ii) at least one smart infrastructure component to facilitate alerting at least one of other vehicles or drivers of at least one of hazardous conditions or vehicle accidents. The method may include additional, fewer, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
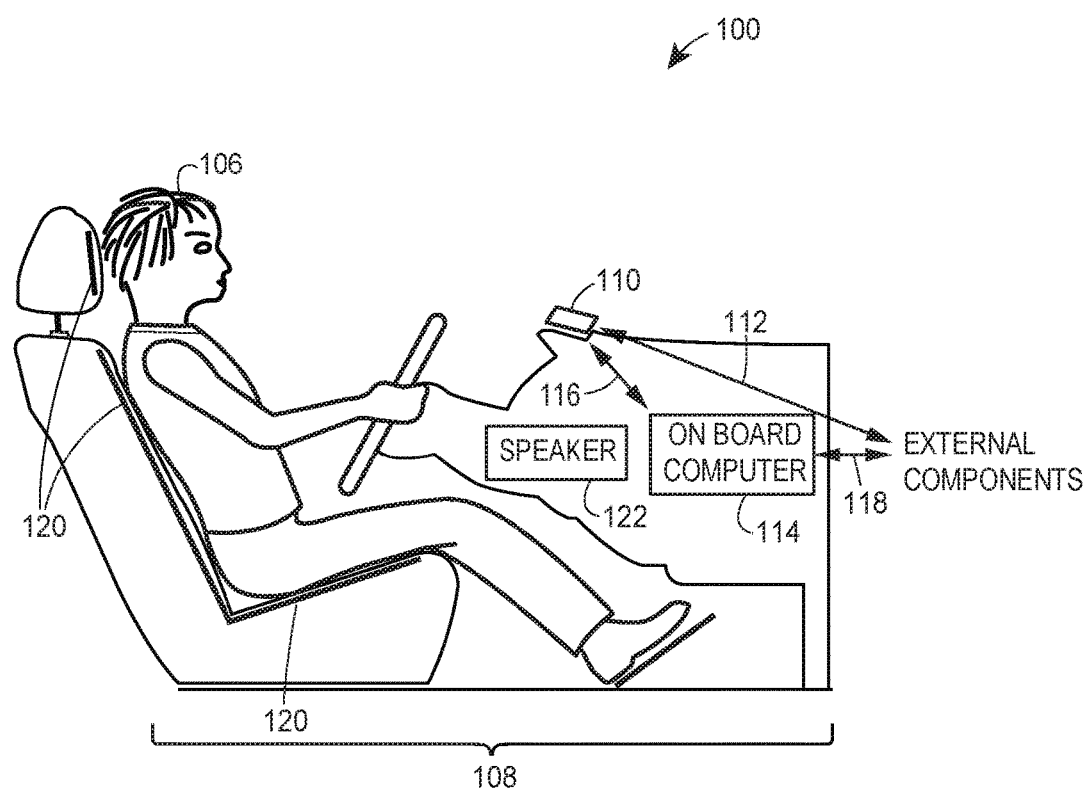
FIG. 1 illustrates a block diagram of an exemplary telematics collection system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining whether an anomalous condition (e.g., a hazard such as a vehicle accident, a pedestrian, an animal, etc.) is detected at a location associated with a vehicle (e.g., whether the anomalous condition is associated with a road on which the vehicle is being driven) using one or more computing devices within or otherwise associated with the vehicle. If the detected anomalous condition may impact or affect another vehicle on the road, embodiments are described to generate and/or send alert notifications to other vehicles that may be so affected. In some aspects, the vehicle and/or the other vehicles may be an autonomous vehicle(s). As further described throughout the disclosure, the process of detecting anomalous conditions and whether they apply to other vehicles may be performed through an analysis of geographic location data, telematics data, and/or image, audio, and/or video data broadcasted from one or more computing devices within or otherwise associated with one or more respective vehicles.

The present embodiments may relate to collecting, transmitting, and/or receiving telematics data; and may include a mobile device, a vehicle-mounted processor, computer server, web pages, applications, software modules, user interfaces, interactive display screens, memory units, and/or other electronic, electrical, and/or wireless communication equipment configured to provide the functionality discussed herein. As compared with the prior art, the present embodiments include specifically configured computing equipment that provide for an enhanced method of collecting telematics and/or other vehicle/driving conditions related data, and performing certain actions based upon the data collected. Using the telematics and/or other data collected, in conjunction with the novel techniques discussed herein, recommendations and/or travel/driving guidance may be provided to remote vehicles and/or drivers.

The present embodiments may solve one or more technical problems related to (1) vehicle safety, and/or (2) vehicle navigation by using solutions or improvements in another technological field, namely telematics. Vehicle safety and vehicle navigation is often impacted by short-term traffic events that occur with little or no warning. For instance, vehicle accidents may be caused by road construction, other vehicle accidents, traffic being temporarily re-routed, unexpected bad weather, other drivers or vehicles, a pedestrian on or near a road, an animal on or near a road, etc.

To address these and other problems, telematics data (and/or driver behavior or vehicle information) may be captured in real-time, or near real-time, by a mobile device of a vehicle driver (or passenger) and/or a smart vehicle control system, for example. The mobile device and/or other device(s) as described herein may be specifically configured for gathering, collecting, and/or generating telematics and/or other data as a vehicle is traveling.

For instance, the mobile device may be equipped with (i) various sensors, meters, and/or other suitable devices capable of generating telematics data (Global Positioning System (GPS) unit, speed sensor, speedometer, odometer, gyroscope, compass, accelerometer, camera, microphone, etc.) and/or (ii) an application, such as a Telematics Data Application or Telematics "App," that includes computer instructions and/or software modules stored in a non-transitory memory unit that control collecting and generating telematics and/or other data. The mobile device and/or the application (or Telematics App) may provide a software module, user interface, and/or interactive display screen configured to facilitate the data collection. The mobile device and/or Telematics App executing thereon may be configured to prepare or otherwise format the telematics and/or other data collected or generated for transmission (via wireless communication and/or data transmission) to a mobile device of a second driver, a remote server, another (smart) vehicle, and/or smart infrastructure—all of which may be equipped with its own Telematics App or other telematics related applications. The Telematics App may include other functionality, including the mobile device functionality discussed elsewhere herein.

Alternatively, the mobile device may remotely access a web page, such as via wireless communication with a remote server. The web page may provide the mobile device with the functionality to collect the telematics and/or other data as the vehicle is moving. Additionally or alternatively, the web page may allow the mobile device to upload or transmit data in real-time, or near real-time, to a mobile device of a second driver, a remote server, smart infrastructure, and/or another (e.g., smart) vehicle.

Additionally or alternatively, a smart vehicle controller or processor may be configured with the same functionality as that of the mobile device described above. For instance, a smart vehicle controller may include an application, software module, or computer instructions that provide for the telematics and/or other data collection and generation functionality discussed herein. The smart vehicle controller may be in wired or wireless communication with various ("smart" or "dumb") vehicle-mounted meters, sensors, and/or detectors, such as speedometers, speed sensors, compasses, gyros, accelerometers, cameras, microphones, etc. that collect and/or generate telematics data and/or other data detailing or associated with vehicle operation, and/or driving or driver behavior.

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/vehicle data in real-time as the vehicle is traveling, such as via a Telematics App running on the mobile device. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers; a pedestrian; an animal, etc.), the telematics data (and/or other data) collected may indicate such.

The mobile device itself (and/or Telematics App) may be configured to identify the type of traffic event and transmit the type of traffic event to other mobile devices, a remote server, smart vehicles, and/or smart infrastructure. In one embodiment, the mobile device (and/or Telematics App) may be in wireless communication with a smart vehicle control system of the vehicle, and the smart vehicle control system may transmit the telematics and/or other data, and/or any associated warnings, to a remote server, and/or roadside smart infrastructure or nearby mobile devices or vehicles of other drivers (such as to conserve battery power of the mobile device).

Alternatively, the mobile device (and/or Telematics App) may transmit the telematics and/or other data collected via wireless communication and/or data transmission to a second computing device—such as a second mobile device (of another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

In one embodiment, a telematics application or software module (e.g., the Telematics App as discussed herein) may be designed to communicate with smart vehicles and smart infrastructure. An advantage of this is that for a vehicle owner that does not have a "smart" vehicle with wireless communication technology, the application and/or software module deployed on a smart phone or other mobile device may communicate with smart vehicles and infrastructure (and/or remote servers and other mobile devices). The telematics application and/or software module may be programmed to provide voice alerts: such as on a two lane road "do not pass-a vehicle is approaching" or "high speed vehicle is approaching to your left (or right);" "traffic light will turn in 10 seconds;" "turn left to find an open parking space;" "traffic is stopped 1.5 miles ahead;" "traffic has slowed to 20 mph 1.5 miles (or 2 blocks) ahead;" "recommended speed for turn ahead is 30 mph;" "ice on bridge (or ramp) ahead;" "vehicle accident 1 mile ahead, turn off road;" "pedestrian 1 block ahead, stop now;" "animal ahead, slow down (or stop) now," etc.

As an example, a first mobile device may be traveling in a vehicle. The first mobile device may collect telematics data and/or other data, such as via a telematics application running on one or more processors mounted within the first mobile device and/or via suitable functionality (which may be included within the telematics application, in some aspects) for collecting image, audio, and/or video data via, for example, a camera(s) and/or a microphone(s). The first mobile device (and/or the telematics application) may detect a travel event (e.g., hazard) from the data collected. For instance, the first mobile device (and/or the telematics application executing thereon) may determine that the vehicle is driving on a road which has a vehicle accident ahead of the current location of the vehicle, that a pedestrian or animal is ahead of the vehicle, etc. The first mobile device (and/or the telematics application) may then transmit the data collected and/or an associated message via wireless communication or data transmission to smart roadside infrastructure and/or nearby vehicles (or a second mobile device traveling within a nearby and second vehicle).

The second mobile device (and/or a telematics application running thereon) may then, using the data received and/or message received from the first mobile device, generate an audible or visual warning or alert of the travel event, such as "Warning, congestion ahead," "Warning, vehicle accident ahead," "Warning, pedestrian on road 1 block ahead," "Warning, animal on road 0.1 miles ahead," and/or "Recommend taking Exit 10 and traveling on Highway 12 for 5 miles until Exit 11 to avoid the congestion ahead." The second mobile device (and/or associated telematics application) may also be able to compare locations of the travel event with the current location of the second vehicle to determine if the travel event poses a potential obstacle to the second vehicle reaching its destination without interruption. Thus, the telematics data collected using a first mobile device (and/or a telematics application) and associated with a first driver may be used to alert a second driver (associated with the second mobile device) of a travel event and/or re-route the second vehicle to facilitate safer vehicle travel for the second driver and vehicle.

In one aspect, a mobile device (and/or the telematics application) may compare a vehicle's traveling speed with a known posted speed limit. If the vehicle's speed is below or above the posted speed by a certain threshold, for example, 10 or 20 miles-per-hour, then the mobile device may generate a warning and transmit the warning to roadside infrastructure and/or nearby mobile devices or vehicles. For example, the message may state "Slow moving vehicle in right hand lane ahead;" "High speed vehicle approaching from rear;" And/or "High speed vehicle approaching from ahead."

Other messages or alerts that may be generated from mobile devices (and/or telematics applications executing thereon), smart vehicle controllers, remote servers, and/or smart infrastructure and transmitted to a mobile device of a driver (and/or smart vehicle) may include "Construction 1 mile ahead;" "Rain (or Snow) 5 miles ahead;" "Detour 2 blocks ahead;" "Traffic light directly ahead will change from Green to Red starting in 5 seconds;" "Stranded vehicle on right side of road half a mile ahead;" "Recommend turning right at next intersection to avoid travel event 3 blocks ahead;" "Animal 2 blocks ahead;" "Pedestrian 1 block ahead;" and/or other travel or traffic event-related messages.

An insurance provider may collect data indicative of an insured's having of and/or usage of the vehicle safety functionality provided herein (e.g., functionality associated with analyzing mobile computing device image data and vehicle telematics data to generate alerts to facilitate warning at least one of drivers or smart vehicles of at least one of hazardous conditions or vehicle accidents, as further discussed below). For instance, such data may be collected at an insurance provider remote server and/or via a mobile device application. Based upon an individual's usage and/or taking travel recommendations, such as travel recommendations that reduce or lower risk and/or enhance driver or vehicle safety, insurance policies (such as vehicle or life insurance policies) may be adjusted, generated, and/or updated. The insurance provider remote server may calculate, update, and/or adjust insurance premiums, rates, discounts, points, programs, etc., such as adjusting an insurance discount or premium based upon the insured having the functionality discussed herein and/or the amount that the insured uses the functionality discussed herein. The updated insurance policies (and/or premiums, rates, discounts, etc.) may be communicated to insurance customers for their review, modification, and/or approval—such as via wireless communication or data transmission from a remote server to a mobile device of the insured (e.g., for display on a mobile device of the insured).

Telematics and Vehicle Navigation

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/ vehicle data in real-time as the vehicle is traveling. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers; a pedestrian; an animal, etc.), the telematics data (and/or other data) collected may indicate such.

The mobile device itself may be configured to identify the type of traffic event and transmit the type of traffic event to other mobile devices, a remote server, smart vehicles, and/or smart infrastructure. In one embodiment, the mobile device may be in wireless communication with a smart vehicle control system of the vehicle, and the smart vehicle control system may transmit the telematics and/or other data, and/or any associated warnings, to a remote server, and/or roadside smart infrastructure or nearby mobile devices or vehicles of other drivers (such as to conserve battery power of the mobile device).

Additionally or alternatively, the mobile device may transmit the telematics and/or other data collected via wireless communication and/or data transmission to a second computing device—such as a second mobile device (of another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

Exemplary Telematics Collection System

FIG. 1 illustrates a block diagram of an exemplary telematics collection system 100 in accordance with an exemplary aspect of the present disclosure. In some aspects, telematics collection system 100 may include hardware and software applications configured to measure, calculate, generate, and/or collect geographic location data and/or telematics data indicative of the speed, direction, and/or motion of vehicle 108. Additionally or alternatively, telematics collection system 100 may include hardware and software applications configured to receive and process geographic location data and/or telematics data sent from another telematics collection system, to determine whether an anomalous condition has been detected, whether to generate an alert, and/or whether to send an alert notification. Telematics collection system 100 may include various data communication channels for facilitating data communications between the various hardware and software components and/or communications with one or more external components.

To accomplish this, telematics collection system 100 may include any suitable number of computing devices, such as mobile computing device 110 and/or on-board computing device 114, for example. These computing devices may be disposed within vehicle 108, permanently installed in vehicle 108, or removably installed in vehicle 108.

In the present aspects, mobile computing device 110 may be implemented as any suitable computing or mobile device, such as a mobile device (e.g., smartphone, tablet, laptop, wearable electronics, phablet, pager, personal digital assistant (PDA), smart glasses, smart watch or bracelet, etc.), while on-board computer 114 may be implemented as a general-use on-board computer or processor(s) installed by the manufacturer of vehicle 108 or as an aftermarket modification to vehicle 108, for example. In various aspects, mobile computing device 110 and/or on-board computer 114 may be a thin-client device configured to outsource any suitable portion of processing via communications with one or more external components.

On-board computer 114 may supplement one or more functions performed by mobile computing device 110 described herein by, for example, sending information to and/or receiving information from mobile computing device 110. Mobile computing device 110 and/or on-board computer 114 may communicate with one or more external components via links 112 and 118, respectively. Additionally, mobile computing device 110 and on-board computer 114 may communicate with one another directly via link 116.

In one aspect, mobile computing device 110 may be configured with suitable hardware and/or software (e.g., one or more applications, programs, files, etc.) to determine a geographic location of mobile computing device 110 and, hence, vehicle 108, in which it is positioned. Additionally or alternatively, mobile computing device 110 may be configured with suitable hardware and/or software to monitor, measure, generate, and/or collect one or more sensor metrics as part of the telematics data. Mobile computing device 110 may be configured to broadcast the geographic location data and/or the one or more sensor metrics, and/or other data as described herein, to one or more external components.

In some aspects, the external components may include another mobile computing device substantially similar to or identical to mobile computing device 110. In accordance with such aspects, mobile computing device 110 may additionally or alternatively be configured to receive geographic location data, sensor metrics, and/or other data broadcasted from another mobile computing device, the details of which are further discussed below. Mobile computing device 110 may be configured to determine, upon receiving the geographic location data, sensor metrics, and/or other data, whether an anomalous condition (e.g., a hazard, as discussed more fully herein) exists at the geographic location indicated by the geographic location data. If so, mobile computing device 110 may be configured to generate one or more audio and/or video alerts indicative of the determined anomalous condition.

On-board computer 114 may be configured to perform one or more functions otherwise performed by mobile computing device 110. However, on-board computer 114 may additionally be configured to obtain geographic location data, telematics data, and/or image, audio, and/or video data, for example, by communicating with one or more vehicle sensors and/or other suitable devices (e.g., camera, microphone, etc.) that are integrated into vehicle 108. For example, on-board computer 114 may obtain geographic location data via communication with a vehicle-integrated global navigation satellite system (GNSS). To provide additional examples, on-board computer 114 may obtain one or more metrics related to the speed, direction, motion, and/or surroundings of vehicle 108 via any number of suitable sensors and/or other devices, such as speedometer sensors, braking sensors, airbag deployment sensors, crash detection sensors, cameras, microphones, etc.

In one aspect, mobile computing device 110 and/or on-board computer 114 may operate independently of one another to generate geographic location data, telematics data, and/or image, audio, and/or video data; to receive geographic location data, telematics data, and/or image, audio, and/or video data broadcasted from another telematics collection system; to determine whether to generate one or more alerts; and/or to generate one or more alert notifications. In accordance with such aspects, telematics collection system 100 may include mobile computing device 110 but not on-board computer 114, and vice-versa.

In other aspects, mobile computing device 110 and/or on-board computer 114 may operate in conjunction with one another to generate geographic location data, telematics data, and/or image, audio, and/or video data; to receive geographic location data, telematics data, and/or image, audio, and/or video data broadcasted from another telematics collection system; to determine whether to generate one or more alerts; and/or to generate one or more alert notifications. In accordance with such aspects, telematics collection system 100 may include both mobile computing device 110 and on-board computer 114. Mobile computing device 110 and on-board computer 114 may share any suitable portion of processing between one another to facilitate the functionality described herein.

Upon receiving notification alerts from another telematics collection system, aspects include telematics collection system 100 generating alerts via any suitable audio, video, and/or tactile techniques. For example, alerts may be generated via a display implemented by mobile computing device 110 and/or on-board computer 114. To provide another example, a tactile alert system 120 (e.g., a seat that can vibrate) may be configured to generate tactile alerts to a vehicle operator 106 when commanded by mobile computing device 110 and/or on-board computer 114. To provide another example, audible alerts may be generated via a speaker 122, which may be part of vehicle 108's integrated speaker system, for example.

Although telematics collection system 100 is shown in FIG. 1 as including one mobile computing device 110 and one on-board computer 114, various aspects include telematics collection system 100 implementing any suitable number of mobile computing devices 110 and/or on-board computers 114.

Exemplary Telematics Alert Notification System

Figure 2:
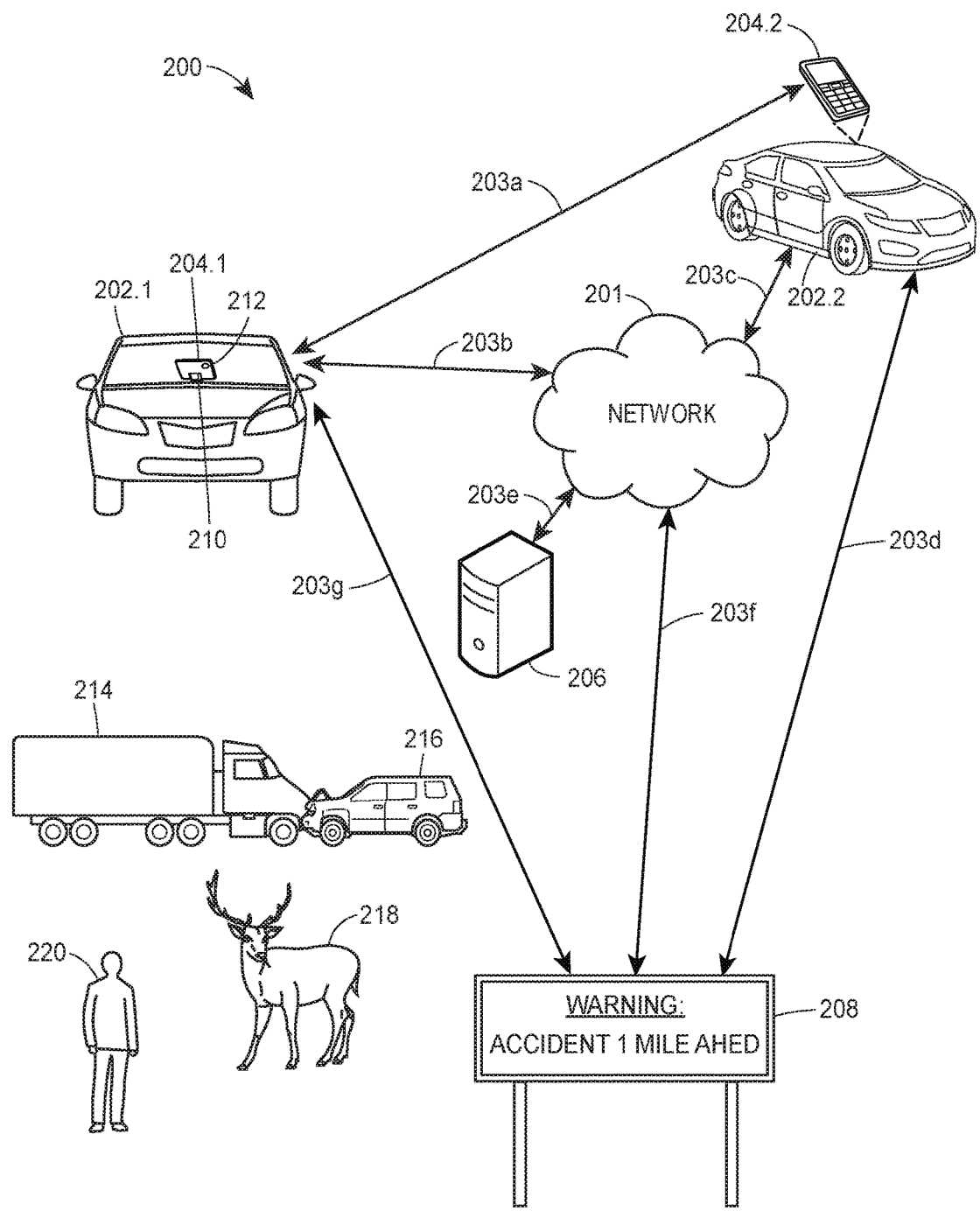
FIG. 2 illustrates a block diagram of an exemplary alert notification system 200 in accordance with an exemplary aspect of the present disclosure.

FIG. 2 illustrates a block diagram of an exemplary alert notification system 200 in accordance with an exemplary aspect of the present disclosure. In one aspect, alert notification system 200 may include a network 201, N number of vehicles 202.1-202.N and respective mobile computing devices 204.1-204.N, an external computing device 206, an infrastructure component 208, a vehicle dashboard cradle 210 (shown, by way of example, in vehicle 202.1), a camera 212 of mobile computing device 204.1 within vehicle 202.1, a truck 214 and a collided vehicle 216 that have been in a vehicle accident, an animal 218, and/or a pedestrian 220. In one aspect, mobile computing devices 204 may be an implementation of mobile computing device 110, as shown in FIG. 1, while vehicles 202 may be an implementation of vehicle 108, also shown in FIG. 1. Each of vehicles 202.1 and 202.2 may have an associated on-board computer, which is not shown in FIG. 2 for purposes of brevity, but may be an implementation of on-board computer 114, as shown in FIG. 1. Each of vehicles 202.1 and 202.2 may be configured for wireless inter-vehicle communication and/or communication with one or more of mobile computing devices 204.1-204.N, external computing device 206, and/or infrastructure component 208. Aspects include each of vehicles 202.1 and 202.2 being configured to perform communications in any suitable manner, such as via vehicle-to-vehicle (V2V) wireless communication and/or other suitable data transmission.

Although alert notification system 200 is shown in FIG. 2 as including one network 201, two mobile computing devices 204.1 and 204.2, two vehicles 202.1 and 202.2, one external computing device 206, one infrastructure component 208, one vehicle dashboard cradle 210, one camera 212, one truck 214, one collided vehicle 216, one animal 218, and/or one pedestrian 220, various aspects include alert notification system 200 implementing any suitable number of networks 201, mobile computing devices 204, vehicles 202, external computing devices 206, infrastructure components 208, vehicle dashboard cradles 210, cameras 212, trucks 214, collided vehicles 216, animals 218, and/or pedestrians 220. For example, alert notification system 200 may include a plurality of external computing devices 206 and more than two mobile computing devices 204, any suitable number of which being interconnected directly to one another and/or via network 201.

In one aspect, each of mobile computing devices 204.1 and 204.2 may be configured to communicate with one another and/or any suitable device directly via peer-to-peer (P2P) wireless communication and/or data transfer. In other aspects, each of mobile computing devices 204.1 and 204.2 may be configured to communicate indirectly with one another and/or any suitable device via communications over network 201, such as external computing device 206 and/or infrastructure component 208, for example. In still other aspects, each of mobile computing devices 204.1 and 204.2 may be configured to communicate directly and indirectly with one another and/or any suitable device, which may be via concurrent communications or communications occurring at separate times.

Each of mobile computing devices 204.1 and 204.2 may be configured to send data to and/or receive data from one another and/or via network 201 using one or more suitable communication protocols, which may be the same communication protocols or different communication protocols as one another. To provide an example, mobile computing devices 204.1 and 204.2 may be configured to communicate with one another via a direct radio link 203a, which may utilize, for example, a Wi-Fi direct protocol, an ad-hoc cellular communication protocol, etc. Furthermore, mobile computing devices 204.1 and 204.2 may be configured to communicate with the vehicle on-board computers located in vehicles 202.1 and 202.2, respectively, utilizing a BLUETOOTH communication protocol (radio link not shown).

To provide additional examples, mobile computing devices 204.1 and 204.2 may be configured to communicate with one another via radio links 203b and 203c by each communicating with network 201 utilizing a cellular communication protocol. As an additional example, mobile computing devices 204.1 and/or 204.2 may be configured to communicate with external computing device 206 via radio links 203b, 203c, and/or 203e. Still further, one or more of mobile computing devices 204.1 and/or 204.2 may also be configured to communicate with one or more smart infrastructure components 208 directly (e.g., via radio link 203d and/or radio link 203g) and/or indirectly (e.g., via radio links 203c and 203f via network 201) using any suitable communication protocols.

Mobile computing devices 204.1 and 204.2 may be configured to execute one or more algorithms, programs, applications, etc.; to determine a geographic location of each respective mobile computing device (and thus their associated vehicle); to generate, measure, monitor, and/or collect one or more sensor metrics as telematics data; to collect image, audio, and/or video data associated with an interior and/or an exterior of their associated vehicle; to broadcast the geographic data, the telematics data, and/or the image, audio, and/or video data via their respective radio links; to receive the geographic data, the telematics data, and/or the image, audio, and/or video data via their respective radio links; to determine whether an alert should be generated based upon the telematics data, the geographic location data, and/or the image, audio, and/or video data; to generate the one or more alerts; and/or to broadcast one or more alert notifications.

Network 201 may be implemented as any suitable network configured to facilitate communications between mobile computing devices 204.1 and/or 204.2 and one or more of external computing device 206 and/or smart infrastructure component 208. For example, network 201 may include one or more telecommunication networks, nodes, and/or links used to facilitate data exchanges between one or more devices, and may facilitate a connection to the Internet for devices configured to communicate with network 201. Network 201 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 201 may include, for example, a proprietary network, a secure electronic communication network, a secure public internet, a mobile-based network, a virtual private network, etc.

In aspects in which network 201 facilitates a connection to the Internet, data communications may take place over the network 201 via one or more suitable Internet communication protocols. For example, network 201 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 203a-203g may represent wired links, wireless links, or any suitable combination thereof.

In aspects in which mobile computing devices 204.1 and 204.2 communicate directly with one another in a peer-to-peer fashion, network 201 may be bypassed and thus communications between mobile computing devices 204.1 and 204.2 and external computing device 206 may be unnecessary. For example, in some aspects, mobile computing device 204.1 may broadcast geographic location data, telematics data, and/or image, audio, and/or video data directly to mobile computing device 204.2. In this case, mobile computing device 204.2 may operate independently of network 201 to determine whether an alert should be generated at mobile computing device 204.2 based upon the geographic location data, the telematics data, and/or the image, audio, and/or video data. In accordance with such aspects, network 201 and external computing device 206 may be omitted.

However, in other aspects, one or more of mobile computing devices 204.1 and/or 204.2 may work in conjunction with external computing device 206 to generate alerts. For example, in some aspects, mobile computing device 204.1 may broadcast geographic location data, telematics data, and/or image, audio, and/or video data which is received by external computing device 206. In this case, external computing device 206 may be configured to determine whether an alert should be sent to mobile computing device 204.2 based upon the geographic location data, the telematics data, and/or the image, audio, and/or video data.

To provide an example, mobile computing device 204.1 may broadcast telematics data and image data, which is received by mobile computing device 204.2 and/or vehicle 202.2. Upon receipt of the telematics data and image data, mobile computing device 204.2 and/or vehicle 202.2 may determine that an abnormal traffic condition (e.g., a vehicle accident) exists at or in a vicinity of (e.g., within a threshold and/or predetermined distance of) the location of the originating vehicle (e.g., the location of mobile computing device 204.1 and vehicle 202.1) and/or whether this location or the vicinity of this location is along a route travelled by vehicle 202.2 or is otherwise relevant to vehicle 202.2.

Once this is determined, mobile computing device 204.2 and/or vehicle 202.2 may automatically take a preventive or corrective action, which may include, for example, mobile computing device 204.2 and/or vehicle 202.2 generating or determining an alert, issuing a visual alert, providing an audio or audible alert, identifying an alternate travel route that avoids the location of the abnormal traffic condition, presenting an alternative travel route on a display or display screen for use by a driver of vehicle 202.2, providing audio driving directions for the driver of vehicle 202.2 to travel along the alternate route, etc.

External computing device 206 may be configured to execute various software applications, algorithms, and/or other suitable programs. External computing device 206 may be implemented as any suitable type of device to facilitate the functionality as described herein. For example, external computing device 206 may be implemented as a network server, a web-server, a database server, one or more databases and/or storage devices, a central monitoring system and/or dispatching center computer used by emergency response personnel, a railway monitoring system, or any suitable combination thereof. Although illustrated as a single device in FIG. 2, one or more portions of external computing device 206 may be implemented as one or more storage devices that are physically co-located with external computing device 206, or as one or more storage devices utilizing different storage locations as a shared database structure (e.g. cloud storage).

In some embodiments, external computing device 206 may be configured to perform any suitable portion of the processing functions remotely that have been outsourced by one or more of mobile computing devices 204.1 and/or 204.2. For example, mobile computing device 204.1 and/or 204.2 may collect data (e.g., geographic location data, telematics data, and/or image, audio, and/or video data) as described herein, but may send the data to external computing device 206 for remote processing instead of processing the data locally. In such embodiments, external computing device 206 may receive and process the data to determine whether an anomalous condition exists and, if so, whether to send an alert notification to, for example, one or more of mobile computing devices 204.1 and/or 204.2.

In one aspect, external computing device 206 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. For example, external computing device 206 may facilitate the receipt of telematics data and/or other data from one or more mobile computing devices 204.1-204.N, which may be associated with insurance customers and/or running a Telematics App, as further discussed below with reference to FIG. 3.

In aspects in which external computing device 206 facilitates communications with an insurer computing system (or is part of such a system), data received from one or more mobile computing devices 204.1-204.N may include logon credentials which may be verified by external computing device 206 or one or more other external computing devices, servers, etc. These logon credentials may be associated with an insurer profile, which may include, for example, insurance policy numbers, a description and/or listing of insured assets, vehicle identification numbers of insured vehicles, addresses of insured structures, contact information, premium rates, discounts, etc.

In this way, data received from one or more mobile computing devices 204.1-204.N may allow external computing device 206 to uniquely identify each insured customer and/or whether each identified insurance customer has installed the Telematics App. Furthermore, any data collected from one or more mobile computing devices 204.1-204.N may be referenced to each insurance customer and/or any insurance policies associated with each insurance customer for various insurance-related purposes.

For example, as further discussed below with reference to FIG. 3, the one or more mobile computing devices 204.1-204.N may broadcast, in addition to or as part of the telematics data, data indicative of whether a Telematics App has been installed and/or usage data indicative of how often a driver uses the Telematics App functionality while driving. Of course, similar or identical data may be received from a vehicle as opposed to the mobile computing device located in the vehicle. That is, the same functions discussed below with reference to FIG. 3 regarding the Telematics App installed and executed on a mobile computing device may also (or alternatively) be installed and executed as part of a vehicle's integrated computer functions, as previously discussed with reference to FIG. 1 above.

In various aspects, an insurer may leverage data regarding whether an insured customer has installed a Telematics App or how often the Telematics App is used while driving to calculate, adjust, and/or update various insurance pricing for an automotive insurance policy or other suitable insurance policy. For example, as noted above, an insurer may adjust insurance premiums, rates, discounts, points, programs, etc., based upon the insured having the functionality discussed herein and/or the amount that the insured uses the functionality discussed herein.

In addition, external computing device 206 may facilitate the communication of the updated insurance policies, premiums, rates, discounts, etc., to insurance customers for their review, modification, and/or approval—such as via wireless communication or data transmission to one or more mobile computing devices 204.1-204.N. For example, an insurer may provide an initial discount for an insured customer installing the Telematics App and logging in with the Telematics App. To continue this example, because the alert notifications provided by the Telematics App may reduce the likelihood of a collision or other damage occurring to the vehicle or the driver, use of the Telematics App may function to mitigate or prevent driving risks upon which an insurance policy is partially based. Therefore, an insurer may provide an additional discount that increases with the insured customer's usage of the Telematics App while driving.

In some aspects, external computing device 206 may facilitate indirect communications between one or more of mobile computing devices 204.1-204.2, vehicles 202.1-202.N, and/or infrastructure component 208 via network 201 or another suitable communication network and/or wireless link. For example, external computing device 206 may receive telematics data and/or image data from an originating mobile computing device 204.1 via radio link 203*b* and relay the telematics data and/or image data to a destination mobile computing device 204.2 and/or to vehicle 202.2 via radio link 203*c*.

With respect to FIG. 2, infrastructure component 208 may be implemented as any suitable type of traffic infrastructure component configured to receive communications from and/or to send communications to other devices, such as mobile computing devices 204.1 and/or 204.2, and/or external computing device 206, for example.

In some aspects, as noted herein, infrastructure component 208 may be implemented as one or more "smart" infrastructure components, which may be configured to communicate with one or more other devices directly and/or indirectly.

For example, smart infrastructure component 208 may be configured to communicate with one or more devices directly and/or indirectly. For example, smart infrastructure component 208 may be configured to communicate directly with mobile computing device 204.2 via link 203*d* and/or with mobile computing device 204.1 via links 203*b* and 203*f* utilizing network 201. To provide another example, smart infrastructure component 208 may communicate with external computing device 206 via links 203*e* and 203*f* utilizing network 201.

Smart infrastructure component 208 may be implemented as any suitable type of traffic infrastructure component configured to receive communications from and/or to send communications to other devices, such as mobile computing devices 204.1 and 204.2, and/or external computing device 206, for example. For example, smart infrastructure component 208 may be implemented as a traffic light, a railroad crossing light, a construction notification sign, a roadside display configured to display messages, a billboard display, etc. As shown in the example of FIG. 2, infrastructure component 208 may be implemented as a roadside display displaying, for example, a warning message indicating "ACCIDENT 1 MILE AHEAD" as a result of implementation of the functionality discussed herein. Such an accident may be, for instance, an accident between truck 214 and collided vehicle 216.

In another aspect, a roadside display may additionally or alternatively warn of, for example, an animal (e.g., animal 218, such as a deer or other animal that may create a driving hazard) and/or a pedestrian (e.g., pedestrian 220) at or in a vicinity of a vehicle (e.g., vehicle 202.1). As further discussed below, a mobile computing device mounted in a vehicle dashboard cradle may determine or detect such a hazard at or in a vicinity of a vehicle that includes the vehicle dashboard cradle mounted on and/or affixed to a dashboard of the vehicle. For instance, mobile computing device 204.1 mounted in vehicle dashboard cradle 210 of vehicle 202.1 may detect such a hazard using camera 212, as further discussed below.

Similar to external computing device 206, one or more smart infrastructure components 208 may facilitate indirect communications between one or more of mobile computing devices 204.1-204.2, vehicles 202.1-202.N, and/or external computing device 206 via network 201 or another suitable communication network and/or wireless link. For example, one or more smart infrastructure components 208 may receive telematics data and/or image data from an originating mobile computing device 204.2 via radio link 203*d* and relay the telematics data and/or image data to a destination mobile computing device 204.1 and/or to vehicle 202.1 via radio links 203b and 203f or via radio link 203g, for example.

In some aspects, smart infrastructure component 208 may be configured to receive geographic location data, telematics data, and/or image, audio, and/or video data from one or more other devices and to process this data to determine whether an anomalous condition (e.g., hazard) has been detected and whether the detected anomalous condition satisfies a threshold distance condition with respect to smart infrastructure component 208. The threshold distance condition may include, for example, the geographic location of the anomalous condition being within a threshold radius of smart infrastructure component 208, on or associated with the same road serviced by smart infrastructure component 208, etc. If so, smart infrastructure component 208 may perform one or more relevant actions such as displaying one or more relevant messages to notify drivers in the vicinity (e.g., drivers within a threshold and/or predetermined distance of smart infrastructure component 208, as discussed above with respect to a vicinity), to modify traffic patterns, to change traffic light timing, to redirect traffic, etc.

In other aspects, smart infrastructure component 208 may receive data indicating that an alert is to be generated and/or the type of alert that is to be generated. In accordance with such aspects, one or more of mobile computing devices 204.1, 204.2 and/or external computing device 206, for example, may make the determination of whether an anomalous condition exists and is within a threshold distance of smart infrastructure component 208. If so, the data received by smart infrastructure component 208 may be indicative of the type of anomalous condition, the location of the anomalous condition, commands to cause smart infrastructure component 208 to perform one or more acts, the type of acts to perform, etc.

To provide some illustrative examples, a mobile computing device (e.g., mobile computing device 204.1) may broadcast an alert indicating that a hazard, such as a vehicle accident, has been detected by mobile computing device 204.1. The alert may be received by one or more of mobile computing device 204.2 or smart infrastructure component 208, for example, and may result in mobile computing device 204.2 or smart infrastructure component 208 generating one or more alert notifications and/or smart infrastructure component 208 changing to a different state.

To provide another example, if smart infrastructure component 208 is implemented as a smart traffic light, smart infrastructure component 208 may change a traffic light from green to red (or vice-versa) or adjust a timing cycle to favor traffic in one direction over another. To provide yet another example, if smart infrastructure component 208 is implemented as a traffic sign display/roadside display, smart infrastructure component 208 may display a warning message that the anomalous condition (e.g., a traffic accident) has been detected ahead and/or on a specific road corresponding to the geographic location data.

In additional aspects, other vehicles may play a role in the one or more alert notifications. To provide an illustrative example, an emergency vehicle (e.g., an ambulance, fire truck, etc.) may be dispatched to the scene of an accident. In such a case, the emergency vehicle may be configured to broadcast one or more signals that cause one or more of mobile computing devices 204.1-204.2 to generate one or more alert notifications and/or smart infrastructure component 208 to change to a different state. These signals may be broadcasted from a mobile computing device carried by emergency response personnel and triggered upon the emergency vehicle approaching (e.g., within a threshold distance) a geographic location associated the vehicle accident. Additionally or alternatively, the signals may be broadcasted by any suitable device mounted in or otherwise associated with the emergency response vehicle.

The signals transmitted from additional vehicles such as emergency response vehicles (emergency response vehicles not being illustrated in FIG. 2 for purposes of brevity) may be transmitted in accordance with any suitable communication protocol directly and/or indirectly to one or more or mobile computing devices 204.1-204.2 and/or smart infrastructure component 208, for example. For example, the signals may be transmitted directly to smart infrastructure component 208, and indirectly to one or more of mobile computing devices 204.1-204.2 via network 201 and/or external computing device 206, etc.

Exemplary End-User/Destination Devices

The following details regarding the determination of an anomalous condition (e.g., a hazard such as congestion, a vehicle accident, a pedestrian, an animal, etc.) are explained in this section with reference to computing device 300, which may be a mobile computing device or "mobile device" (e.g., smart phone, laptop, tablet, phablet, smart watch, wearable electronics, etc.). In the present aspect, computing device 300 may be implemented as any suitable computing device, such as a mobile computing device (e.g., mobile computing device 110, as shown in FIG. 1). In another aspect, computing device 300 may be implemented as an on-board vehicle computer (e.g., on-board vehicle computer 114, as shown in FIG. 1). In still other aspects, computing device 300 may be implemented as a device external to a vehicle (e.g., external computing device 206 or smart infrastructure component 208, as shown in FIG. 2).

Depending upon the implementation of computing device 300, the methods and processes utilized to determine the existence of anomalous conditions may be performed locally, remotely, or any suitable combination of local and remote processing techniques.

Figure 3:
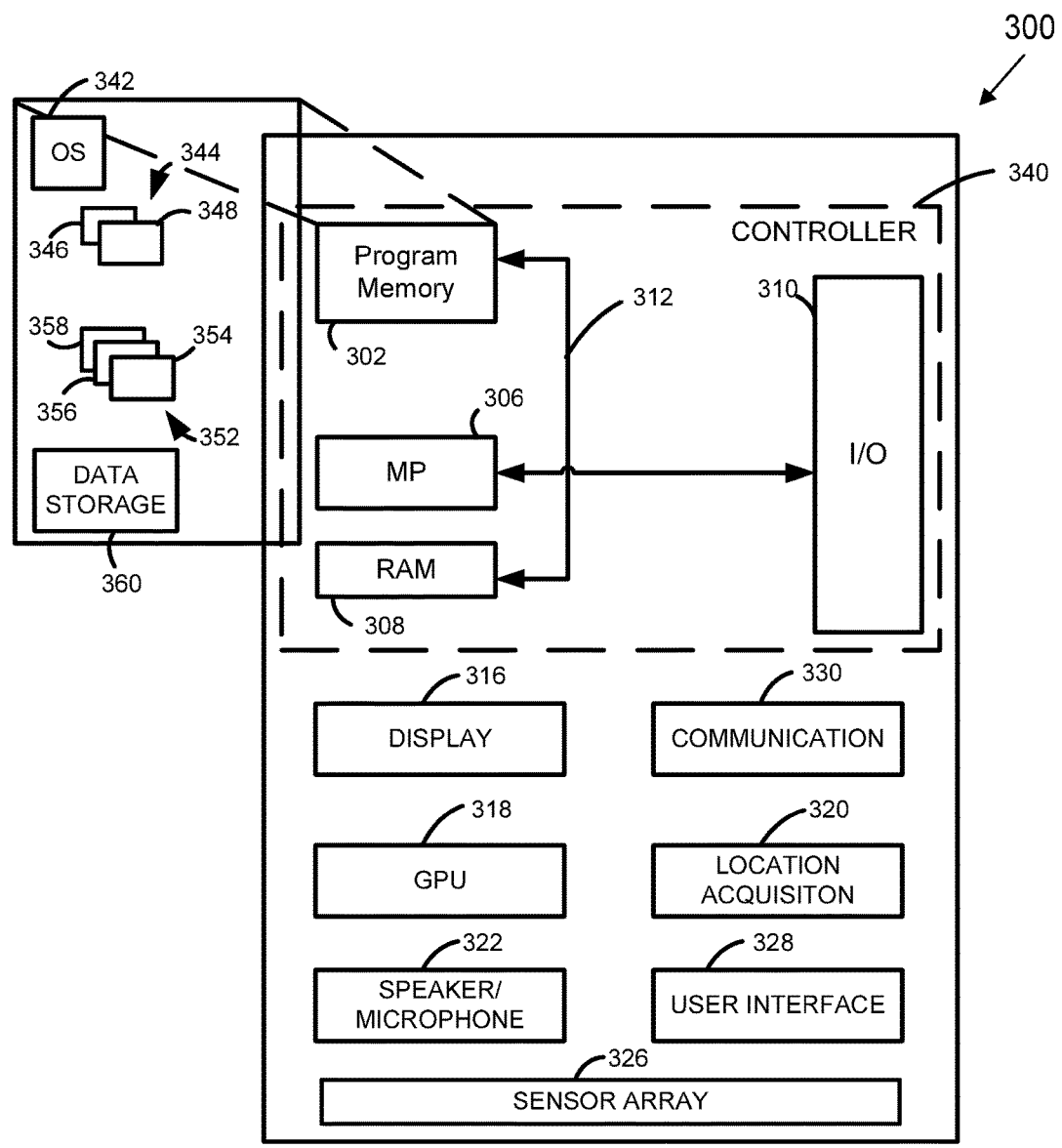
FIG. 3 illustrates a block diagram of an exemplary computing device 300 in accordance with an exemplary aspect of the present disclosure.

FIG. 3 illustrates a block diagram of an exemplary computing device or mobile device 300 in accordance with an exemplary aspect of the present disclosure. Computing device 300 may be implemented as any suitable computing device configured to (1) monitor, measure, generate, and/or collect telematics data, geographic location data, and/or image, audio, and/or video data; (2) broadcast the geographic location data, the telematics data, and/or the image, audio, and/or video data to one or more external components, such as via wireless communication and/or data transmission; (3) receive geographic location data, telematics data, and/or image, audio, and/or video data broadcasted from another device, such as via wireless communication and/or data transmission; (4) determine whether an anomalous condition exists at the geographic location indicated by the geographic location data based upon the telematics data and/or the image, audio, and/or video data; (5) generate one or more alerts indicative of the anomalous condition; and/or (6) broadcast one or more alert notifications to other devices, such as via wireless communication and/or data transmission.

Computing device 300 may include a display 316, a graphics processing unit (GPU) 318, a location acquisition unit 320, a speaker/microphone 322, a sensor array 326, a user interface 328, a communication unit 330, and/or a controller 340.

In one aspect, controller 340 may include a program memory 302, a microprocessor (MP) 306, a random-access memory (RAM) 308, and/or an input/output (I/O) interface 310, each of which may be interconnected via an address/data bus 312. Controller 340 may be implemented as any suitable type and/or number of processors, such as a host processor for the relevant device in which computing device 300 is implemented, for example. In some aspects, controller 340 may be configured to communicate with additional data storage mechanisms that are not shown in FIG. 3 for purposes of brevity (e.g., one or more hard disk drives, optical storage drives, solid state storage devices, etc.) that reside within or are otherwise associated with computing device 300.

Program memory 302 may store data used in conjunction with one or more functions performed by computing device 300 to facilitate the interaction between computing device 300 and one or more other devices. For example, if computing device 300 is implemented as a mobile computing device (e.g., mobile computing device 204.1, as shown in FIG. 2), then program memory 302 may store one or more programs, applications, algorithms, etc. that, when executed by controller 340, facilitate the interaction between mobile computing device 204.1 and (i) one or more networks (e.g., network 201), (ii) other mobile computing devices (e.g., mobile computing device 204.2), (iii) external computing devices (e.g., external computing device 206), (iv) vehicles (e.g., vehicle 108), (v) vehicle on-board computers (e.g., on-board computer 114), (vi) infrastructure components (e.g., smart infrastructure component 208), etc.

In various aspects, program memory 302 may be implemented as a non-transitory tangible computer readable media configured to store computer-readable instructions, that when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs (micro-processors) 306 may be configured to execute one or more of software applications 344, software routines 352 residing in program memory 302, and/or other suitable software applications. For example, operating system 342 may be implemented as any suitable operating system platform depending upon the particular implementation of computing device 300. For example, if computing device 300 is implemented as a mobile computing device, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store data such as application data for the one or more software applications 344, routine data for the one or more software routines 352, geographic location data, telematics data, and/or image, audio, and/or video data, etc.

Display 316 may be implemented as any suitable type of display and may facilitate user interaction with computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display alerts and/or notifications received from other devices indicative of detected anomalous conditions.

Communication unit 330 may be configured to facilitate communications between computing device 300 and one or more other devices, such as other mobile computing devices, networks, external computing devices, infrastructure components (e.g., smart infrastructure components), etc. As previously discussed with reference to FIGS. 1 and 2, computing device 300 may be configured to communicate with these other devices in accordance with any suitable number and type of communication protocols. Thus, in various aspects, communication unit 330 may be configured to support any suitable number and type of communication protocols based upon a particular network and/or device in which computing device 300 is communicating to facilitate this functionality.

Communication unit 330 may be configured to support separate or concurrent communications, which may be the same type of communication protocol or different types of communication protocols. For example, communication unit 330 may be configured to facilitate communications between computing device 300 and an external computing device (e.g., external computing device 206) via cellular communications while facilitating communications between computing device 300 and the vehicle in which it is carried (e.g., vehicle 108) via BLUETOOTH communications.

Communication unit 330 may be configured to broadcast data and/or to receive data in accordance with any suitable communications schedule. For example, communication unit 330 may be configured to broadcast geographic location data, telematics data, and/or image, audio, and/or video data every 15 seconds, every 30 seconds, every minute, etc. As will be further discussed below, the geographic location data, telematics data, and/or image, audio, and/or video data may be sampled in accordance with any suitable sampling period. Thus, when broadcasted by communications unit 330 in accordance with a recurring schedule, the geographic location data, telematics data, and/or image, audio, and/or video data may include a log or collection of the geographic location data, telematics data, and/or image, audio, and/or video data that was sampled since the last data transmission. A suitable communication schedule may be selected as a tradeoff between a desired anomalous condition detection speed and battery usage of computing device 300, when applicable.

Additionally or alternatively, aspects include communication unit 330 being configured to conditionally send data, which may be particularly advantageous when computing device 300 is implemented as a mobile computing device, as such conditions may help reduce power usage and prolong battery life. For example, communication unit 330 may be configured to only broadcast when telematics data and/or other data discussed herein (e.g., image, audio, and/or video data) has been sampled since the last transmission, which will be further discussed below with regards to sensor array 326. Controller 340 may determine whether data has been sampled since the last transmission by, for example, analyzing a memory address range (e.g., in data storage 360, RAM 308, etc.) associated with the storage of the telematics data and/or other data discussed herein and comparing the contents of this buffer to a known range of valid values.

To provide another example, aspects include communication unit 330 being additionally or alternatively configured to only broadcast telematics data and/or other data discussed herein when computing device 300 is connected to a power source (e.g., an in-vehicle charger). To provide still another example, aspects include communication unit 330 being additionally or alternatively configured to only broadcast telematics data and/or other data discussed herein when communication unit 330 is connected to and/or communicating with a device identified as a vehicle. This may include, for example, identifying a BLUETOOTH connection as a valid vehicle to satisfy this condition upon installation and/or setup of the relevant application or program executed by computing device 300 to facilitate the functionality described herein.

Location acquisition unit 320 may be configured to generate geographic location data utilizing any suitable global positioning techniques. For example, location acquisition unit 320 may communicate with one or more satellites and/or wireless transmitters to determine a location of computing device 300. Location acquisition unit 320 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of computing device 300.

In one aspect, location acquisition unit 320 may periodically store one or more geographic locations of computing device 300 as geographic location data in any suitable portion of memory utilized by computing device 300 (e.g., program memory 302, RAM 308, etc.) and/or to another device (e.g., another mobile computing device, an external computing device, etc.). In this way, location acquisition unit 320 may sample the location of computing device 300 in accordance with any suitable sampling rate (e.g., every 5 seconds, 10 seconds, 30 seconds, etc.) and store this geographic location data representing the position of computing device 300, and thus the vehicle in which it is travelling, over time.

Speaker/microphone 322 may be configured as one or more separate devices. Speaker/microphone 322 may include a microphone configured to detect sounds and to convert sounds to data suitable for communications via communications unit 330. Speaker/microphone 322 may additionally or alternatively include a speaker configured to play sound in response to data received from one or more components of computing device 300 (e.g., controller 340). In one embodiment, speaker/microphone 322 may be configured to play audible alerts.

User-interface 328 may be implemented as any suitable device configured to collect user input, such as a "soft" keyboard displayed on display 316 of computing device 300, a keyboard attached to computing device 300, an external keyboard communicating via a wired or a wireless connection (e.g., a BLUETOOTH keyboard), an external mouse, etc.

Sensor array 326 may be configured to measure any suitable number and/or type of sensor metrics as part of the telematics data. In one aspect, sensor array 326 may be implemented as one or more sensors positioned to determine the speed, force, heading, direction, and/or any other suitable metric(s) and/or indication(s) associated with movements of computing device 300 and, thus, a vehicle in which computing device 300 is positioned. Additionally or alternatively, sensor array 326 may be configured to communicate with one or more portions of computing device 300 to measure, collect, and/or generate one or more sensor metrics and/or other indication(s) from one or more non-sensor sources, which will be further discussed below.

To generate one or more sensor metrics, sensor array 326 may include, for example, one or more cameras, accelerometers, gyroscopes, magnetometers, barometers, thermometers, proximity sensors, light sensors, Hall Effect sensors, etc. In aspects in which sensor array 326 includes one or more accelerometers, sensor array 326 may be configured to measure and/or collect accelerometer metric values utilizing an X-axis, Y-axis, and Z-axis accelerometer. In accordance with such aspects, sensor array 326 may measure sensor metric values as a three-dimensional accelerometer vector that represents the movement of computing device 300 in three dimensional space by combining the outputs of the X-axis, Y-axis, and Z-axis accelerometers using any suitable techniques.

In one aspect, sensor array 326 may include one or more cameras and/or other image and/or video capture devices. In accordance with such aspects, the one or more cameras or other image and/or video capture devices (e.g., camera 212, which may be configured to capture images and/or video) that are part of sensor array 326 may be mounted or otherwise positioned on mobile computing device 300. The one or more cameras and/or other image and/or video capture devices may be mounted or otherwise positioned on mobile computing device 300 such that, when mobile computing device 300 is docked, cradled, or otherwise mounted within a vehicle (e.g., mounted within vehicle dashboard cradle 210), images and/or video may be captured from this vantage point. For example, camera 212 of mobile computing device 204.1 (which may be an implementation of computing device 300), as implemented by sensor array 326, may function as a dashboard camera and/or a camera with other suitable functionality and capability, capturing images and/or video data of various objects outside of and/or inside of the vehicle. In some aspects, camera 212 may be positioned to take images forward of and/or in a vicinity of the vehicle (e.g., vehicle 202.1). Additionally or alternatively, mobile computing device 300 (e.g., implemented as mobile computing device 204.1) may capture audio data with the image and/or video data via speaker/microphone 322.

In various aspects, mobile computing device 300 may begin to capture data upon detecting that it has been placed in a cradle, and otherwise not capture data in such a manner. This detection may occur, for example, via one or more conditions being satisfied. For example, mobile computing device 300 may utilize one or more sensors (e.g., an accelerometer that is part of sensor array 326) to determine that mobile computing device 300 has changed orientation to horizontal (as is common when docked in a vehicle), that mobile computing device 300 is communicating via BLUETOOTH with the vehicle, that the vehicle is moving above a threshold speed, etc. Aspects include any suitable number of conditions, upon being satisfied, triggering mobile computing device 300 to start collecting telematics data, images, audio, video, etc., including data collected via sensor array 326.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a g-force associated with vehicle braking, acceleration, and cornering at a rate of 15 Hz, 30 Hz, 60 Hz, etc., which may be the same sampling rate as one another or different sampling rates. To provide another example, sensor array 326 may be configured to implement one or more gyroscopes to improve the accuracy of the measured one or more sensor metrics and to determine whether computing device 300 is in use or stationary within a vehicle. To provide another example, sensor array 326 may implement a compass (magnetometer) to determine a direction or heading of a vehicle in which computing device 300 is located.

Again, sensor array 326 may additionally or alternatively communicate with other portions of computing device 300 to obtain one or more sensor metrics even though these sensor metrics may not be measured by one or more sensors that are part of sensor array 326. For example, sensor array 326 may communicate with one or more of location acquisition unit 320, communication unit 330, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of computing device 300, whether a battery of computing device 300 is charging, whether computing device 300 is being handled or otherwise in use, an operating status of computing device 300 (e.g., whether computing device 300 is unlocked and thus in use).

In various aspects, sensor array 326 may base timestamps upon any suitable clock source, such as one utilized by location acquisition unit 320 for GNSS functions. The timestamps may be, for example, recorded or logged as various data is sampled to be synchronized to the sampling of one or more sensor metrics (which may be measured to within hundredths of a second or smaller resolutions).

Additionally or alternatively, sensor array 326, location acquisition unit 320, and/or communication unit 330 may log or otherwise measure various metrics or other data that may be used by controller 340 to determine how often the functionality of the Telematics Application is being utilized when a vehicle is being driven. For example, sensor array 326 may log the time when telematics data and/or other data described herein is being collected, when the Telematics Application is running, and/or when the Telematics Application has been started. To provide additional examples, communication unit 330 may store data indicative of a BLUETOOTH connection status of computing device 300. To provide yet another example, location acquisition unit 320 may store and/or log the changes in geographic location of computing device 300 over time.

In various aspects, controller 340 may determine how often a driver uses the Telematics App based upon any suitable combination of the aforementioned data. For example, the BLUETOOTH connection status may be leveraged to determine whether computing device 300 is located in a vehicle. To provide another example, the changes in the geographic location data over time may be utilized to determine whether computing device 300 has exceeded a threshold speed for a threshold duration of time. In this way, a determination may be made whether computing device 300 is located in a vehicle while the vehicle is being driven.

Various aspects include the aforementioned data being leveraged to calculate a usage amount in which a user utilizes the Telematics App while driving. For example, the usage amount may be based upon a total proportion of time (e.g., 80% of the time while driving, the functionality provided by the Telematics App is enabled). To provide another example, the usage amount may be mileage-based (e.g., 90% of the miles driven are done so with the functionality of the Telematics App available to the driver). As discussed above, this usage data may be sent to an insurer or other third party via a telematics data transmission or a separate transmission and used to set and/or adjust an insurance policy, premium, or discount for the insured customer.

In one aspect, sensor array 326 may sample one or more sensor metrics based upon one or more conditions being satisfied. For example, sensor array 326 may determine, based upon gyroscope sensor metrics, communication with controller 340, etc., whether computing device 300 is in use. If computing device 300 is in use (e.g., when implemented as a mobile computing device) then the movement of computing device 300 within the vehicle may not truly represent the vehicle motion, thereby causing sensor metrics sampled during this time to be erroneous. Therefore, aspects include sensor array 326 sampling the one or more sensor metrics when computing device 300 is not in use, and otherwise not sampling the one or more sensor metrics.

As discussed above, in one aspect, sensor array 326 may include one or more cameras and/or image and/or video capture devices (e.g., camera 212). When sensor array 326 is implemented with one or more cameras, these cameras may be configured as any suitable type of camera configured to capture and/or store images and/or video. For example, when computing device 300 is mounted in a vehicle (e.g., when computing device 300 is implemented as mobile computing device 204.1 mounted in vehicle dashboard cradle 210), the camera may be configured to store images and/or video data of the road in front of the vehicle in which it is mounted, and to store this data to any suitable portion of program memory 302 (e.g., data storage 360). Controller 340 and/or MP 306 may analyze this data to generate one or more local alerts, to transmit signals indicative of detected alerts to one or more other devices, etc., which is further discussed below with reference to the execution of anomalous condition detection routine 358.

Again, the telematics data and/or other data discussed herein that is broadcasted by computing device 300 may include one or more sensor metrics. However, the telematics data and/or other data discussed herein may additionally or alternatively include other external data that may be relevant in determining the presence of an anomalous condition. For example, the telematics data may include external data such as speed limit data correlated to a road upon which computing device 300 is located (and thus the vehicle in which it is travelling), an indication of a type of road, a population density corresponding to the geographic location data, etc.

In some aspects, computing device 300 may obtain this external data by referencing the geographic location data to locally stored data (e.g., data stored in data storage 360) and broadcasting this data appended to or otherwise included with the sensor metrics data as part of the telematics data. In other aspects, the device receiving the telematics data (e.g., a mobile computing device, an external computing device, an infrastructure component) may generate the external data locally or via communications with yet another device. As will be further discussed below, this external data may further assist the determination of whether an anomalous condition is present.

In some aspects, software applications 344 and/or software routines 352 may reside in program memory 302 as default applications that may be bundled together with the OS of computing device 300. For example, web browser 348 may be part of software applications 344 that are included with OS 342 implemented by computing device 300.

In other aspects, software applications 344 and/or software routines 352 may be installed on computing device 300 as one or more downloads, such as an executable package installation file downloaded from a suitable application store via a connection to the Internet. For example, alert notification application 346, telematics collection routine 354, geographic location determination routine 356, and/or anomalous condition detection routine 358 may be stored to suitable portions of program memory 302 upon installation of a package file downloaded in such a manner. Examples of package download files may include downloads via the iTunes store, the Google Play Store, the Windows Phone Store, downloading a package installation file from another computing device, etc. Once downloaded, alert notification application 346 may be installed on computing device 300 as part of an installation package such that, upon installation of alert notification application 346, telematics collection routine 354, geographic location determination routine 356, and/or anomalous condition detection routine 358 may also be installed.

In one embodiment, software applications 344 may include an alert notification application 346, which may be implemented as a series of machine-readable instructions for performing the various tasks associated with executing one or more embodiments described herein. In one aspect, alert notification application 346 may cooperate with one or more other hardware or software portions of computing device 300 to facilitate these functions.

In one aspect, alert notification application 346 may function as a Telematics Application (or "App") which is downloaded and installed on mobile computing device (or mobile device) 300 by a user via a suitable third-party software store and/or portal (e.g., Apple iTunes, Google Play, the Windows Store, etc.).

To provide an illustrative example, software applications 344 may include instructions for performing tasks such as determining a geographic location of computing device 300 (e.g., via communications with location acquisition unit 320); monitoring, measuring, generating, and/or collecting telematics data and/or other data discussed herein (e.g., image, audio, and/or video data); broadcasting the geographic location data, the telematics data, and/or the other data discussed herein to one or more external devices; receiving geographic location data, telematics data, and/or other data discussed herein from another computing device; determining whether an anomalous condition exists based upon the geographic location data, the telematics data, and/or the other data discussed herein; generating one or more alerts indicative of the determined anomalous condition; receiving user input; facilitating communications between computing device 300 and one or more other devices in conjunction with communication unit 330, etc.

To provide another example, aspects include mobile computing device 300 (e.g., implemented as mobile computing device 204.1) being configured to capture image and/or video data while cradled in a dock or otherwise mounted in a vehicle, as previously discussed (e.g., while mounted in vehicle dashboard cradle 210). Mobile computing device 300 may also or alternatively be configured to capture audio data, as previously discussed. In accordance with various aspects, the capture of image, audio, and/or video data may be facilitated, for example, by instructions stored in alert notification application 346 being executed by controller 340 and/or MP 306. In various aspects, alert notification application 346 may facilitate mobile computing device 300 capturing image, audio, and/or video data at any suitable sampling rate (e.g., once every second, 5 times per second, etc.) and storing this data to any suitable portion of mobile computing device 300 (e.g., data storage 360). Aspects include data sampling processes occurring as background operations to allow other applications to be run on mobile computing device 300 (e.g., navigation applications) while telematics data and/or image, video, and/or audio data is collected by mobile computing device 300.

Software applications 344 may include a web browser 348. In some embodiments (e.g., when computing device 300 is implemented as a mobile computing device), web browser 348 may be a native web browser application, such as Apple's Safari®, Google Android™ mobile web browser, Microsoft Internet Explorer® for Mobile, Opera Mobile™, etc. In other embodiments, web browser 348 may be implemented as an embedded web browser.

Regardless of the implementation of web browser 348, various aspects include web browser 348 being implemented as a series of machine-readable instructions for interpreting and displaying web page information received from an external computing device (e.g., external computing device 206, as shown in FIG. 2). This web page information may be utilized in conjunction with alert notification application 346 to perform one or more functions of the aspects as described herein.

In one embodiment, software routines 352 may include a telematics collection routine 354. Telematics collection routine 354 may include instructions, that when executed by controller 340, facilitate sampling, monitoring, measuring, collecting, quantifying, storing, encrypting, transmitting, and/or broadcasting of telematics data. In some aspects, telematics collection routine 354 may facilitate collection of telematics data locally via one or more components of computing device 300 (e.g., via sensor array 326, location acquisition unit 320, controller 340, etc.). In other aspects, telematics collection routine 354 may facilitate the storage of telematics data received from another device (e.g., via communication unit 330).

In one aspect, telematics collection routine 354 may work in conjunction with controller 340 and/or alert notification application 346 to periodically listen for and/or to periodically broadcast telematics data. For example, controller 340 may, upon executing alert notification application 346, periodically listen for a broadcast containing telematics data generated and transmitted from other computing devices, vehicles, external computing devices, and/or smart infrastructure components. Upon detecting a broadcast, controller 340 may download the broadcast to a suitable portion of program memory 302 and analyze the telematics data contained therein for potential traffic events, travel events, alerts, messages, etc. Such aspects may be particularly useful, for example, to save battery life of the computing device, as continuous listening is not necessary but instead may be performed, for example, in accordance with a particular timing schedule.

To provide another example, controller 340 may, upon executing alert notification application 346, periodically broadcast telematics data, which may be received by other computing devices, vehicles, external computing devices, and/or smart infrastructure components.

In one embodiment, software routines 352 may include a geographic location determination routine 356. Geographic location determination routine 356 may include instructions, that when executed by controller 340, facilitate sampling, measuring, collecting, quantifying, storing, transmitting, and/or broadcasting of geographic location data (e.g., latitude and longitude coordinates). In some aspects, geographic location determination routine 356 may facilitate generating and/or storing geographic location data locally via one or more components of computing device 300 (e.g., via location acquisition unit 320 and/or communication unit 330). In some aspects, geographic location determination routine 356 may additionally or alternatively facilitate the storage of geographic location data received from another device (e.g., via communication unit 330).

Additionally or alternatively, software routines 352 may include anomalous condition detection routine 358. Anomalous condition detection routine 358 may include instructions, that when executed by controller 340, facilitate the determination of whether an anomalous condition exists based upon the telematics data, the geographic location data, and/or image, audio, and/or video data captured by one or more cameras or other imaging devices and/or a microphone, for example. As noted above, the image, audio, and/or video data capture may be facilitated, for example, by instructions stored in alert notification application 346 being executed by controller 340 and/or MP 306. In another aspect, the image, audio, and/or video data capture may be facilitated, for example, by instructions of software routines 352 (e.g., telematics collection routine 354, geographic location determination routine 356, anomalous condition detection routine 358, and/or another suitable routine(s) including instructions that, when executed by controller 340, facilitate the image, audio, and/or video data capture).

An anomalous condition may include any suitable condition that indicates a deviation from normal traffic patterns, including a hazard such as a vehicle accident, congestion, a pedestrian on or near a road (e.g., ahead of a vehicle on a road on which the vehicle is traveling, or otherwise in a vicinity of the vehicle and on or associated with the road, such as within a threshold distance of a side of the road), an animal on or near a road (e.g., ahead of a vehicle on a road or otherwise in a vicinity of the vehicle, as discussed with respect to a pedestrian), etc. For example, if an accident occurs, traffic may slow down due to a car pileup, a reduction in available lanes, and/or rerouting of traffic. Because the telematics data may include data indicative of the speed limit at the location corresponding to the geographic location where the telematics data was sampled, a comparison between the speed of computing device 300 and the posted or other speed limit data (such as a comparison between mobile device or vehicle speed with a map of, and/or known, posted speed limit information) may indicate an anomalous condition. Furthermore, because each vehicle may sample and/or broadcast geographic location data and/or telematics data in real time, the anomalous conditions may be detected with minimal delay as they occur.

Although the speed of the vehicle may indicate an anomalous condition, aspects include other types of anomalous conditions being detected based upon the telematics data. For example, an anomalous condition may be identified when the one or more sensor metrics indicate that an airbag has been deployed, and thus the vehicle associated with computing device 300 has been in an accident. This may be determined, for example, via an analysis of barometer readings matching a pressure versus time profile and/or via an indication from a dedicated airbag deployment sensor located in the vehicle.

To provide another example, an anomalous condition may be identified based upon weather fluctuations associated with a rapid formation of ice, a sudden change from a paved to a dirt road, the triggering of a crash detection system, a threshold number of wheel slips and/or skids being sampled within a threshold sampling period (indicating slippery conditions), sensor metrics indicative of a rollover condition, a sudden stop (indicating a collision), a departure from the road (indicating a pulled over vehicle), etc.

To provide an illustrative example based upon a traffic accident, if a first vehicle carrying a first computing device 300 is slowed down due to a traffic accident, then the one or more sensor metrics sampled by sensor array 326 may indicate the speed of the first vehicle over a period of time. If the one or more sensor metrics indicate that the first vehicle's speed is below the speed limit by some threshold amount or proportion thereof (e.g., 20 mph in a 55 mph zone, 50% of the posted speed limit, etc.) and this is maintained for a threshold duration of time (e.g., 30 seconds, one minute, two minutes, etc.) then controller 340 may, upon execution of anomalous condition detection routine 358, conclude that an anomalous condition has been detected.

Additionally or alternatively, controller 340 may, in this example, upon execution of anomalous condition detection routine 358, conclude that an anomalous condition has been detected based upon image, audio, and/or video data captured by one or more cameras or other imaging devices and/or a microphone. For instance, upon execution of anomalous condition detection routine 358, controller 340 may conclude that a traffic accident has occurred based upon one or more images taken forward of a vehicle (e.g., vehicle 202.1) by a camera (e.g., camera 212 of mobile computing device 204.1 mounted in vehicle dashboard cradle 210, where mobile computing device 204.1 may be an implementation of the first computing device 300). This anomalous condition may also be correlated to the geographic location associated with the geographic location data due to synchronization between the geographic location data and the sampled telematics data.

Further continuing this example, upon determination of the anomalous condition, alert notification application 346 may broadcast a notification indicating the detected anomalous condition, the telematics data, the geographic location data associated with the detected anomalous condition, and/or the image, audio, and/or video data. In one aspect, a second vehicle equipped with a second computing device 300 may receive this data and further determine whether the anomalous condition is relevant based upon the geographic relationship between the first and second devices, which is further discussed below. If the anomalous condition is relevant, then the second computing device 300 may generate an alert indicating the anomalous condition.

To provide another example by modifying the details of the previous one, aspects may include computing device 300 broadcasting telematics data, geographic location data, and/or image, audio, and/or video data but not notification data. In accordance with such aspects, upon such broadcasted data being received by a second computing device 300 (e.g., a mobile computing device in a second vehicle, an external computing device, a smart infrastructure component, etc.) the second computing device 300 may determine the relevance of the anomalous condition based upon the geographic relationship between itself and the first computing device 300.

If the second computing device 300 determines that an anomalous condition, even if present, would be irrelevant or inapplicable based upon the distance between these devices, the second computing device 300 may ignore the telematics data and/or the image, audio, and/or video data, thereby saving processing power and battery life. However, if the second computing device 300 determines that the geographic location data indicates a potentially relevant anomalous condition, the second computing device 300 may further process the telematics data and/or the image, audio, and/or video data and take the appropriate relevant action if an anomalous condition is found (e.g., issue an alert notification, generate an alert, display a warning message, etc.).

To provide yet another example by further modifying the details in the previous two, aspects may include first computing device 300 broadcasting the telematics data, the geographic location data, and/or the image, audio, and/or video data to an external computing device (e.g., to external computing device 206 via network 201, as shown in FIG. 2). In addition, the second computing device 300 associated with the second vehicle may likewise broadcast telematics data, geographic location data, and/or image, audio, and/or video data to the external computing device. In accordance with such aspects, the external computing device may determine whether an anomalous condition exists and is relevant to one or more of the first and/or second computing devices 300 based upon, for example, a geographic relationship between the first and second computing devices 300. When relevant, external computing device may be configured to send alert notifications to the first and/or second computing devices 300, which may include any suitable type of communications such as push notifications, a short messaging service (SMS) message, an email, a notification that is used in conjunction with the OS running on each receptive computing device 300, etc. Upon receiving the notification from the external computing device, the first and/or second computing device 300 may generate an alert indicating, for example, a description of the anomalous condition and/or its location.

The geographic relationship between two or more computing devices 300 may be utilized in several ways to determine the relevance of the anomalous condition. For instance, current speed, location, route, destination, and/or direction of travel of a first vehicle (collecting and/or associated with the telematics data and/or the image, audio, and/or video data) may be individually or collectively compared with current speed, location, route, destination, and/or direction of travel of a second vehicle traveling on the road. As one example of utilization of the geographic relationship, the first vehicle location, current route, and/or destination (where the first vehicle may be associated with a travel or traffic event) may be compared with a second vehicle location, current route, and/or destination to determine whether the second vehicle should divert course or slow down to alleviate the risk of the second vehicle being involved in a collision or a traffic jam (as a result of the travel or traffic event that is identified by the telematics data and/or the image, audio, and/or video data).

As another example of the geographic relationship, a radius from one vehicle or a line-of-sight distance between vehicles may be utilized and compared to a threshold distance. For example, if computing device 300 is implemented as an external computing device and determines a line-of-sight distance between a first and second vehicle to be less than a threshold distance (e.g., a half mile, one mile, etc.), then the external computing device may issue an alert notification to both vehicles. In this way, an external computing device may act as an alert management device, processing data and sending notifications to those devices for which a detected anomalous condition is relevant.

In another example of the geographic relationship, the geographic location data may be correlated with a map database to associate the anomalous condition with a road and to determine the relevance of the anomalous condition based upon other vehicles sharing the road. The map database may be stored, for example, in a suitable portion of computing device 300 (e.g., data storage 360) or retrieved via communications with one or more external computing devices. To provide an illustrative example, a computing device 300 may be implemented as an external computing device. The external computing device may determine, from telematics data and geographic location data received from a first computing device 300, that a first vehicle is located on a highway at a certain geographic location. If the external computing device determines that a second computing device 300 in a vehicle travelling on the same highway is within a threshold distance approaching the first vehicle, then the external computing device may issue an alert notification to the second vehicle.

In yet other aspects, the geographic location data may be correlated with a geofence database to determine the relevance of the anomalous condition based upon whether other vehicles are located inside the geofence. The geofence database may be stored, for example, in a suitable portion of computing device 300 (e.g., data storage 360) or retrieved via communications with one or more external computing devices. To provide another illustrative example, a computing device 300 may be implemented as an external computing device. The external computing device may determine, from telematics data and geographic location data received from a first computing device 300, that a first vehicle is located on a highway at a certain geographic location. The external computing device may calculate a geofence having a shape substantially matching the road upon which the first vehicle is travelling.

The geofence may be calculated as having any suitable shape such that the appropriate vehicles are notified of the detected anomalous condition. For example, the geofence shape may follow the contours of the road and extend ahead of the first vehicle and behind the first vehicle some threshold distances, which may be the same or different than one another. To provide another example, the geofence shape may include other arterial roads that feed into the road upon which the first vehicle is travelling, roads anticipated to be impacted by the anomalous condition, etc.

In some aspects, the geofence may be adjusted or modified based upon a change in the location of computing device 300. This change may be triggered using any suitable data indicative of potentially increasing road densities, such as changes in population density data associated with the geographic location of the computing device 300, changes in a type of road upon which computing device 300 is determined to be travelling, etc.

For example, a first computing device 300 may be implemented as a mobile computing device and associated with a first vehicle, while a second computing device 300 may be implemented as an external computing device. The external computing device may calculate an initial geofence as a threshold distance radius centered about the first vehicle's location. The geographic location data corresponding to the first vehicle's location may have associated population density data that is correlated with locally stored data or data retrieved by the external computing device. When the population density data surpasses a threshold density value, the shape of the geofence may be adjusted from the radius centered about the first vehicle's location to include only the road upon which the first vehicle is travelling. In this way, computing device 300 may prevent false alert notifications from being sent to other vehicles travelling in close proximity to the first vehicle, but on nearby roads unaffected by the detected anomalous condition.

To provide another illustrative example, as previously discussed, one or more cameras integrated as part of sensor array 326 may store image and/or video data from a vantage point within a vehicle in which mobile computing device 300 is mounted to act as a dashboard camera. Additionally or alternatively, a microphone (e.g., an implementation of speaker/microphone 322) may capture audio data that may also be stored as previously discussed. In accordance with such aspects, anomalous condition detection routine 358 may include instructions, that when executed by controller 340, facilitate the analysis of the image, audio, and/or video data to detect one or more anomalous conditions that may pose an immediate threat to the driver. These anomalous objects may also be identified as a travel or traffic event, as previously discussed. This analysis may be performed in accordance with, for example, any suitable object recognition and/or image analysis to detect, for example, images in the path of the vehicle, such as animals, pedestrians, other vehicles, potholes, etc.

Upon detecting an anomalous object, mobile computing device 300 may issue the appropriate alert via display 316 and/or sound an alarm via speaker/microphone 322. Additionally or alternatively, mobile computing device 300 may, upon detecting an anomaly, broadcast one or more signals via communication unit 330, which are received directly or indirectly by other mobile computing devices. Again, these other mobile computing devices may then generate alert notifications locally when close to the geographic location of mobile computing device 300 where the signal was broadcasted. Aspects in which the detected anomalous condition is shared in this manner may be particularly useful when the identified anomaly is likely to threaten other drivers using the same road, such as potholes or objects blocking the roadway, for example.

Although FIG. 3 depicts controller 340 as including one program memory 302, one MP 306, and one RAM 308, controller 340 may include any suitable number of each of program memory 302, MP 306, and RAM 308. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

Exemplary Screenshots of an Alert Notification Application

Figure 4A:
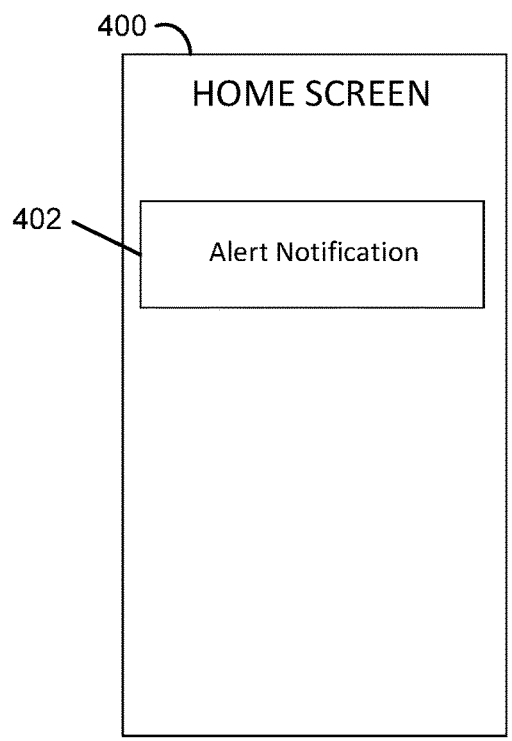
FIG. 4A illustrates an exemplary mobile computing device home screen 400 in accordance with an exemplary aspect of the present disclosure.

FIG. 4A illustrates an example mobile computing device home screen 400 in accordance with an exemplary aspect of the present disclosure. In various aspects, home screen 400 is displayed on a mobile computing device, such as mobile computing device 110 or one of mobile computing devices 204.1 or 204.2, as shown in FIGS. 1 and 2, respectively. In accordance with such aspects, home screen 400 may be displayed as part of a device display, such as display 316, for example, as shown in FIG. 3.

Home screen 400 may be displayed as a default screen on a mobile computing device. In one embodiment, home screen 400 may facilitate a lock screen of a mobile computing device. Lock screens may be typically displayed when a user locks the mobile computing device to enter a lock screen mode (e.g., by pressing a physical button). Additionally or alternatively, the mobile computing device may revert to the lock screen when inactive for a threshold period of time. The lock screen prevents a user from using a portion of the mobile computing device functionality. For example, a lock screen might prevent a mobile computing device in a user's pocket from accidentally sending SMS messages or phone calls.

Although lock screens typically limit the functionality of the device when enabled, it may be desirable for certain applications to provide a user with some functionality via the lock screen. For example, if the mobile computing device is used to play music, a lock screen overlay could allow a user to change tracks, pause a track, or adjust the volume level without unlocking the phone. In accordance with some aspects, alert notification 402 may be displayed as part of a home screen and/or lock screen of a mobile computing device, as shown in FIG. 4A.

Although alert notification 402 may be displayed as part of home screen 400, other aspects include alert notification 402 being displayed as part of a notification system separate from home screen 400. For example, some mobile phone operating systems (e.g., the Android OS) implement a universal "pull-down" notification system where all incoming notifications are displayed. In these notification systems, new notifications are initially previewed in a notification bar at the top of the phone display, and a user may pull down the notification bar (e.g., by using a swiping gesture) to access the details of any received notifications. In one aspect, alert notification 402 may be displayed as part of a notification bar type notification.

As previously discussed with reference to FIG. 3, a device running the alert notification application may be configured to determine whether an anomalous condition has been detected and/or to receive alert notifications sent by other devices that have done so. In accordance with such aspects, alert notification 402 is a block diagram representation of what may be generated upon detection of an anomalous condition and/or receiving an indication that an anomalous condition has been detected. Alert notification 402 may be implemented as any suitable graphic, label, text, description, etc., to convey this to a user. In one embodiment, alert notification 402 may be interactive and may facilitate a user selection via an appropriate gesture (e.g., swiping, tapping, etc.).

Figure 4B:
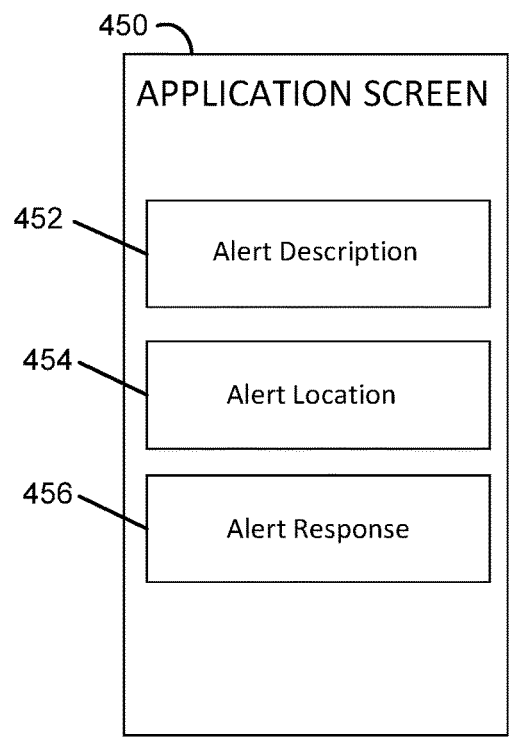
FIG. 4B illustrates an exemplary mobile computing device application screen 450 in accordance with an exemplary aspect of the present disclosure.

FIG. 4B illustrates an example mobile computing device application screen 450 in accordance with an exemplary aspect of the present disclosure. In various aspects, application screen 450 may be displayed on a mobile computing device, such as mobile computing device 110 or one of mobile computing devices 204.1 or 204.2, as shown in FIGS. 1 and 2, respectively. In accordance with such aspects, application screen 450 may be displayed as part of a device display, such as display 316, for example, as shown in FIG. 3.

In one aspect, application screen 450 may be displayed upon a user selecting alert notification 402 from home screen 400. Application screen 450 may include an alert description 452, an alert location 454, and an alert response 456. Alert description 452 is a block diagram representation of one or more descriptions of the alerts related to the detected anomalous condition. Alert description 452 may be implemented as any suitable image, video, audio, graphic, label, text, description, etc., to convey this to a user. For example, alert description 452 may include a text description such as "slow traffic ahead," "traffic at standstill ahead," "unpaved road ahead," "potential icy conditions ahead," "pulled over vehicle ahead," "vehicle accident ahead," "pedestrian 500 feet ahead," "animal 1 block ahead," etc. In another aspect, alert description 452 may include an image of the detected anomalous condition, such as an image of a vehicle accident or other hazard forward of a vehicle (e.g., vehicle 202.1), for example.

Alert location 454 is a block diagram representation of one or more descriptions of the location of the anomalous condition. Alert location 454 may be implemented as any suitable image, video, audio, graphic, label, text, description, etc., to convey this to a user. For example, alert location 454 may include a directional compass indicating a direction towards the anomalous condition from the mobile computing device displaying application screen 450. To provide additional examples, alert location 454 may include a distance to the anomalous condition, a map overlaid with the location of the mobile computing device displaying application screen 450 to indicate the position of the mobile computing device in relation to the anomalous condition, the threshold distances and/or geofences used to determine the relevance of the anomalous condition, an image indicating the position of the mobile computing device in relation to the anomalous condition, etc.

Alert response 456 is a block diagram representation of one or more descriptions of a directed response to the anomalous condition. Alert response 456 may be implemented as any suitable image, video, audio, graphic, label, text, description, etc., to convey this to a user. For example, alert response 456 may include a text indication to "stop for pedestrian ahead," a map, image, video, audio, or other indication of an anomalous condition in a vicinity of a vehicle so as to inform a driver of the vehicle how to avoid the anomalous condition, etc.

Method of Generating and Broadcasting Telematics Data

As noted herein, telematics data associated with a first vehicle may be collected in real-time by a mobile device of a first driver. The mobile device may be specifically configured to gather or generate telematics and/or other driver/vehicle data in real-time as the vehicle is traveling. If a traffic event is encountered, about to be encountered, and/or expected or anticipated to be encountered by the vehicle as it travels, the telematics data collected may indicate such. The mobile device itself may be configured to identify the type of traffic event and transmit the type of traffic event to other mobile devices, a remote server, smart vehicles, and/or smart infrastructure. Additionally or alternatively, the mobile device may transmit the telematics data to other devices for analysis of the telematics data transmitted at those other devices (e.g., mobile devices, a remote server, smart vehicles, and/or smart infrastructure).

In one aspect, a computer-implemented method of generating and broadcasting telematics (and/or other) data may be provided. The method may include: (1) generating and/or collecting, at or by a mobile device and/or smart vehicle controller, telematics data associated with a first vehicle; (2) analyzing or reviewing, at or via the mobile device and/or smart vehicle controller, the telematics data associated with the first vehicle to determine that a travel event associated with the first vehicle exists (that is revealed by the telematics data); (3) generating, at or via the mobile device and/or smart vehicle controller, a warning message (such as either visual or audible alert) associated with or detailing the travel event; and/or (4) transmitting or broadcasting (via wireless communication and/or data transmission), at or from the mobile device and/or smart vehicle controller, the warning message associated with or detailing the travel event to (i) a second mobile device associated with a second driver, (ii) a second smart vehicle controller of a second vehicle associated with the second driver, (iii) smart infrastructure, and/or (iv) a remote server such that telematics data generated and/or collected by the mobile device or smart vehicle controller (and associated with the first (traveling) vehicle) may be used to facilitate safer driving and vehicle travel for other vehicles and drivers. The method may include additional, fewer, or alternate actions, including those discussed elsewhere herein.

For example, the mobile device and/or smart vehicle controller may further (i) determine or extract a GPS or other location of the travel event, (ii) determine vehicles in the vicinity of the travel event (such as within a certain distance, e.g., 1 or 2 miles), and/or (iii) transmit the warning message to the vehicles in the vicinity of the travel event (or to mobile devices associated with owners of those vehicles). The mobile device and/or smart vehicle controller may further (i) determine or extract a GPS or other location of the travel event, (ii) determine vehicles in the vicinity of the travel event, (iii) calculate or determine alternate routes for the vehicles in the vicinity of the travel event (or to mobile devices associated with owners of those vehicles), and/or (iv) transmit the alternate routes to the vehicles in the vicinity of the travel event (or to mobile devices associated with owners of those vehicles) to facilitate re-routing traffic to safer travel routes using the telematics data gathered from an initial vehicle or mobile device involved with a travel event.

Exemplary End-User: Receiving & Analyzing Telematics Data

In one aspect, a computer-implemented method of using telematics (and/or other) data may be provided. The method may include (a) receiving telematics (and/or other) data, at or by (1) a mobile device associated with a driver or (2) a smart vehicle controller of a vehicle associated with the driver, via wireless communication and/or data transmission, the telematics data being generated by a second mobile device or second smart vehicle associated with a second driver; (b) analyzing the telematics data, at or via the mobile device (or smart vehicle controller); (c) determining, at or via the mobile device (or smart vehicle controller), that an abnormal travel condition (or traffic event) exists from the analysis of the telematics (and/or other) data; and/or (d) when the abnormal travel condition (or traffic event) exists, automatically taking a preventive or corrective action, at or via the mobile device (or smart vehicle controller), that alleviates a negative impact of the abnormal travel condition (or traffic event) on the driver and/or the vehicle to facilitate safer and/or more efficient vehicle travel. The method may include additional, fewer, or alternate actions, including those discussed elsewhere herein.

For example, the abnormal condition may be based upon (and/or determined from telematics (and/or other) data that reveals) vehicle, traffic, congestion, road construction, and/or weather conditions. The telematics (and/or other) data (1) may be generated and/or collected by a second mobile device and/or a second smart vehicle (or second smart vehicle controller) associated with another driver, and/or (2) may include speed, acceleration, deceleration, location, lane information, and/or other data of, or associated with, the second mobile device, second smart vehicle, and/or one or more other vehicles. Additionally or alternatively, the telematics (and/or other) data (1) may be generated and/or collected by a second mobile device and/or a second smart vehicle (or second smart vehicle controller) associated with another driver, and/or (2) may include time, braking, acceleration, left turn, right turn, heading, GPS (Global Positioning System) speed, GPS latitude and longitude, gyroscope, battery level, and/or telephone usage information or data of, or associated with, the second mobile device, second smart vehicle, and/or one or more other vehicles.

The preventive or corrective action taken may be: (i) generating or determining an alert, at or via the mobile device (and/or smart vehicle controller); (ii) presenting a visual alert, at or via the mobile device (and/or smart vehicle controller), on a display or display screen associated with the mobile device (and/or smart vehicle controller); and/or (iii) providing an audio or audible alert, at or via the mobile device (and/or smart vehicle controller). The alert may be presented or provided only after the mobile device (or smart vehicle controller) determines that the abnormal travel condition (or traffic event) is relevant to the vehicle, such as by determining that a location of the abnormal travel condition (or traffic event) is in the vicinity of the vehicle and/or along a route that the vehicle is presently traveling. Additionally or alternatively, the preventive or corrective action taken may be: (i) generating, determining, and/or receiving an alternate travel route that avoids a GPS location of the travel or traffic event, at or via the mobile device (and/or smart vehicle controller); and/or (ii) presenting the alternative travel route, at or via the mobile device (and/or smart vehicle controller), on a display or display screen for use by the driver; and/or providing audio driving directions for the vehicle to travel along the alternate route. The preventive or corrective action taken may be: (i) generating, determining, and/or receiving an alternate travel route that avoids a GPS location of the travel or traffic event, at or via the mobile device (and/or smart vehicle controller); and/or (ii) automatically directing the vehicle to take or follow the alternative travel route, at or via the mobile device (and/or smart vehicle controller), such as by directing an autonomous vehicle to automatically take the alternate travel route.

The telematics data may be generated and/or collected by a second mobile device and/or a second smart vehicle (or second smart vehicle controller). The telematics (and/or other) data may be (1) generated and/or collected by a second mobile device and/or a second smart vehicle (or second smart vehicle controller), and/or (2) transmitted from the second mobile device and/or second smart vehicle directly to the mobile device (and/or smart vehicle controller) via wireless communication and/or data transmission (such as via peer-to-peer (P2P) communication). Additionally or alternatively, the telematics (and/or other) data may be (1) generated and/or collected by a second mobile device and/or a second smart vehicle (or second smart vehicle controller), and/or (2) transmitted from the second mobile device and/or second smart vehicle directly to a remote server (such as an insurance provider remote server), and then relayed or transmitted from the remote server to the mobile device (and/or smart vehicle controller) via wireless communication and/or data transmission.

The telematics (and/or other) data may be (1) generated and/or collected by a second mobile device and/or a second smart vehicle (or smart vehicle controller), and/or (2) transmitted from the second mobile device and/or second smart vehicle directly to smart infrastructure (such as a smart stop sign, smart street sign, smart toll both, and/or smart roadside equipment, markers, or reflectors), and then relayed or transmitted from the smart infrastructure to the mobile device (and/or smart vehicle controller) via wireless communication and/or data transmission. Additionally or alternatively, the telematics (and/or other) data may be (1) generated and/or collected by a second mobile device and/or a second smart vehicle (or second smart vehicle controller), and/or (2) transmitted from the second mobile device and/or second smart vehicle directly or indirectly to the mobile device (and/or smart vehicle controller), such as via (a) vehicle-to-vehicle wireless communication, (b) peer-to-peer (e.g., mobile device-to-mobile device) wireless communication, (c) vehicle-to-infrastructure wireless communication, and/or (d) infrastructure-to-vehicle wireless communication (and/or data transmission).

Exemplary End-User/Destination Devices

In one aspect, a computer-implemented method of using telematics and/or other data may be provided. The method may include (a) receiving telematics data, at or by (1) a mobile device associated with a driver, and/or (2) a smart vehicle controller of a vehicle associated with the driver, via wireless communication and/or data transmission; (b) determining, at or via the mobile device (or smart vehicle controller), (i) a travel (or traffic) event, or that the travel event exists, from analysis of the telematics data, and/or (ii) that a travel event message or warning associated with the travel event exists within, or is embedded within, the telematics data; and/or (c) if the travel event exits, automatically taking a preventive or corrective action, at or via the mobile device (or smart vehicle controller), that alleviates a negative impact of the travel event on the driver or vehicle to facilitate safer and/or more efficient vehicle travel. The method may include additional, fewer, or alternate actions, including those discussed elsewhere herein and/or directly above.

In another aspect, a computer-implemented method of using telematics data may be provided. The method may include (a) receiving a notification that an abnormal travel condition (or traffic event) exists, at or by (1) a mobile device associated with a driver, and/or (2) a smart vehicle controller of a vehicle associated with the driver, via wireless communication and/or data transmission, the notification being determined from telematics data collected or generated by (i) a second mobile device, and/or (ii) second smart vehicle (or smart vehicle controller) associated with a second driver; and/or (b) when the abnormal travel condition (or traffic event) exists, automatically taking a preventive or corrective action, at or via the mobile device (or smart vehicle controller), that alleviates a negative impact of the abnormal travel condition (or traffic event) on the driver and/or the vehicle to facilitate safer and/or more efficient vehicle travel. The abnormal condition (or traffic event) may be based upon (and/or determined from telematics data that reveals) vehicle, traffic, congestion, road construction, and/or weather conditions, and the notification defines the type of abnormal condition (or traffic event) and/or an extent of the abnormal condition (or traffic event), such as by (a) length of time, or (b) size or area impacted by the abnormal condition (or traffic event). The telematics (and/or other) data may include speed, acceleration, deceleration, location, lane information, and/or other data of, or associated with, the second mobile device, second smart vehicle, and/or one or more other vehicles. The telematics (and/or other) data may include time, braking, acceleration, left turn, right turn, heading, GPS (Global Positioning System) speed, GPS latitude and longitude, gyroscope, battery level, and/or telephone usage information or data of, or associated with, the second mobile device, second smart vehicle, and/or one or more other vehicles. The method may include additional, fewer, or alternate actions, including those discussed elsewhere herein.

In another aspect, a computer-implemented method of using telematics (and/or other) data may be provided. The method may include: (a) receiving telematics and/or other data (and/or other electronic communications or wireless messages), at or by (1) a mobile device associated with a driver, and/or (2) a smart vehicle controller of a vehicle associated with the driver, via wireless communication and/or data transmission; (b) determining, at or via the mobile device (or smart vehicle controller), that a travel (or traffic) event message or warning associated with a travel (or traffic) event exists within, or is embedded within, the telematics and/or other data (and/or other electronic communications or wireless messages), the travel (or traffic) event being determined from telematics and/or other data collected or generated by a second mobile device associated with a second driver (or a second smart vehicle controller of another vehicle associated with the second driver); and/or (c) if so, (i) presenting the travel (or traffic) event message or warning, at or via the mobile device (or smart vehicle controller), on a display or display screen associated with the mobile device (or smart vehicle controller); and/or (ii) providing an audible or audio alert associated with the travel (or traffic) event message or warning to alleviate a negative impact of the travel (or traffic) event on the driver and/or the vehicle to facilitate safer and/or more efficient vehicle travel.

The travel (or traffic) event message or warning may be presented only after the mobile device (or smart vehicle controller) determines that the traffic event message or warning is relevant to the vehicle, such as by determining that a location of the travel (or traffic) event is in the vicinity of the vehicle, a GPS position associated with the vehicle, and/or along a route that the vehicle is traveling. The telematics and/or other data may be transmitted from the second mobile device and/or second smart vehicle directly or indirectly to the mobile device (and/or smart vehicle controller), such as via (a) vehicle-to-vehicle wireless communication, (b) peer-to-peer (e.g., mobile device-to-mobile device) wireless communication, (c) vehicle-to-infrastructure wireless communication, and/or (d) infrastructure-to-vehicle wireless communication (and/or data transmission). The method may include additional, fewer, or alternate actions, including those discussed elsewhere herein.

Exemplary Smart Infrastructure or Remote Server

In one aspect, a computer-implemented method of using telematics (and/or other) data may be provided. The method may include: (1) receiving telematics data, at or by a remote server, and/or smart infrastructure (or associated equipment or processors), via wireless communication and/or data transmission, the telematics data being generated, collected, and/or transmitted by (a) a mobile device associated with a driver, and/or (b) a smart vehicle controller of a vehicle associated with the driver; (2) analyzing or reviewing, at or via the remote server and/or smart infrastructure, the telematics data received from the mobile device and/or smart vehicle controller to determine that a travel event associated with the vehicle or driver exists (that is revealed by the telematics data); (3) generating, at or via the remote server and/or smart infrastructure, a warning message (such as either visual or audible alert) associated with or detailing the travel event; and/or (4) transmitting (via wireless communication and/or data transmission), at or from the remote server and/or smart infrastructure, the warning message associated with or detailing the travel event to (i) a second mobile device associated with a second driver, and/or (ii) a second smart vehicle controller of a second vehicle associated with the second driver such that telematics data generated and/or collected by one mobile device or vehicle may be used to facilitate safer driving and vehicle travel for other vehicles and drivers. The method 808 may include additional, fewer, or alternate actions, including those discussed elsewhere herein.

For example, the remote server and/or smart infracture may further (i) determine or extract a GPS or other location of the travel event, (ii) determine vehicles in the vicinity of the travel event (such as within a certain distance, e.g., 1 or 2 miles), and/or (iii) transmit the warning message to the vehicles in the vicinity of the travel event (or to mobile devices associated with owners of those vehicles). The remote server and/or smart infracture may further (i) determine or extract a GPS or other location of the travel event, (ii) determine vehicles in the vicinity of the travel event, (iii) calculate or determine alternate routes for the vehicles in the vicinity of the travel event (or to mobile devices associated with owners of those vehicles), and/or (iv) transmit the alternate routes to the vehicles in the vicinity of the travel event (or to mobile devices associated with owners of those vehicles) to facilitate re-routing traffic to safer travel routes using the telematics data gathered from an initial vehicle or mobile device involved with a travel event.

Exemplary Computer Server or Smart Infrastructure

In one aspect, a computer server (or smart infrastructure) configured to re-route traffic using telematics and/or other data may be provided. The computer server may include (1) a receiver configured to receive telematics data via wireless communication and/or data transmission, the telematics data being generated and transmitted by a first mobile device and/or first vehicle; (2) a processor configured to analyze the telematics data received to determine a travel or traffic events associated with the first mobile device and/or first vehicle exists, wherein the processor is further configured to generate a warning message associated with the travel or traffic event (such as a virtual, visual, haptic, or audible alert); and/or (3) a transmitter configured to transmit the warning message to a second mobile device and/or second vehicle via wireless communication and/or data transmission to facilitate safer travel of the second vehicle using telematics data gathered, collected, or generated by the first mobile device and first vehicle. The processor may be configured to calculate or determine an alternate route that bypasses the travel or traffic event, and direct a transmission of the alternate route to the second mobile device and/or second vehicle via wireless communication and/or data transmission. The computer server and/or smart infrastructure may include additional, fewer, and/or alternate components (and functionality), including those discussed elsewhere herein.

Exemplary Source Mobile Device Generating & Transmitting the Telematics Data

In one aspect, a mobile device configured for telematics and/or other data collection, generation, and/or transmission may be provided. The mobile device may include (1) a processor configured to collect acceleration, braking, gyroscope, compass heading, turning, speed, and/or location-related data of a traveling vehicle at least once every second (i.e., approximately constantly or otherwise periodically), the processor further configured to generate a broadcast and/or wireless communication message that incorporates the acceleration, braking, gyroscope, compass heading, turning, speed, and/or location-related data collected; and/or (2) a transmitter configured to transmit via wireless communication or data transmission the broadcast and/or wireless communication message to nearby vehicles and/or roadside infrastructure to facilitate safer vehicle travel for other vehicles using the telematics data of the traveling vehicle collected and transmitted by the mobile device. The mobile device may be configured with additional, less, or alternate functionality, including that discussed elsewhere herein.

Exemplary End-User Device: Listening for Telematics Broadcast

In one aspect, a mobile device configured to listen for a telematics data transmission and then receive that transmission may be provided. The mobile device may include (1) a processor configured to listen for a telematics data broadcast or transmission transmitted by a nearby vehicle and/or roadside infrastructure, the telematics data including acceleration, braking, gyroscope, compass heading, turning, speed, and/or location-related data of a traveling vehicle at least once every second (i.e., approximately, constantly or otherwise periodically), the processor further configured to turn on a receiver when it is determined that the telematics broadcast or transmission exists (and/or is within reception range); and/or (2) a receiver configured to receive via wireless communication or data transmission the telematics data broadcast or transmission transmitted from the nearby vehicle and/or roadside infrastructure, wherein the processor is further configured to analyze telematics data embedded within the telematics data broadcast or transmission to determine (i) that a travel or traffic event associated with another vehicle has occurred; and/or (ii) a location of the travel or traffic event, and if a relevant travel or traffic event is determined by the processor to be in the vicinity (such as within a few blocks or a few miles), and/or along a current route, of the mobile device or an associated vehicle, the processor takes or directs a corrective or preventive action to facilitate safer vehicle travel for the vehicle by using the telematics data of another vehicle collected and transmitted within the telematics data broadcast or transmission. The corrective or preventive action may be to generate a warning or alert (such as either visual or audible) to a driver of the vehicle. The corrective or preventive action may be to generate an alternate route for the vehicle that avoids a GPS location of the travel or traffic event, and/or then re-routes the vehicle to avoid the travel or traffic event. The mobile device may include additional, less, or alternate functionality, including that discussed elsewhere herein.

Exemplary Remote Server

In one aspect, a remote server configured to use telematics and/or other data from one driver to facilitate safer vehicle travel for another driver may be provided. The remote server may include (1) a receiver (or transceiver) configured to receive a data transmission and/or wireless communication containing or including telematics data, the telematics data being generated and/or transmitted from a first mobile device and/or first smart vehicle (associated with a first driver); (2) a database and/or memory unit storing vehicle navigation information, virtual road maps, and/or computer-readable instructions; (3) a processor configured to access the database and/or memory unit, wherein the processor is configured to automatically identify or determine (i) a travel (or traffic) event; (ii) a GPS or other location of the travel event; and/or (iii) an estimated or actual geographical and/or temporal scope of the travel event from computer analysis of the telematics data, the processor further being configured to generate a travel event-related data transmission and/or wireless communication associated with, corresponding to, and/or detailing the travel event, and/or location and/or extent thereof; and/or (4) a transmitter (or transceiver) configured to transmit the travel event-related data transmission and/or wireless communication to a second mobile device and/or second smart vehicle (associated with a second driver of a second vehicle) to facilitate the second mobile device and/or second smart vehicle taking corrective action to enable safer vehicle travel for the second driver based upon the telematics date associated with the first driver. The remote server may include additional, less, or alternate functionality, including that discussed elsewhere herein and/or below.

Exemplary Smart Road-Side Infrastructure

In another aspect, a smart road-side infrastructure processor or server configured to use telematics and/or other data from one driver to facilitate safer vehicle travel for another driver may be provided. The smart road-side infrastructure processor or server may include (1) a receiver (or transceiver) configured to receive a data transmission and/or wireless communication containing or including telematics data, the telematics data being generated and/or transmitted from a first mobile device or first smart vehicle (associated with a first driver); (2) a database and/or memory unit storing vehicle navigation information, virtual road maps, and/or computer-readable instructions; (3) a processor configured to access the database and/or memory unit, wherein the processor is configured to automatically identify or determine (i) a travel (or traffic) event; (ii) a GPS or other location of the travel event; and/or (iii) an estimated or actual geographical and/or temporal scope of the travel event from computer analysis of the telematics data, the processor further being configured to generate a travel event-related data transmission and/or wireless communication associated with, corresponding to, and/or detailing the travel event, and/or location and/or extent thereof; and/or (4) a transmitter (or transceiver) configured to transmit the travel event-related data transmission and/or wireless communication to a second mobile device and/or second smart vehicle (associated with a second driver of a second vehicle) to facilitate the second mobile device and/or second smart vehicle taking corrective action to enable safer vehicle travel for the second driver based upon the telematics date associated with the first driver. The smart road-side infrastructure may include additional, less, or alternate functionality, including that discussed elsewhere herein and/or below.

Exemplary Intermediate Mobile Device/Smart Vehicle

In one aspect, an intermediate mobile device or smart vehicle configured to use telematics and/or other data from one driver to facilitate safer vehicle travel for another driver may be provided. The intermediate mobile device or smart vehicle may include (1) a receiver (or transceiver) configured to receive a data transmission and/or wireless communication containing or including telematics data, the telematics data being generated and/or transmitted from a first (or source) mobile device or first (or source) smart vehicle (associated with a first driver); (2) a database and/or memory unit storing vehicle navigation information, virtual road maps, and/or computer-readable instructions; (3) a processor configured to access the database and/or memory unit, wherein the processor is configured to automatically identify or determine (i) a travel (or traffic) event; (ii) a GPS or other location of the travel event; and/or (iii) an estimated or actual geographical and/or temporal scope of the travel event from computer analysis of the telematics data, the processor further being configured to generate a travel event-related data transmission and/or wireless communication associated with, corresponding to, and/or detailing the travel event, and/or location and/or extent thereof; and/or (4) a transmitter (or transceiver) configured to transmit the travel event-related data transmission and/or wireless communication to a second (or destination) mobile device and/or second (or destination) smart vehicle (associated with a second driver of a second vehicle), such as via peer-to-peer (P2P) communication, to facilitate the second (or destination) mobile device and/or second (or destination) smart vehicle taking corrective action to enable safer vehicle travel for the second driver based upon the telematics data associated with the first driver. The intermediate mobile device or smart vehicle may include additional, less, or alternate functionality, including that discussed elsewhere herein and/or directly below.

For instance, for the (a) remote server, (b) smart road-side infrastructure, and/or (c) intermediate mobile device or smart vehicle mentioned above, the travel (or traffic) event may be based upon (and/or determined from telematics data that reveals) vehicle, traffic, congestion, road construction, and/or weather conditions. The telematics data may include speed, acceleration, deceleration, location, lane information, and/or other data of, or associated with, the first mobile device and/or first smart vehicle. The telematics data may include time, braking, acceleration, left turn, right turn, heading, GPS (Global Positioning System) speed, GPS latitude and longitude, gyroscope, battery level, and/or telephone usage information or data of, or associated with, the first mobile device and/or first smart vehicle.

The preventive or corrective action taken may be: generating or determining an alert, at or via the second mobile device and/or second smart vehicle (or second smart vehicle controller); presenting a visual alert, at or via the second mobile device and/or second smart vehicle (or second smart vehicle controller), on a display or display screen associated with the mobile device (and/or smart vehicle controller); and/or providing an audible alert, at or via the second mobile device and/or second smart vehicle. The alert may be presented only after the second mobile device (or second smart vehicle or vehicle controller) determines that the travel event is relevant to the second vehicle, such as by determining that a location of the travel event is in the vicinity of the second vehicle and/or along a route that the second vehicle is presently traveling.

The preventive or corrective action taken may be: generating, determining, and/or receiving an alternate travel route that avoids a GPS location of the travel (or traffic) event, at or via the second mobile device and/or second smart vehicle (or vehicle controller); and/or presenting the alternative travel route, at or via the second mobile device and/or second smart vehicle (or vehicle controller), on a display or display screen for use by the driver. Additionally or alternatively, the preventive or corrective action taken may be: generating, determining, and/or receiving an alternate travel route that avoids a GPS location of the travel (or traffic) event, at or via the second mobile device and/or second smart vehicle (or vehicle controller); and/or automatically directing the second vehicle to take or follow the alternative travel route, at or via the second mobile device and/or second smart vehicle (or vehicle controller), such as by directing an autonomous vehicle to take the alternate travel route.

The (a) remote server, (b) smart road-side infrastructure, and/or (c) intermediate mobile device or smart vehicle may be configured to: listen for a telematics data-related wireless communication and/or data transmission, and when the telematics data-related wireless communication and/or data transmission is detected and/or within range, then (i) receive the telematics data-related wireless communication and/or data transmission; (ii) store associated telematics data in a memory unit; and/or (iii) relay or otherwise re-transmit the telematics data and/or the telematics data-related wireless communication and/or data transmission to other listening devices, such as other vehicles, mobile device, remote servers, and/or smart infrastructure.

Exemplary Source Mobile Device

In one aspect, a mobile device configured to collect and transmit telematics data (such as when the mobile device is traveling in a moving vehicle associated with a first driver) may be provided. The mobile device may include one or more sensors or meters configured for collecting and/or gathering telematics data; a memory unit storing computer readable instructions; a transceiver (or a receiver and transmitter); and a processor interconnected or in communication with the one or more sensors or meters; the memory unit; and/or the transceiver. The processor may be configured to: receive telematics data from the one or more sensors or meters; analyze the telematics data, and determine or identify that a travel or traffic event exists; generate a message (e.g., a data transmission or wireless communication) associated with the telematics data and/or detailing the type and/or extent of the travel or traffic event; and/or direct a transmission of the message via data transmission and/or wireless communication to another computing device (such as another mobile device, another vehicle, a remote server, and/or smart infrastructure processors or servers) to facilitate safer travel for another vehicle and/or a second driver based upon the telematics data collected by the first mobile device.

The travel (or traffic) event may be based upon (and/or determined from telematics data that reveals) vehicle, traffic, congestion, road construction, and/or weather conditions. The telematics and/or other data may include speed, acceleration, deceleration, location, lane information, and/or other data of, or associated with, the first mobile device and/or first smart vehicle. The telematics and/or other data may include time, braking, acceleration, left turn, right turn, heading, GPS (Global Positioning System) speed, GPS latitude and longitude, gyroscope, battery level, and/or telephone usage information or data of, or associated with, the mobile device and/or moving smart vehicle. The mobile device may include additional, less, or alternate functionality, including that discussed elsewhere herein.

Exemplary Source Smart Vehicle (or Smart Vehicle Controller)

In one aspect, a smart vehicle (or vehicle controller) configured to collect and transmit telematics and/or other data (such as when the smart vehicle is traveling, the smart vehicle being associated with a first driver) may be provided. The smart vehicle (or vehicle controller) may include: one or more sensors or meters configured for collecting and/or gathering telematics data; a memory unit storing computer readable instructions; a transceiver (or a receiver and transmitter); and/or a processor interconnected or in communication with the one or more sensors or meters; the memory unit; and/or the transceiver. The processor may be configured to: receive telematics data from the one or more sensors or meters; analyze the telematics data, and determine or identify that a travel or traffic event exists; generate a message (e.g., a data transmission or wireless communication) associated with the telematics data and/or detailing the type and/or extent of the travel or traffic event; and/or direct a transmission of the message via data transmission and/or wireless communication to another computing device (such as a mobile device, another vehicle, a remote server, and/or smart infrastructure processors or servers) to facilitate safer travel for another vehicle and/or a second driver based upon the telematics data collected by the smart vehicle (and/or smart vehicle controller).

The travel (or traffic) event may be based upon (and/or determined from telematics data that reveals) vehicle, traffic, congestion, road construction, and/or weather conditions. The telematics and/or other data may include speed, acceleration, deceleration, location, lane information, and/or other data of, or associated with, the smart vehicle and/or a mobile device of the driver. The telematics and/or other data includes time, braking, acceleration, left turn, right turn, heading, GPS (Global Positioning System) speed, GPS latitude and longitude, gyroscope, battery level, and/or telephone usage information or data of, or associated with, the smart vehicle. The smart vehicle (or vehicle controller) may include additional, less, or alternate functionality, including that discussed elsewhere herein, and/or discussed with mobile devices, remote servers, and/or smart infrastructure.

Exemplary Destination Mobile Device

In one aspect, a mobile device configured to receive telematics and/or other data (such as when the mobile device is traveling in a moving vehicle associated with a first driver) and take corrective action when a travel event exists may be provided. The mobile device may include: a memory unit storing computer readable instructions; a transceiver (or a receiver and transmitter); and/or a processor interconnected or in communication with the memory unit, and/or the transceiver. The processor and/or transceiver may be configured to: receive telematics data generated from an originating vehicle (or mobile device traveling within the originating vehicle) or a telematics-related message via a data transmission and/or wireless communication; (i) analyze the telematics data, and determine or identify that a travel (or traffic) event exists (that is associated with the originating vehicle) or (ii) otherwise determine that the travel event exists from analysis of the telematics-related message; and/or when the travel event is determined to exist, determine whether the travel event is relevant to the moving vehicle and/or a route that the moving vehicle is presently traveling, and if so, take or direct corrective action such that safer vehicle travel for the moving vehicle is facilitated based upon (a) the telematics data that is collected by the originating vehicle and/or (b) information regarding the travel event that the originating vehicle has encountered or is presently encountering.

The travel (or traffic) event may be based upon (and/or determined from the telematics data that reveals) vehicle, traffic, congestion, road construction, and/or weather conditions. The telematics and/or other data may include speed, acceleration, deceleration, location, lane information, and/or other data of, or associated with, the originating vehicle or a mobile device traveling within the originating vehicle. The telematics and/or other data includes time, braking, acceleration, left turn, right turn, heading, GPS (Global Positioning System) speed, GPS latitude and longitude, gyroscope, battery level, and/or telephone usage information or data of, or associated with, the originating vehicle or a mobile device traveling within the originating vehicle. The corrective action may include (i) generating, displaying, and/or providing an alert for the driver of the moving vehicle; and/or (ii) re-routing the moving vehicle to avoid an area associated with the travel event. The mobile device may include additional, less, or alternate functionality, including that discussed elsewhere herein.

Exemplary Destination Smart Vehicle

In one aspect, a smart vehicle (or smart vehicle controller) configured to receive telematics and/or other data (such as when the smart vehicle is traveling, the smart vehicle being associated with a first driver) and take corrective action when a travel event exists may be provided. The smart vehicle (or smart vehicle controller) may include a memory unit storing computer readable instructions, vehicle navigation information, and/or virtual road maps; a transceiver (or a receiver and transmitter); and/or a processor interconnected or in communication with the memory unit, and/or the transceiver. The processor and/or transceiver may be configured to: receive telematics data generated from an originating vehicle (or mobile device traveling within the originating vehicle) or a telematics-related message via a data transmission and/or wireless communication; (i) analyze the telematics data, and determine or identify that a travel (or traffic) event exists (that is associated with the originating vehicle) or (ii) otherwise determine that the travel event exists from analysis of the telematics-related message; and/or when the travel event is determined to exist, determine whether the travel event is relevant to the moving vehicle and/or a route that the moving vehicle is presently traveling (such as by comparing a GPS or other location of the travel event and a present GPS or other location of the smart vehicle), and if so, take or direct corrective action such that safer vehicle travel for the smart vehicle is facilitated based upon (a) the telematics data that is collected by the originating vehicle and/or (b) information regarding the travel event that the originating vehicle has encountered or is presently encountering.

The travel (or traffic) event may be based upon (and/or determined from the telematics data that reveals) vehicle, traffic, congestion, road construction, and/or weather conditions. The telematics data may include speed, acceleration, deceleration, location, lane information, and/or other data of, or associated with, the originating vehicle or a mobile device traveling within the originating vehicle. The telematics data may include time, braking, acceleration, left turn, right turn, heading, GPS (Global Positioning System) speed, GPS latitude and longitude, gyroscope, battery level, and/or telephone usage information or data of, or associated with, the originating vehicle or a mobile device traveling within the originating vehicle. The corrective action may include (i) generating, providing, and/or displaying an alert (such as either an audible or visual alert or recommendation) for the driver of the moving vehicle; (ii) calculating another route to a destination that avoids the travel event and/or displaying that route; (iii) receiving an alternate route that avoids the travel event; and/or (iv) re-routing the moving vehicle to avoid an area associated with the travel event. The smart vehicle (or vehicle controller) may include additional, less, or alternate functionality, including that discussed elsewhere herein, and/or discussed with mobile devices, remote servers, and/or smart infrastructure.

Insurance Applications

As noted herein, the present embodiments may be used to adjust, update, and/or generate insurance policies. Insurance policies, such as auto, usage-based, home, and/or household insurance policies, may be adjusted, updated, and/or generated for insureds or potential customers that have mobile devices and/or vehicles that are equipped or configured with one or more of the functionalities discussed herein.

For instance, insureds or family members may have mobile devices and/or vehicles that are configured to receive telematics data associated with other vehicles and/or abnormal road or travel conditions that other drivers are experiencing. The telematics may be received directly from other vehicles, or indirectly from smart infrastructure and/or insurance provider remote servers. As a result, the insureds and/or their family members may be timely notified of traffic or travel events and then may take alternate routes (or even not drive or delay driving) to lower their risk of getting in an accident due to the traffic or travel events. An insurance provider may promote or reward such risk-averse behavior and/or safer driving with lower insurance premiums, rates, and/or increased discounts, such as for usage-based or other types of auto insurance.

Furthermore, an insurance provider may promote or reward the use of one or more aspects described herein with lower insurance premiums, rates, and/or increased discounts. For example, an insurer may provide discounts or other incentives upon an insured customer installing an application to their mobile computing device that enables the mobile computing device to broadcast telematics data and/or to generate alert notifications based upon telematics data received from other devices.

Additionally or alternatively, an insurer may provide discounts or other incentives upon an amount that an insured customer uses the telematics application on their mobile computing device that enables the mobile computing device to broadcast telematics data and/or to generate alert notifications based upon telematics data received from other devices. Such usage-based discounts or incentives may be based upon amount of time of, or number of miles of, use or usage, e.g., an amount of time or miles that the insured drove during a specific period with a Telematics App running or executing on their mobile device (which was located within the insured vehicle as it travels), the Telematics App configured to collect and broadcast telematics data, and/or to receive telematics data from other vehicles or devices, and generate alerts or recommendations based upon the data received.

Originating Mobile Device Generating the Telematics Data

In one aspect, a computer-implemented method of generating and broadcasting telematics data may be provided. The method may include (1) generating or collecting telematics data at, or by, a originating or source mobile device associated with a driver (or an associated processor), the originating mobile device: (i) having a Telematics Application (or "App") installed or stored locally in a non-transitory computer-readable memory unit, and (ii) is associated with a second driver, the telematics data including acceleration, braking, speed, heading, and location data associated with the operation of an originating vehicle. The method may include (2) generating, at or by the originating mobile device (or associated processor) or the Telematics App, an updated telematics data broadcast (or wireless communication) including up-to-date telematics data at least every few seconds; and/or (3) broadcasting, at or by the origination mobile device (or an associated transceiver) or the Telematics App. The updated telematics data may be broadcast at least every few seconds via wireless communication and/or data transmission (or otherwise via a secure electronic communication network requiring login credential electronic verification) to other computing devices (e.g., nearby vehicles, mobile devices, smart infrastructure, or remote servers) to facilitate the other computing devices (i) determining that an abnormal travel condition (or traffic event) exists from the analysis of the telematics data received from the originating mobile device having the Telematics App, and (ii) when the abnormal travel condition (or traffic event) exists, automatically taking a preventive or corrective action, such as at or via a destination mobile device or smart vehicle controller (or an associated processor), that alleviates a negative impact of the abnormal travel condition (or traffic event) on the driver and/or the destination vehicle. As a result, safer and/or more efficient vehicle travel may be achieved.

The method may include additional, less, or alternate actions, including those discussed elsewhere herein, and/or may be implemented by one or more processors, and/or via computer-executable instructions stored on non-transitory computer-readable medium or media. For instance, the Telematics App, and/or the telematics data generated by the Telematics App on the originating mobile device, may indicate that the originating vehicle is experiencing high traffic conditions, congestion, road construction, or extreme weather conditions, such as from analysis of the telematics data. The telematics data may include speed, acceleration, deceleration, GPS location, lane information, and/or other data of, or associated with, the originating vehicle. Additionally or alternatively, the telematics data may include time, braking, acceleration, left turn, right turn, heading, GPS (Global Positioning System) speed, GPS latitude and longitude, gyroscope, battery level, and/or telephone usage information or data of, or associated with, the originating vehicle.

The preventive or corrective action taken by the destination mobile device or vehicle may be: (1) generating or determining an alert, at or via the destination mobile device or smart vehicle controller (or an associated processor); (2) presenting a visual alert, at or via a destination mobile device or smart vehicle controller, on a display or display screen associated with the destination mobile device or smart vehicle controller, respectively; and/or (3) providing an audio or audible alert, at or via a destination mobile device or smart vehicle controller (or an associated processor). Additionally or alternatively, the preventive or corrective action taken may be: (i) generating, determining, and/or receiving an alternate travel route that avoids a GPS location of the travel or traffic event, at or via a destination mobile device or smart vehicle controller; (ii) presenting the alternative travel route, at or via the destination mobile device or smart vehicle controller, on a display or display screen for use by the driver; and/or (iii) providing audio driving directions for the destination vehicle or driver to travel along the alternate route.

The telematics data may be generated and/or collected by the originating mobile device (and/or the Telematics App executing thereon). The telematics data may be (1) transmitted from a transceiver mounted on, or within, the originating mobile device indirectly or directly to a destination mobile device or smart vehicle controller via peer-to-peer (P2P) wireless communication and/or data transmission, or via a secure electronic communication network; (2) transmitted from the originating mobile device directly (or indirectly) to a remote server (such as an insurance provider remote server), and then relayed or transmitted from the remote server to a destination mobile device or smart vehicle controller via wireless communication and/or data transmission; and/or (3) transmitted from the originating mobile device directly (or indirectly) to smart infrastructure (such as a smart stop sign, smart street sign, smart toll both, and/or smart road-side equipment, markers, or reflectors), and then relayed or transmitted from the smart infrastructure to a destination mobile device or smart vehicle controller via wireless communication or data transmission. The telematics data may be transmitted over a secure electronic or wireless communication network.

The computer-implemented method may also include, with customer permission or affirmative consent, (i) determining or identifying, by one or more processors associated with an insurance provider remote server, an insured customer having a mobile device configured with the telematics data-based risk mitigation or prevention functionality discussed herein and/or the Telematics App; (ii) monitoring, by the one or more processors associated with the remote server, a time amount and/or mileage amount that the insured customer drives an insured vehicle with the telematics data-based risk mitigation or prevention functionality discussed herein, or the Telematics App, enabled and/or executing on their mobile device; and/or (iii) adjusting or modifying, by the one or more processors associated with the remote server, an insurance policy, premium, or discount for the insured customer based upon their usage and/or amount that they use or employ the telematics data-based risk mitigation or prevention functionality and/or Telematics App, such as generating a usage-based discount that is tied to an amount that the telematics data-based risk mitigation or prevention functionality (including generating, collecting, and/or broadcasting (and/or even receiving) telematics data as discussed herein, and/or generating appropriate alerts or recommendations from the telematics data) is used or otherwise employed.

In another aspect, a source or originating mobile device configured to collect, generate, and/or transmit telematics data (such as when the mobile device is traveling in a moving vehicle associated with a driver) may be provided. The mobile device may include (1) one or more sensors or meters configured for collecting and/or gathering telematics data; (2) a memory unit storing computer readable instructions; (3) a transceiver (or a receiver and transmitter); and/or (4) one or more processors interconnected or in communication with the one or more sensors or meters; the memory unit; and/or the transceiver. The one or more processors may execute a Telematics Application ("App") or may be otherwise configured to: (i) receive telematics data from the one or more sensors or meters, the telematics data including acceleration, braking, gyroscope, compass heading, turning, speed, and/or location-related data; (ii) generate an updated broadcast (or wireless communication) incorporating the telematics data at least every couple of seconds; and/or (iii) direct a transmission of the updated broadcast as often as the broadcast is updated (e.g., every 1-3 seconds) via a mobile device transceiver using data transmission or wireless communication to another computing (or destination) device (such as a nearby vehicle, mobile device, remote server, and/or smart infrastructure processors or servers). As a result, safer travel may be facilitated for another vehicle and/or a second driver based upon computer analysis (at or via the destination device) of the telematics data contained within the updated broadcast and collected or generated by the originating mobile device. The mobile device may include additional, less, or alternate functionality, including that discussed elsewhere herein.

The one or more processors and/or Telematics App executing thereon may be further configured to: analyze the telematics data, and determine or identify that a travel or traffic event exists; generate a message (e.g., a data transmission or wireless communication) associated with the telematics data and/or detailing the type or extent of the travel or traffic event; and/or broadcast the message along with the updated broadcast to other computing devices in the vicinity or otherwise within broadcast range. The travel (or traffic) event may be based upon (and/or determined from telematics data that reveals) that the originating vehicle is experiencing abnormal vehicle, traffic, congestion, road construction, and/or weather conditions.

The telematics data may further include time, braking, acceleration, left turn, right turn, heading, GPS (Global Positioning System) speed, GPS latitude and longitude, gyroscope, battery level, and/or telephone usage information a or data of, or associated with, the mobile device and/or moving smart vehicle. The Telematics App further may direct the originating mobile device to periodically "listen" for a broadcast containing telematics data generated from other vehicles or other mobile devices, or use polling techniques to download data or broadcasts from other computing devices, and when such a broadcast is detected or available, download the broadcast and analyze the telematics data contained therein. The Telematics App may further direct the originating mobile device to generate an alert when processor analysis of the telematics data received within a broadcast indicates that a traffic or travel event exists along a route that the originating vehicle is presently traveling, such as a route stored in a vehicle navigation unit.

In another aspect, an originating mobile device configured for telematics data collection, generation, and/or transmission may be provided. The originating mobile device may include one or more processors and/or a Telematics Application ("App") executing therein. The one or more processors and/or Telematics App may be configured to: (1) collect or generate telematics data as a vehicle is traveling, the telematics data including acceleration, braking, gyroscope, compass heading, turning, speed, and/or location-related data; (2) generate a broadcast (or wireless communication or date transmission message) that incorporates the telematics data collected at least once every few seconds (i.e., approximately constantly or otherwise periodically); and/or (3) direct the transmission of each updated broadcast at least once every few (e.g., 2-3) seconds via a transceiver using wireless communication or data transmission to nearby vehicles, mobile devices, and roadside infrastructure (destination devices) to facilitate safer vehicle travel for other vehicles via computer analysis (at the destination devices) of the telematics data of the traveling vehicle collected and transmitted by the mobile device to other nearby computing devices. The originating mobile device may include additional, less, or alternate functionality, including that discussed elsewhere herein.

For instance, the travel (or traffic) event is based upon (and/or determined from telematics data that reveals or indicates) that the originating vehicle is, or may be, experiencing abnormal vehicle, traffic, congestion, road construction, and/or weather conditions. The telematics data may further include time, braking, acceleration, left turn, right turn, heading, GPS (Global Positioning System) speed, GPS latitude and longitude, gyroscope, battery level, and/or telephone usage information or data of, or associated with, the mobile device and/or moving smart vehicle.

The Telematics App may direct the originating mobile device to periodically listen for a broadcast containing telematics data generated from other vehicles or other mobile devices, and when such a broadcast is detected, download the broadcast and analyze the telematics data contained therein. The Telematics App may further direct the originating mobile device to generate an alert when processor analysis of the telematics data received within a broadcast indicates that a traffic or travel event exists along a route that the originating vehicle is presently traveling.

Destination Device Receiving the Telematics Data

In one aspect, a computer-implemented method of using telematics data may be provided. The method may include: (a) receiving telematics data, at or by (1) a destination mobile device associated with a driver (or an associated transceiver of the destination mobile device), or (2) a smart vehicle controller (or an associated transceiver) of a destination vehicle associated with the driver, via wireless communication and/or data transmission (or otherwise via a secure electronic communication network requiring login credential electronic verification), the telematics data being generated by an originating mobile device. The originating mobile device: (i) having a Telematics Application (or "App") installed or stored locally in a non-transitory computer-readable memory unit, and/or (ii) is associated with the driver, the telematics data including acceleration, braking, speed, heading, and location data associated with the operation of an originating vehicle. The method may also include (b) analyzing the telematics data, at or via the destination mobile device or the smart vehicle controller (or a processor associated therewith); (c) determining, at or via the destination mobile device or the smart vehicle controller (or an associated processor), that an abnormal travel condition (or traffic event) exists from the analysis of the telematics data received from the originating mobile device having the Telematics App; and/or (d) when the abnormal travel condition (or traffic event) exists, automatically taking or generating a preventive or corrective action, at or via the destination mobile device or the smart vehicle controller (or an associated processor) that alleviates a negative impact of the abnormal travel condition (or traffic event) on the driver and/or the destination vehicle to facilitate safer and/or more efficient vehicle travel. The method may include additional, less, or alternate functionality, including that discussed elsewhere herein.

For instance, the abnormal condition may be based upon, or otherwise determined from processor analysis of the telematics data received from the originating mobile device having the Telematics App, and that reveals that the originating vehicle is, or may likely be, experiencing high traffic conditions, congestion, road construction, or extreme weather conditions. The telematics data may (1) be generated and/or collected by the originating mobile device (or an associated processor) associated with an originating driver, and (2) include speed, acceleration, deceleration, GPS location, lane information, and/or other data of, or associated with, the originating vehicle. Additionally or alternatively, the telematics data may (1) be generated and/or collected by the originating mobile device (or an associated processor) associated with an originating driver, and (2) include time, braking, acceleration, left turn, right turn, heading, GPS (Global Positioning System) speed, GPS latitude and longitude, gyroscope, battery level, and/or telephone usage information or data of, or associated with, the originating vehicle.

The preventive or corrective action taken may be: (i) generating or determining an alert, at or via the destination mobile device or smart vehicle controller (or an associated processor); (ii) presenting a visual alert, at or via the destination mobile device or smart vehicle controller, on a display or display screen associated with the destination mobile device or smart vehicle controller, respectively; and/or (iii) providing an audio or audible alert, at or via the destination mobile device or smart vehicle controller (or an associated processor). The alert may be presented or provided only after the destination mobile device or smart vehicle controller determines that the abnormal travel condition (or traffic event) is relevant to the destination vehicle, such as by determining that a location of the abnormal travel condition (or traffic event) is in the vicinity of the destination vehicle and/or along a route that the destination vehicle is presently traveling.

The preventive or corrective action taken may be: (a) generating, determining, and/or receiving an alternate travel route that avoids a GPS location of the travel or traffic event, at or via the destination mobile device or smart vehicle controller; and/or (b) presenting the alternative travel route, at or via the destination mobile device or smart vehicle controller, on a display or display screen for use by the driver; and/or providing audio driving directions for the destination vehicle to travel along the alternate route. Additionally or alternatively, the preventive or corrective action taken may be: (c) generating, determining, and/or receiving an alternate travel route that avoids a GPS location of the travel or traffic event, at or via the destination mobile device or smart vehicle controller; and/or (d) automatically directing the destination vehicle to take or follow the alternative travel route, at or via the destination mobile device or smart vehicle controller, wherein the destination vehicle is an autonomous or semi-autonomous vehicle that drives itself (via one or more processors) along the alternate travel route.

The telematics data may be (1) generated and/or collected by the originating mobile device (or the Telematics App executing thereon), and (2) transmitted from a transceiver mounted on, or within, the originating mobile device indirectly or directly to destination mobile device or smart vehicle controller via peer-to-peer (P2P) wireless communication and/or data transmission, or via a secure electronic communication network, the telematics data being repeatedly broadcast from the transceiver mounted on, or within, the originating mobile device at least every few seconds. Additionally or alternatively, the telematics data may be (3) transmitted from the originating mobile device directly to a remote server (such as an insurance provider remote server), and then relayed or transmitted from the remote server to the destination mobile device or smart vehicle controller via wireless communication and/or data transmission; and/or (4) transmitted from the originating mobile device directly to smart infrastructure (such as a smart stop sign, smart street sign, smart toll both, and/or smart road-side equipment, markers, or reflectors), and then relayed or transmitted from the smart infrastructure to the destination mobile device or smart vehicle controller via wireless communication or data transmission. The telematics data may be repeatedly broadcast from the transceiver mounted on, or within, the originating mobile device at least every few seconds, such as when it has new data to transmit, or when driving conditions have changed.

The method may also include, with customer permission or affirmative consent, (i) determining or identifying, by one or more processors associated with an insurance provider remote server, an insured customer having a mobile device configured with the telematics data-based risk mitigation or prevention functionality discussed herein and/or the Telematics App (or is otherwise capability of receiving and then analyzing the telematics data as explained herein); (ii) monitoring, by the one or more processors associated with the remote server, a time amount and/or mileage amount that the insured customer drives an insured vehicle with the risk mitigation or prevention functionality discussed herein, or the Telematics App, enabled and/or executing on their mobile device; and/or (iii) adjusting or modifying, by the one or more processors associated with the remote server, an insurance policy, premium, or discount for the insured customer based upon their usage and/or amount that they use, or employ, the risk mitigation or prevention functionality and/or Telematics App, such as generating a usage-based discount that is tied to an amount that the risk mitigation or prevention functionality (including the capability of receiving and analyzing the telematics data as discussed herein, and/or generating appropriate alerts or recommendations) is used.

In another aspect, a destination computer system configured to use telematics data may be provided. The destination computer system may include: (1) a destination mobile device associated with a driver (or an associated processor and/or transceiver of the destination mobile device), or (2) a smart vehicle controller (or an associated processor and/or transceiver) of a destination vehicle associated with the driver configured to: (a) receive telematics data, via wireless communication and/or data transmission (or otherwise via a secure electronic communication network requiring login credential electronic verification), the telematics data being generated by an originating mobile device and the originating mobile device: (i) having a Telematics Application (or "App") installed or stored locally in a non-transitory computer-readable memory unit, and (ii) is associated with a second driver, the telematics data including acceleration, braking, speed, heading, and location data associated with the operation of an originating vehicle; (b) analyze the telematics data; (c) determine that an abnormal travel condition (or traffic event) exists from the analysis of the telematics data received from the originating mobile device having the Telematics App; (d) determine that the abnormal travel condition (or traffic event) is along a route that the destination vehicle is currently traveling or ahead of a direction of travel of the destination vehicle; and/or (e) when the abnormal travel condition (or traffic event) exists and is along the route (or otherwise ahead) of the destination vehicle, automatically take or generate a preventive or corrective action that alleviates a negative impact of the abnormal travel condition (or traffic event) on the driver and/or the destination vehicle to facilitate safer and/or more efficient vehicle travel. The destination computer system may include additional, less, or alternate functionality, including that discussed elsewhere herein.

Exemplary Smart Control Systems

Figure 5:
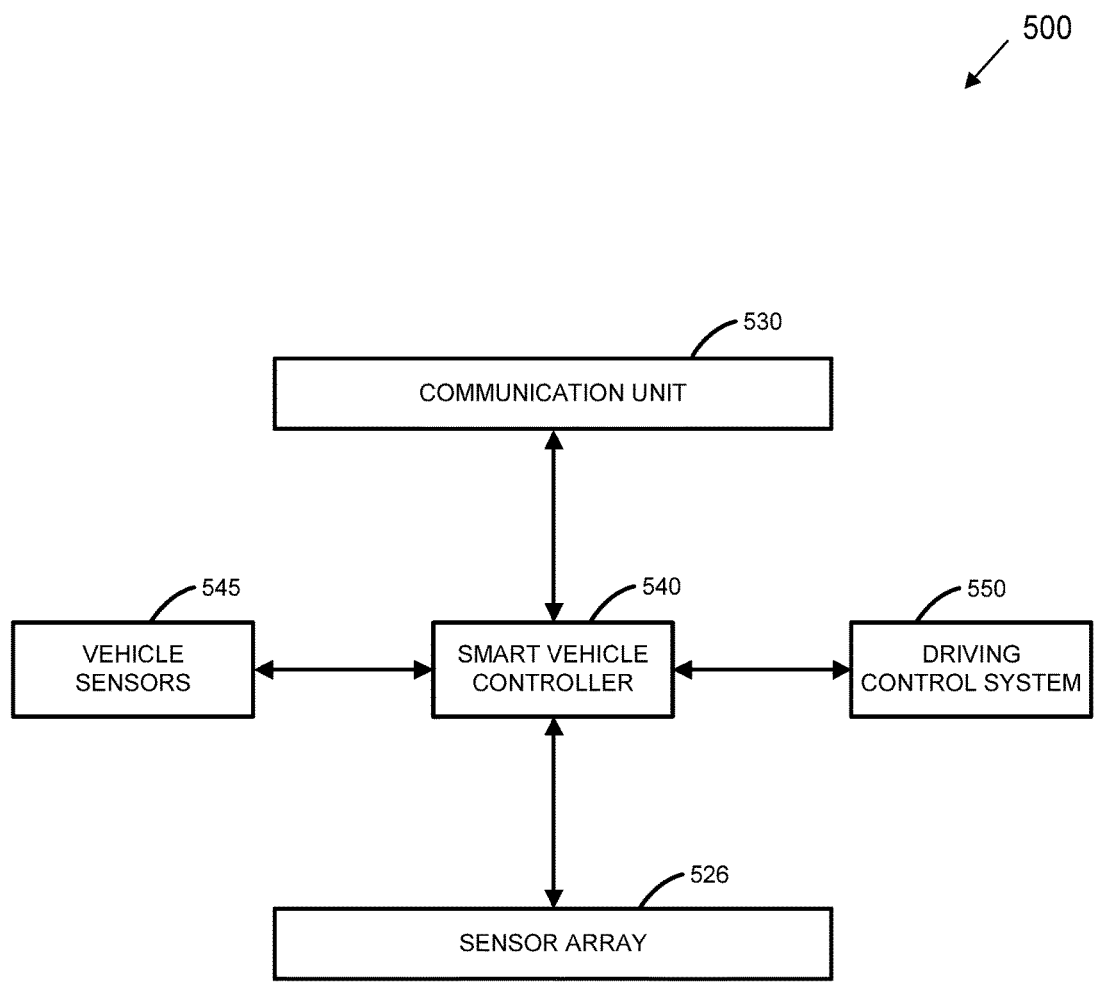
FIG. 5 illustrates a block diagram of an exemplary smart vehicle control system 500 in accordance with an exemplary aspect of the present disclosure.

FIG. 5 illustrates a block diagram of an exemplary smart vehicle control system 500 in accordance with an exemplary aspect of the present disclosure. In one aspect, smart vehicle control system 500 may be implemented as any suitable computing device, such as a computing device that is integrated as part of a smart vehicle to facilitate autonomous driving and/or other smart driving functions. For example, smart vehicle control system may be integrated as part of one or more vehicles 202.1-202.N, as shown in FIG. 2, to provide such vehicles with such functions. Smart driving functions may include, for example, the generation, receipt, collection, storage, and/or transmission of telematics data and/or other suitable data, such as previously discussed above with reference to on board computer 114, as shown in FIG. 1. Other suitable data may include other data discussed herein, such as, for example, geographic location data and/or image, audio, and/or video data as discussed herein.

Smart vehicle control system 500 may include a sensor array 526, a communication unit 530, a smart vehicle controller 540, one or more vehicle sensors 545, and/or a driving control system 550, one or more of which may be configured to communicate with one another to receive data from, and send data to, one another. Smart vehicle control system 500 may include additional, less, or alternate functionality, including that discussed elsewhere herein, and/or discussed with reference to computing devices (e.g., mobile computing devices), remote servers, external computing devices, and/or smart infrastructure.

In one aspect, sensor array 526, communication unit 530, and smart vehicle controller 540 may have a similar architecture, implementation, and/or perform similar functions as sensor array 326, communication unit 330, and controller 340, respectively, as previously discussed above with reference to FIG. 3. Therefore, only differences between sensor array 526, communication unit 530, and smart vehicle controller 540, as shown in FIG. 5, and sensor array 326, communication unit 330, and controller 340, as shown in FIG. 3, will be further discussed herein.

For instance, it will be appreciated that some differences between sensor array 526, communication unit 530, and smart vehicle controller 540, as shown in FIG. 5, and sensor array 326, communication unit 330, and controller 340, as shown in FIG. 3, respectively, may be due to differences between applications and design requirements of computing devices and vehicles. For example, smart vehicle controller 540 may include one or more microprocessors, program memory, RAM, I/O interfaces, etc. However, smart vehicle controller 540 may include faster microprocessors, additional memory, faster memory controllers, etc., than that of controller 340 to account for the additional processing and speed requirements associated with the higher processing functions of vehicles, particularly smart vehicles. To provide another example, smart vehicle controller 540 may include one or more processors specifically designed for adaptive vision processing at high speeds and/or utilizing parallel processing techniques to facilitate autonomous or semi-autonomous driving.

Likewise, sensor array 526 may have additional or alternative sensors, meters, and/or other suitable devices as compared to sensor array 326. Sensor array 526 may additionally or alternatively include any suitable number and/or type of sensors, meters, and/or other suitable devices to facilitate autonomous or semi-autonomous driving. Examples of sensors included in sensor array 526 may include, for example, radar systems configured to operate at any suitable number or range of wavelengths (e.g., millimeter-wavelengths), Lidar, ultrasonic sensors, etc.

Vehicle sensors 545 may include, for example, any suitable number and/or type of sensors, meters, and/or other suitable devices integrated as part of the vehicle in which smart vehicle control system 500 is installed or otherwise implemented. For example, vehicle sensors 545 may generate one or more sensor metrics or other data that is part of the telematics data and/or other data (e.g., geographic location data and/or image, audio, and/or video data) that is stored, collected, and/or broadcasted from smart vehicle control system 500 (e.g., via communication unit 530).

In some aspects, vehicle sensors 545 may sample sensor metrics or other information that is included as part of the telematics data and/or other data, as discussed elsewhere herein, while sensor array 526 may be implemented as one or more sensors associated with autonomous driving functions. Thus, in aspects in which smart vehicle control system 500 is implemented as part of a non-autonomous vehicle, vehicle sensors 545 and sensor array 526 may be implemented as a single sensor array.

Communication unit 530 may be configured to transmit telematics data (and/or other suitable data as discussed herein) including one or more sensor metrics or other information generated by vehicle sensors 545 and/or sensor array 526, which may be received by other computing devices (e.g., mobile computing devices), other smart vehicles, smart infrastructure, and/or external computing devices, as discussed elsewhere herein. Additionally or alternatively, communication unit 530 may be configured to receive telematics data (and/or other suitable data) from other computing devices (e.g., mobile computing devices), other smart vehicles, smart infrastructure, and/or external computing devices, as discussed elsewhere herein.

When transmitting telematics data and/or other data discussed herein, smart vehicle controller 540 may be configured to format the sensor metrics and/or other information generated, collected, and/or measured by vehicle sensors 545 and/or sensor array 526 into a data broadcast, determine whether the telematics data and/or other data should be updated, and/or broadcast the telematics data and/or other data. Additionally or alternatively, smart vehicle controller 540 may be configured to analyze the telematics data and/or other data to identify one or more anomalous conditions (e.g. travel events, traffic events), and/or alerts, to generate one or more messages associated with the telematics data (and/or other data) and/or detailing the type and/or extent of an identified anomaly and/or alert, etc.

Furthermore, smart vehicle controller 540 may be configured to broadcast or otherwise direct a transmission of the message via data transmission and/or wireless communication (e.g., via communication unit 530) to another computing device (such as a mobile computing device, another vehicle, a remote server, smart infrastructure, etc.). As further discussed herein, devices receiving the message and/or the telematics data and/or other data may utilize such received information to perform various functions, issue alerts to drivers, etc. In this way, the messages, telematics data, and/or other data transmitted by smart vehicle control system 500 may facilitate safer travel for another vehicle and/or another driver.

Similar to the other devices described above (e.g., mobile computing device 300), when receiving data, smart vehicle controller 540 may be configured to perform various functions such as issuing alerts to drivers when the data contains a warning message and/or identifying an anomalous condition by analyzing the received data.

Driving control system 550 may be implemented with any suitable number and/or type of driving controllers to control the direction, movement, and/or speed of the vehicle in which smart vehicle control system 500 is installed. For example, driving control system 550 may include various drive-by-wire interfaces to facilitate controlling the speed of the vehicle and to turn the vehicle without user input. To provide an additional example, driving control system may include various braking controllers and/or transmission controllers to slow the vehicle and to shift the vehicle into different gears.

In accordance with one aspect, smart vehicle controller 540 may communicate with one or more components of driving control system 550 in response to telematics data, other data, and/or messages received via communication unit 530. For example, if the telematics data and/or other data indicates a road hazard at a certain location and/or in a certain road lane, then smart vehicle controller 540 may issue one or more commands to driving control system 550 to steer the vehicle into a clear lane, thus avoiding the road hazard.

Driving control system 550 may include different types of feedback components and/or control systems based upon the type of vehicle in which smart vehicle control system 500 is implemented or installed. For example, driving control system 550 may include various interfaces and/or control systems to facilitate autonomous driving in conjunction with smart vehicle controller 540. But if smart vehicle control system 500 is implemented in a non-autonomous vehicle, driving control system 550 may work in conjunction with smart vehicle controller 540 to receive one or more signals and/or data associated with traditional driving functions (e.g., manual acceleration, steering, braking, etc.).

Regardless of the type of vehicle in which smart vehicle control system 500 is implemented, smart vehicle controller 540 may work in conjunction with driving control system 550 to support any suitable number and/or types of driver feedback. To provide this feedback, driving control system 550 may include any suitable number and/or types of displays, user interfaces, speakers, buzzers, etc.

For example, driving control system 550 may include various feedback components to provide visual and/or auditory feedback regarding the operation of the vehicle and/or information regarding anomalous conditions, alerts, warnings, recommendations, etc., which may be based upon an analysis of telematics data and/or other suitable data discussed herein. Again, the telematics data and/or other suitable data may be received from another computing device (e.g., via communication unit 530) and/or generated and analyzed locally at smart vehicle control system 500.

To provide another example, smart vehicle controller 540 may include one or more memory units configured to store cartographic and/or map data. In response to user input received via a user interface implemented by driving control system 550, smart vehicle controller 540 may generate, calculate, and/or display travel routes, which may provide navigational guidance to a driver. Furthermore, smart vehicle controller 540 may perform functions associated with the determination of whether an identified anomaly (e.g., a traffic event, travel event, abnormal condition, etc.), which has been determined from an analysis of received telematics data and/or other data (such as other data discussed herein) from another device, is relevant to the vehicle in which smart vehicle control system 500 is implemented.

This determination of relevance may be made, for example, by comparing a location (e.g., geographic coordinates included in a telematics data transmission) to the current location of the vehicle in which smart vehicle control system 500 is implemented to determine whether the locations are within a threshold distance of one another. The determination may also be made, for example, when the identified anomaly or other abnormal condition is or will be located along a current travel route (e.g., ahead by some threshold distance in a direction of travel on the same road on which the vehicle is moving). If so, aspects include smart vehicle controller 540 automatically performing various preventative and/or corrective actions based upon how the relevance of the identified anomaly is determined. For example, smart vehicle controller 540 may issue a visual and/or audible alert via driving control system 550, calculate and display a new travel route via driving control system 550 that avoids the location of the identified event, etc.

In some aspects, the preventative and/or corrective actions may be issued only when it is determined that an identified anomaly is relevant, and is otherwise not issued. For example, aspects include an identified anomaly that is not along a current route for the vehicle in which smart vehicle control system 500 is implemented not causing an alarm to be sounded and/or the route to be adjusted, even if the location of the anomaly is otherwise nearby. In this way, the preventive or corrective action may alleviate or avoid a negative impact of the abnormal travel condition on the driver and/or the vehicle in which smart vehicle control system 500 is implemented to facilitate safer or more efficient vehicle travel. Additional details of the preventive or corrective action that may be facilitated by smart vehicle control system 500 (or another suitable computing device or system) are further discussed below with reference to FIG. 6.

Exemplary Data Generation Via Cradled Mobile Device

Figure 6:
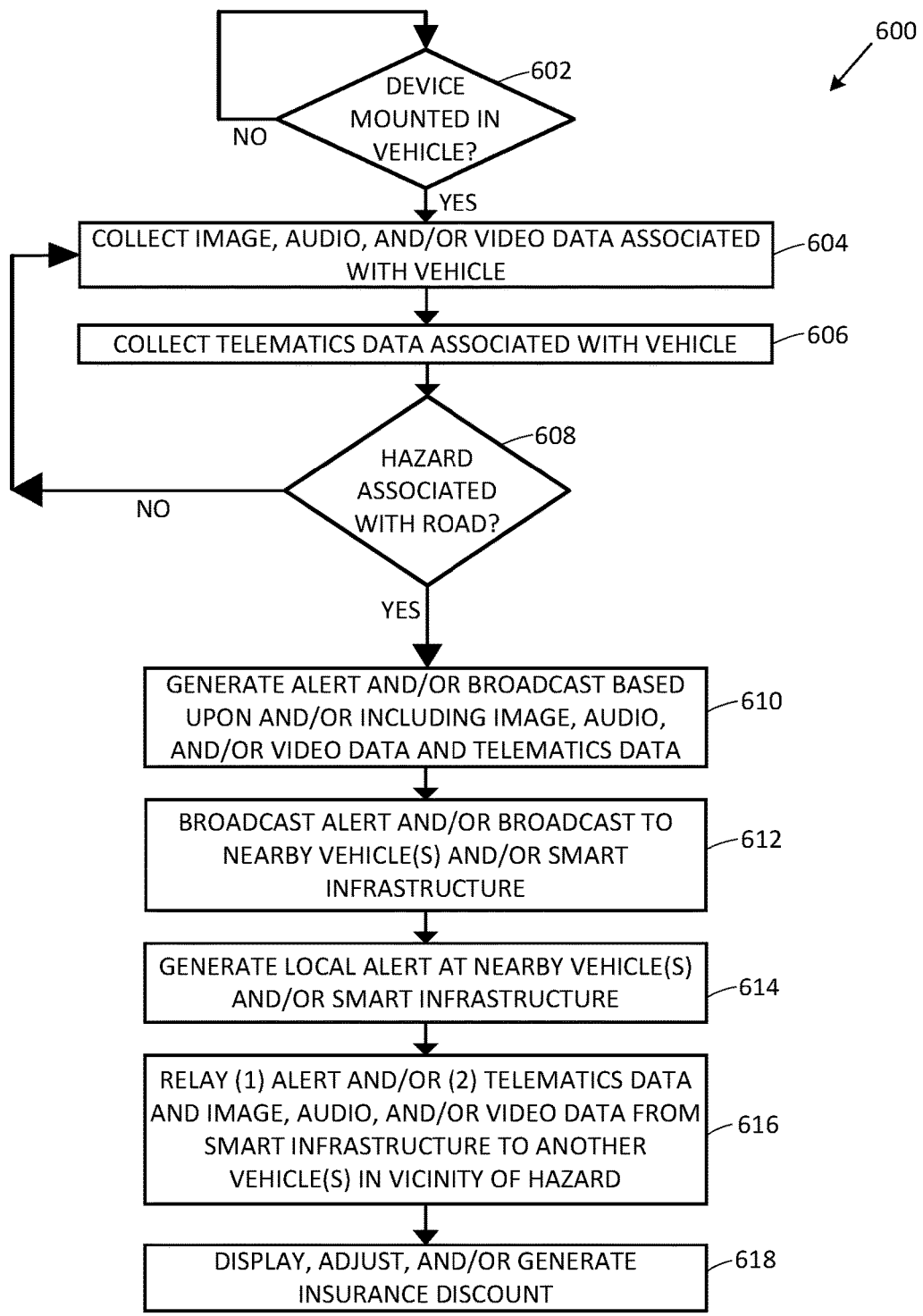
FIG. 6 illustrates an exemplary computer-implemented method 600 of facilitating safer vehicle travel in accordance with an exemplary aspect of the present disclosure.

FIG. 6 illustrates an exemplary method 600 of facilitating safer vehicle travel. For instance, as described below, safer vehicle travel may be facilitated by broadcasting information related to hazards impacting vehicle travel. In the present aspect, the method 600 may be implemented by any suitable computing device (e.g., mobile computing devices 204.1 and/or 204.2, external computing device 206, vehicles 202.1 and/or 202.2, and/or infrastructure component 208, as shown in FIG. 2). In one aspect, the method 600 may be performed by one or more processors, applications, and/or routines, such as any suitable portion of controller 340, software applications 344, and/or software routines 352, for example, as shown in FIG. 3.

The method 600 may include determining whether a device, such as a mobile device (e.g., computing device 300 implemented as mobile computing device 204.1) is mounted in a vehicle (block 602). For example, as discussed above, mobile computing device 204.1 may utilize one or more sensors (e.g., an accelerometer that is part of sensor array 326) to determine whether mobile computing device 204.1 has changed orientation to horizontal, as is common when docked in a vehicle (block 602). In this manner, it may be determined whether, for example, mobile computing device 204.1 is mounted in vehicle dashboard cradle 210 mounted on a dashboard of vehicle 202.1 (block 602).

If it is determined that the mobile computing device is not mounted in the vehicle, the method may remain at this determination until the mobile computing device is determined to be mounted in the vehicle. If it is determined that the mobile computing device is mounted in the vehicle, method 600 may continue (block 604).

The method 600 may include collecting image, audio, and/or video data associated with the vehicle (block 604). For instance, a camera and/or speaker/microphone of a mobile computing device (e.g., camera 212 and speaker/microphone 322, when computing device 300 is implemented as mobile computing device 204.1) may collect image and/or video data (e.g., one or more images) forward of the vehicle (e.g., vehicle 202.1), and may collect audio data in a vicinity of the vehicle (block 604). Mobile computing device 204.1 may be positioned so that camera 212 is positioned to take images forward of vehicle 202.1, as shown in the example of FIG. 2 (block 604). In another aspect, camera 212 and/or speaker/microphone 322 may additionally or alternatively collect image data forward of and/or in a vicinity of the vehicle, audio data forward of and/or in a vicinity of the vehicle, and/or video data forward of and/or in a vicinity of the vehicle (block 604). Thus, the image, audio, and/or video data may be data of things (e.g., vehicles, animals, pedestrians, etc.) located in front of, behind, outside of, around, etc., the vehicle (block 604). In yet another aspect, camera 212 and/or speaker/microphone 322 may additionally or alternatively collect image data associated with an interior and/or an exterior of the vehicle, audio data associated with the interior and/or the exterior of the vehicle, and/or video data associated with the interior and/or the exterior of the vehicle (block 604). Moreover, in some aspects, the image, audio, and/or video data may be or may include digital data (block 604).

The "collection" or "collecting" of image, audio, and/or video data as described herein may also be referred to herein as "capturing" such image, audio, and/or video data (block 604). In various aspects, the mobile computing device may capture image, audio, and/or video data at any suitable sampling rate (e.g., once every second, 5 times per second, etc.) and store this data to any suitable portion of the mobile computing device (e.g., data storage 360) (block 604). For instance, the mobile computing device may capture single images based upon a particular sampling rate, one or more frames of video captured while the vehicle is moving, etc. (block 604). In some aspects, the collecting/capturing of image, audio, and/or video data may not be performed while the vehicle is not moving, and/or may not be performed while the vehicle is not started (block 604). Furthermore, the collecting/capturing of image, audio, and/or video data may additionally or alternatively be performed via one or more mobile device processors of the mobile device (e.g., mobile computing device 204.1) that is mounted within the vehicle dashboard cradle (e.g., vehicle dashboard cradle 210) (block 604).

Still further, in some aspects, the collection/capturing of the image, audio, and/or video data may be triggered by any suitable condition or number of conditions (block 604). Thus, in some aspects, the determination described with respect to block 602 may additionally or alternatively be made based upon such a condition or conditions. Such a condition or conditions may include whether the mobile computing device (e.g., mobile computing device 204.1) is communicating via BLUETOOTH with the vehicle, whether the vehicle is moving above a threshold speed, etc.

The method 600 may include collecting (which may also be referred to herein as "capturing") telematics data associated with the vehicle (e.g., via the one or more mobile device processors and/or a telematics app such as the Telematics App discussed herein (e.g., the telematics app being or including aspects of alert notification application 346)) (block 606). The telematics data may include at least one of GPS location data, speed data, heading data, lane data, braking data, cornering data, acceleration data, or route data of the vehicle (e.g., vehicle 202.1) and may be collected while the vehicle is moving (block 606).

The method 600 may include determining whether a hazard(s) is associated with a road on which the vehicle is being driven (e.g., on the road, within a threshold distance of the road, going to be within a threshold distance of the road and/or the vehicle within a threshold amount of time as the vehicle moves on the road, etc.) (block 608). One or more hazards may be detected by analyzing the collected/captured image, audio, and/or video data and the collected/captured telematics data via, for example, the one or more mobile device processors and/or the telematics app (block 608). The one or more hazards may include, for example, at least one of congestion, a vehicle accident(s) (e.g., between truck 214 and collided vehicle 216, as shown in FIG. 2), a pedestrian(s) (e.g., pedestrian 220), or an animal (e.g., animal 218) (block 608). The analysis of the collected/captured image, audio, and/or video data and the collected/captured telematics data may include use of at least one of computer analysis or object recognition techniques on the telematics data and/or the image, audio, and/or video data (block 608). In various aspects, the mobile device telematics app (e.g., alert notification application 346) may facilitate the analysis of, for example, image data using any suitable image recognition and/or object recognition techniques, to identify objects, determine their size and/or shape, and/or to determine the distance between identified objects and the vehicle in which the mobile computing device is located (block 608).

In some aspects, if it is determined that a hazard(s) is not associated with a road on which the vehicle is being driven, method 600 may revert to the collection of image, audio, and/or video data associated with the vehicle (block 604). If it is determined that a hazard(s) is associated with a road on which the vehicle is being driven, method 600 may continue (block 610).

The method 600 may include generating an alert (and/or recommendation) and/or a broadcast based upon and/or including the image, audio, and/or video data and the telematics data (block 610). The alert and/or broadcast may be generated via, for example, the one or more mobile device processors (block 610). For instance, when the alert is generated, the alert may be based upon the image, audio, and/or video data and the telematics data, and when the broadcast is generated, the broadcast may include the image, audio, and/or video data and the telematics data (block 610). In some aspects, the alert may be generated when a hazard(s) is detected/determined to be present based upon the analysis described above (e.g., in response to detection of the hazard(s)) (block 610). In some aspects, the broadcast may additionally or alternatively be generated when the hazard(s) is detected/determined to be present (e.g., in response to detection of the hazard(s)) (block 610).

For instance, an alert(s) and/or recommendation(s) may be generated to mitigate risk associated with an object(s) detected if one or more conditions are satisfied such that the detected object(s) is/are considered a hazard, where the actions described with respect to block 608 may include determining whether the one or more conditions are satisfied. For example, if a detected object is within a predetermined distance of the vehicle, is larger than a minimum threshold size, matches a specific profile shape corresponding to a known hazard, etc., then a hazard may be determined to be associated with the road on which the vehicle is being driven and an alert may be generated. To provide an illustrative example, if an object recognition analysis is performed on captured images and this results in the identification of a matched profile corresponding to the shape and size of a herd of deer (or a single deer), then such a hazard may be appropriately identified. In such a case, the mobile computing device may display (e.g., via display 316) an indication to the driver of the vehicle recommending that the driver slow down, change lanes, etc. (block 610). To provide another illustrative example, if the captured images are analyzed and match a profile of the shape and size of a pedestrian (e.g., in a cross walk), the mobile computing device may display an indication to the driver of the vehicle recommending to stop the vehicle (block 610). Aspects include audible or visual alerts being additionally or alternatively generated by the mobile computing device, such as "Deer Alert," "Pedestrian Alert," etc. (block 610).

The method 600 may include broadcasting the alert and/or the broadcast to at least one of a nearby vehicle(s) (e.g., within a predetermined or threshold distance of the vehicle) or a smart infrastructure component(s) (e.g., smart infrastructure component(s) 208) to facilitate alerting and/or warning at least one of other vehicles or drivers of a hazard(s) (e.g., hazardous conditions and/or vehicle accidents) (block 612). In this manner, other drivers and/or vehicles may be alerted and/or warned of detected hazards that are likely to impact those other drivers and/or vehicles (block 612). In some aspects, the alert and/or the broadcast may be broadcast to at least one of the nearby vehicle(s) or the smart infrastructure component(s) 208 by broadcasting the alert and/or the broadcast, and having other vehicles and/or smart infrastructure components(s) 208 receive and process the alert and/or the broadcast if the other vehicles and/or smart infrastructure component(s) 208 determine that their respective geographic location(s) is/are within a predetermined or threshold distance of a geographic location of the vehicle from which the alert and/or the broadcast is sent (block 612). Thus, in some aspects, the alert and/or the broadcast may include geographic location data of the vehicle from which the alert and/or the broadcast is sent (block 612). In other aspects, the generated alert and/or broadcast may be provided on the mobile computing device of the generating vehicle locally and may not be broadcasted or otherwise shared with other drivers and/or vehicles as described with respect to block 612.

Broadcasting the alert and/or the broadcast may be performed via, for example, at least one of the one or more mobile device processors, a communication unit (e.g., communication unit 330), or a transceiver, and may be performed via wireless communication or data transmission (block 612). In some aspects, the alert and/or the broadcast may additionally or alternatively be broadcast to another suitable device(s), such as external computing device 206 (block 612). In some aspects, the alert and/or the broadcast may include the telematics data and digital or other suitable data constituting the image, audio, and/or video data, and the telematics data and the digital or other suitable data may include: (1) an indication of a Global Positioning System (GPS) location of the hazard or an indication of a vicinity of the hazard, and (2) a type of the hazard (block 612).

The broadcast and/or the alert may be broadcasted to any suitable number and/or type of devices and using any suitable communication protocol(s) (block 612). When both the alert and the broadcast are broadcasted (with the broadcast including telematics data, in some examples), aspects include such transmissions including a suitable identifier so that alerts may be correlated with the telematics data when received by another device (block 612).

The method 600 may include generating a local alert at the one or more nearby vehicles and/or the smart infrastructure component(s) (e.g., smart infrastructure component(s) 208) (block 614). Thus, the nearby vehicle(s) and/or smart infrastructure component(s) 208 may warn other drivers and/or vehicles (e.g., smart vehicles) of a hazard(s) upon receiving and processing the alert and/or the broadcast (block 614). In some aspects, the local alert may be generated based upon, for example, a comparison by a mobile computing device(s) of a nearby vehicle(s) of geographic location data of the nearby vehicle(s) (e.g., as collected by the mobile computing device(s) of the nearby vehicle(s)) with the indication of the GPS location or the vicinity of the hazard and/or the type of the hazard (as discussed above with respect to block 612) (block 614). In this manner, the local alert may be generated when relevant or applicable to the nearby vehicle(s) and otherwise not generated (block 614).

With respect to smart infrastructure component(s) 208, and as discussed above and shown in the example of FIG. 2, smart infrastructure component(s) 208 may include an implementation as a roadside display (block 614). Upon receiving and processing the alert and/or broadcast, smart infrastructure component 208 implemented as a roadside display may generate a local alert by displaying a warning indicating "ACCIDENT 1 MILE AHEAD" as shown in FIG. 2 (block 614). As discussed herein, such an accident may be, for instance, an accident between truck 214 and collided vehicle 216 (block 614). It should be appreciated that smart infrastructure component(s) 208, when implemented as a roadside display(s), may display other types of messages and/or warnings, such as messages and/or warnings with regard to congestion, animals, and/or pedestrians, etc. (block 614). In some aspects, a local alert(s) may be generated at smart infrastructure component(s) 208 that are near (e.g., within a predetermined or threshold distance of) the GPS location of the hazard or the vicinity of the hazard and/or that are otherwise near roads that may be affected by the hazard (block 614). Whether the smart infrastructure component(s) 208 are otherwise near roads that may be affected by the hazard may be determined based upon, for example, navigational and/or map data in conjunction with the type of the hazard, where the navigational and/or map data may be included in the alert and/or broadcast to the smart infrastructure component(s) 208, for example (block 614).

The method 600 may include relaying at least one of (1) the alert or (2) the telematics data and the image, audio, and/or video data from a smart infrastructure component 208 to another vehicle(s) in a vicinity of the hazard (block 616). Thus, in one aspect, after receiving the alert and/or the broadcast, the smart infrastructure component 208 may relay at least one of (1) the alert or (2) the telematics data and the image, audio, and/or video data to another vehicle(s) (block 616).

The method 600 may include at least one of displaying, adjusting, or generating an insurance discount for vehicles having risk mitigation or prevention functionality such as that described herein (e.g., functionality associated with analyzing mobile computing device image, audio, and/or video data and vehicle telematics data to generate alerts to facilitate warning drivers and/or smart vehicles of hazards) (block 618). The at least one of the displaying, adjusting, or generating an insurance discount may be performed via, for example, the one or more mobile device processors and/or an insurance provider remote server (e.g., external computing device 206) (block 618). Moreover, such acts may be performed and results may be displayed or otherwise communicated via, for example, an insurance provider remote server and/or a mobile computing device, as also described hereinabove (block 618). In some aspects, the insurance discount may be time or mileage usage-based based upon an amount of usage of the risk mitigation or prevention functionality, as also described hereinabove (block 618). Moreover, in some aspects, an insurance provider remote server (implementations of which are discussed above) may adjust an insurance premium or discount by receiving telematics data from an insured mobile device or vehicle, which telematics data may include an indication of a level of usage of the alert, recommendation, and/or other functionality discussed herein (block 618).

To provide an illustrative example with reference to FIG. 2 and actions described with respect to the method 600, mobile computing device 204.1, which is located in vehicle 202.1, may actively capture images while vehicle 202.1 is being driven. As vehicle 202.1 approaches an area in which a recent rock slide has blocked part of the road, mobile computing device 204.1 may determine, based upon object recognition being performed on the captured images in front of vehicle 202.1, that a lane is partially blocked, and issue an audible and/or visual alert to the driver of vehicle 202.1 to avoid the hazard.

Continuing this example, aspects include mobile computing device 204.1 generating and transmitting telematics data, which may include a description of what is impacted by the hazard (e.g., rightmost lane blocked), the location of the hazard (e.g., geographic coordinates such as latitude and longitude), the type of hazard (e.g., a rock slide), etc. This data may be received by another device, such as mobile computing device 204.2, for example. When vehicle 202.2 is within a threshold distance of the location of the hazard as specified by the telematics data, aspects include mobile computing device 204.2 likewise issuing an audible and/or visual alert to the driver of vehicle 202.2 to avoid the same hazard.

The method 600 may include additional, less, or alternate actions, including those discussed elsewhere herein, and/or may be implemented via one or more local or remote processors (e.g., mobile device, remote server, and/or external computing device processors), or via computer-executable instructions stored on non-transitory computer-readable medium or media.

In another aspect, a computer-implemented method of generating and using telematics or other vehicle data may be provided. The method may include cradling a mobile device within a vehicle; capturing image data via the mobile device as the vehicle moves; analyzing image to detect hazards; generating an alert and/or recommendations to mitigate risk associated with the hazard detected; and/or generating a telematics data broadcast and transmitting the broadcast to other devices, such as to nearby vehicles or smart infrastructure. The method may include additional, less, or alternate actions, including those discussed elsewhere herein, and/or may be implemented via one or more local or remote processors, or via computer-executable instructions stored on non-transitory computer-readable medium or media.

The method may begin by cradling a mobile device within a vehicle. For instance, a mobile device may be put within a dashboard mounted cradle. The mobile device may sit within a cradle such that the mobile device can capture image, audio, or other data of things (e.g., vehicles, animals, pedestrians, etc.) located in front of, behind, outside of, or around the vehicle.

The method may then continue by capturing image, audio, or other data via the mobile device as the vehicle moves. For instance, images may show or capture animals, pedestrians, or other vehicles. The data may be captured by a Telematics App stored on a mobile device memory unit, or executing on a mobile device processor.

The method may include analyzing the image, audio or other data to detect hazards. The mobile device Telematics App may analyze the image data, such as via object recognition techniques, to identify objects and determine their distance to the vehicle. If an object is within a pre-determined distance, the method may include generating an alert and/or recommendations to mitigate risk associated with the hazard detected. For instance, if a herd of deer is detected, it may be recommended to slow down. If a pedestrian is detected in a cross walk, it may be recommended to stop the vehicle. Audible or visual alerts may be generated, such as "Deer Alert," "Pedestrian Alert," etc.

The method may include generating a telematics data broadcast and transmitting the broadcast to other devices, such as to nearby vehicles or smart infrastructure. For example, a mobile device Telematics App may transmit the telematics data collected, including the image or audio data mentioned above, to nearby vehicles, mobile devices, or smart infrastructure for further analysis or usage.

An insurance provider remote server may adjust an insurance premium or discount based upon an insured having the foregoing functionality, and/or amount that the insured employs or uses that functionality. For instance, the insurance provider remote server may receive the telematics data from an insured mobile device, and the telematics data may include an indication of the level of usage of the alert, recommendation, and/or other functionality discussed herein.

Cradle Mounted Mobile Device

In one aspect, a computer-implemented method of broadcasting information related to hazardous conditions impacting vehicle travel may be provided. The method may include (1) collecting, via a mobile device camera and/or associated processor(s) that is mounted within a vehicle dashboard cradle and positioned to take images forward of a vehicle, images forward of the vehicle; (2) analyzing, via the mobile device processor(s), such as by using object recognition techniques, to determine anomalous or hazardous conditions (such as a deer, pedestrian, or other vehicle) or detect an object impeding forward movement of the vehicle; (3) generating, via the mobile device processor(s), an alert (or other broadcast); and/or (4) broadcasting, via the mobile device processor(s), the alert via wireless communication or data transmission to nearby vehicles or smart infrastructure to facilitate alerting other vehicles or drivers of hazardous conditions and/or vehicle accidents.

In another aspect, a computer-implemented method of broadcasting information related to hazardous conditions impacting vehicle travel may be provided. The method may include (1) collecting, via a mobile device camera and/or associated processor(s) that is mounted within a vehicle dashboard cradle and positioned to take images forward of a vehicle, images forward of a moving vehicle; (2) collecting, via one or more (mobile device) processors or a Telematics App, telematics data, including GPS location, speed, heading, lane, braking, cornering, acceleration, and/or route data; (3) generating, via the mobile device processor(s), an alert based upon, or a broadcast including the images looking forward of the moving vehicle and/or the telematics data; and/or (4) broadcasting, via the mobile device processor(s) (and/or associated transceiver), the alert or broadcast (including image and telematics data) via wireless communication or data transmission to nearby vehicles or smart infrastructure to facilitate alerting other vehicles or drivers of hazardous conditions and/or vehicle accidents.

The foregoing methods may include additional, less, or alternate actions, including those discussed elsewhere herein. For the broadcast may also include vehicle telematics data that includes data selected from one or more of, and not limited to all of: a timestamp; one or more sensor metrics indicative of braking motion of the vehicle; one or more sensor metrics indicative of acceleration motion of the vehicle; one or more sensor metrics indicative of cornering motion of the vehicle; and one or more sensor metrics indicative of a direction of the vehicle. The telematics data may include speed, acceleration, deceleration, GPS location, lane information, and/or other data of, or associated with, the vehicle. Additionally or alternatively, the telematics data may include one or more of, and not limited to all of: time, braking, acceleration, left turn, right turn, heading, GPS (Global Positioning System) speed, GPS latitude and longitude, gyroscope, battery level, and/or telephone usage information or data of, or associated with, the vehicle.

The method may include adjusting or generating an insurance discount for vehicles having the risk mitigation or prevention functionality associated with analyzing images for hazardous conditions, and/or generating a wireless communication broadcast including vehicle telematics data.

Exemplary System of Broadcasting Information Related to Hazards Impacting Vehicle Travel As depicted by, and discussed in relation to, FIGS. 1, 2, and 6, for example, in one aspect, a system of broadcasting information related to hazards impacting vehicle travel may be provided. The system may include a mobile computing device configured to: (1) mount within a vehicle dashboard cradle so that the mobile computing device is positioned to take images forward of a vehicle; (2) collect telematics data of the vehicle when the vehicle is moving, the telematics data including at least one of GPS location, speed, heading, lane, braking, cornering, acceleration, or route data of the vehicle (and/or other types of telematics data discussed herein); (3) generate at least one of (1) an alert based upon the telematics data and the images, or (2) broadcasting data including the images and the telematics data; and/or (4) broadcast the at least one of the alert or the broadcasting data to at least one of (i) at least one nearby vehicle or (ii) at least one smart infrastructure component via wireless communication or data transmission to facilitate warning at least one of drivers or smart vehicles of at least one of hazardous conditions or vehicle accidents upon the at least one of the at least one nearby vehicle or the at least one smart infrastructure component receiving and processing the at least one of the alert or the broadcasting data.

The system may include the at least one nearby vehicle. The at least one nearby vehicle may be configured to generate at least one local alert at the at least one nearby vehicle to warn at least one of drivers or smart vehicles of at least one of hazardous conditions or vehicle accidents upon receiving and processing the at least one of the alert or the broadcasting data from the vehicle. The system may also include the at least one smart infrastructure component. The at least one smart infrastructure component may be configured to generate at least one local alert at the at least one smart infrastructure component to warn at least one of drivers or smart vehicles of at least one of hazardous conditions or vehicle accidents upon receiving and processing the at least one of the alert or the broadcasting data that includes the telematics data from the vehicle.

The mobile computing device may be configured to: analyze the telematics data and the images to detect a hazard on a road on which the vehicle is being driven, and/or generate the alert based upon the hazard detected. The mobile computing device may also be configured to: broadcast the alert via wireless communication or data transmission to the at least one of the at least one nearby vehicle or the at least one smart infrastructure component only after the hazard is detected from at least one of computer analysis or object recognition techniques being performed on the telematics data and the images. The hazard may be detected by identifying at least one of an animal, a pedestrian, or a vehicle accident using an object recognition technique on the images taken forward of the vehicle.

The system may include an external computing device configured to at least one of adjust or generate an insurance discount for vehicles having risk mitigation or prevention functionality associated with analyzing mobile computing device image data and vehicle telematics data to generate alerts to facilitate warning at least one of drivers or smart vehicles of at least one of hazardous conditions or vehicle accidents, and/or a usage-based discount. The system may include additional, less, or alternate functionality, including that discussed elsewhere herein.

Exemplary Mobile Computing Device for Facilitating Safer Vehicle Travel

As depicted by, and discussed in relation to, FIGS. 1, 2, and 6, for example, in another aspect, a mobile computing device for facilitating safer vehicle travel may be provided. The mobile computing device may include (a) a controller configured to (1) determine whether the mobile computing device is mounted in a vehicle; (2) collect, when it is determined that the mobile computing device is mounted in the vehicle, telematics data associated with the vehicle (which may include the types of telematics data discussed elsewhere herein, and which may be collected via a Telematics App as discussed herein), and digital data including at least one of digital image, digital audio, or digital video data associated with at least one of an interior or exterior of the vehicle; (3) analyze the telematics data and digital data collected to determine whether a hazard is associated with a road on which the vehicle is being driven; and/or (4) generate an alert when the hazard is detected from the analysis of the telematics data and the digital data; and/or (b) a display configured to issue the alert to notify a driver of the vehicle of the hazard when the hazard is detected to facilitate safer vehicle travel and vehicle collision avoidance.

The mobile device may also include a communication unit or transceiver configured to broadcast the telematics data and the digital data when the hazard is detected. The telematics data and the digital data included in the broadcast may include an indication of (i) a GPS location of the hazard or a vicinity of the hazard and (ii) a type of the hazard. The telematics data and the digital data may be received by a second mobile computing device located in a second vehicle and may cause the second mobile computing device to issue an alert notifying a driver of the second vehicle of the hazard.

The mobile device may include a communication unit or transceiver configured to broadcast the telematics data and the digital data when the hazard is detected. The telematics data and the digital data included in the broadcast further may include an indication of (i) a GPS location of the hazard or a vicinity of the hazard and (ii) a type of the hazard, and may be received by at least one smart infrastructure component that relays at least one of (i) the alert or (ii) the telematics data and the digital data onto at least one other vehicle in the vicinity of the hazard.

The telematics data and the digital data may include the types of data discussed elsewhere herein, and may be collected and broadcast by a Telematics App. The controller may be configured to analyze the telematics data and the digital data collected to determine whether the hazard is associated with the road on which the vehicle is being driven by performing object recognition techniques on digital images captured by the mobile computing device in a vicinity of the vehicle to detect at least one object, including at least one of a pedestrian, an animal, or another vehicle. The mobile computing device may be configured to monitor an amount of time or mileage that the vehicle was driven with risk mitigation or prevention functionality associated with analyzing the telematics data and the digital data associated with the vehicle to generate driving alerts for at least one of the driver or nearby vehicles. The mobile computing device may be configured to broadcast the amount of time or an amount of mile-based usage of the risk mitigation or prevention functionality to an insurance provider remote server to facilitate the insurance provider remote server at least one of adjusting or generating an insurance discount based upon usage of the risk mitigation or prevention functionality by the driver.

The mobile computing device may be configured to at least one of generate or display an auto insurance discount for the driver or the vehicle based upon at least one of (i) at least one of the vehicle or the mobile computing device being configured with the risk mitigation or prevention functionality associated with the analysis of the telematics data and the digital data, or (ii) an amount of usage of the risk mitigation or prevention functionality by at least one of the driver or the mobile computing device. The mobile device may include additional, less, or alternate functionality, including that discussed elsewhere herein.

Exemplary Method of Broadcasting Information Related to Hazards Impacting Vehicle Travel As depicted by, and discussed in relation to, FIGS. 1, 2, and 6, for example, in another aspect, a computer-implemented method of broadcasting information related to hazards impacting vehicle travel may be provided. The method may include (1) collecting images forward of a vehicle, via at least one of a mobile device camera or one or more mobile device processors of a mobile device that is mounted within a vehicle dashboard cradle and positioned to take the images forward of the vehicle; (2) collecting, via at least one of the one or more mobile device processors or a telematics app, telematics data, including at least one of GPS location, speed, heading, lane, braking, cornering, acceleration, or route data of the vehicle while the vehicle is moving (the telematics data may include other types of data, including the types of telematics discussed elsewhere herein); (3) generating, via the one or more mobile device processors, at least one of (i) an alert based upon the images forward of the vehicle and the telematics data or (ii) a broadcast including the images forward of the vehicle and the telematics data; and/or (4) broadcasting, via at least one of the one or more mobile device processors, a communication unit, or a transceiver, the at least one of the alert or the broadcast via wireless communication or data transmission to at least one of (i) at least one nearby vehicle or (ii) at least one smart infrastructure component to facilitate alerting at least one of other vehicles or drivers of at least one of hazardous conditions or vehicle accidents.

The method may include broadcasting, via the communication unit or the transceiver, the telematics data and the images forward of the vehicle when a hazard is detected, the telematics data and the images forward of the vehicle included in the broadcast further including an indication of (i) a GPS location of the hazard or a vicinity of the hazard and (ii) a type of the hazard. The broadcast (i) may be received by a second mobile device located in a second vehicle and (ii) may cause the second mobile device to issue an alert notifying a driver of the second vehicle of the hazard.

The method may include at least one of displaying, adjusting, or generating an auto insurance discount for the driver or the vehicle based upon at least one of (i) at least one of the vehicle or the mobile device being configured with risk mitigation or prevention functionality associated with the collection of the telematics data and the images forward of the vehicle and analysis of the telematics data and the images forward of the vehicle, or (ii) an amount of usage of the risk mitigation or prevention functionality by at least one of the driver or the mobile device. The method may include monitoring or determining an amount of time or mileage that the vehicle was driven with risk mitigation or prevention functionality associated with analyzing the telematics data and the images forward of the vehicle to generate driving alerts for at least one of the driver or nearby vehicles.

The method may include identifying a hazard including or associated with at least one of an animal or a pedestrian, the at least one of the animal or the pedestrian at least one of forward of or in a vicinity of the vehicle, by using an object recognition technique on at least one of the images forward of the vehicle or images in the vicinity of the vehicle. The method may include identifying a hazard including or associated with at least one of a vehicle accident or congestion, the at least one of the vehicle accident or the congestion at least one of forward of or in a vicinity of the vehicle, by using an object recognition technique on at least one of the images forward of the vehicle or images in the vicinity of the vehicle.

The method may include analyzing (i) the telematics data and (ii) at least one of the images forward of the vehicle or images in a vicinity of the vehicle collected to determine whether a hazard is associated with a road on which the vehicle is being driven. This analyzing of (i) the telematics data and (ii) the at least one of the images forward of the vehicle or the images in the vicinity of the vehicle collected may include the one or more mobile device processors performing object recognition techniques on images captured by the mobile device in the vicinity of the vehicle to detect at least one object, including at least one of a pedestrian, an animal, or another vehicle. The method may include additional, less, or alternate functionality, including that discussed elsewhere herein, and/or may be implemented via one or more local or remote processors, transceivers, memory units, and other electronic componentry.

Additional Considerations

With the foregoing, an insurance customer may opt-in to a rewards, insurance discount, or other type of program. After the insurance customer provides their affirmative consent, an insurance provider telematics application and/or remote server may collect telematics and/or other data (including image or audio data) associated with insured assets, including before, during, and/or after an insurance-related event or vehicle collision. In return, risk-averse drivers, and/or vehicle owners may receive discounts or insurance cost savings related to auto, home, life, and/or other types of insurance from the insurance provider.

In one aspect, telematics data, and/or other data, including the types of data discussed elsewhere herein, may be collected or received by an insured's mobile device or smart vehicle, a Telematics App (including those discussed herein), and/or an insurance provider remote server, such as via direct or indirect wireless communication or data transmission from a Telematics App running on the insured's mobile device, after the insured or customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Although the disclosure provides several examples in terms of two vehicles, two mobile computing devices, two on-board computers, etc., aspects include any suitable number of computing devices, vehicles, etc. For example, aspects include an external computing device receiving telematics data and/or geographic location data from a large number of computing devices (e.g., 100 or more mobile computing devices), and issuing alerts to those computing devices in which the alerts are relevant in accordance with the various techniques described herein.

Although the foregoing text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors, and/or processor-implemented modules, may be located in a single location (e.g., within a vehicle environment, an infrastructure component, a home environment, an office environment or as a server farm), while in other embodiments the processor(s) and/or processor-implemented modules may be distributed across a number of locations.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may implement numerous alternate embodiments, using either current technology or technology developed after the filing date of this application.

What is claimed:

1. A system of broadcasting information related to vehicle travel conditions, the system comprising:
   a mobile computing device configured to:
      mount within a vehicle dashboard cradle;
      collect telematics data of a vehicle when the mobile computing device is mounted within the vehicle dashboard cradle, the telematics data including location data, braking data, cornering data, and at least one of acceleration data or deceleration data of the vehicle;
      generate at least one of (1) an alert based upon the telematics data and images taken forward of the vehicle by the mobile computing device, or (2) broadcasting data including the images and the telematics data;
      broadcast, when one or more conditions impacting vehicle travel correspond to at least one location within a threshold distance of at least one of (1) at least one nearby vehicle, or (2) at least one smart infrastructure component, the at least one of the alert or the broadcasting data to the at least one of the at least one nearby vehicle or the at least one smart infrastructure component via wireless communication or data transmission to cause, upon the at least one of the at least one nearby vehicle or the at least one smart infrastructure component receiving and processing the at least one of the alert or the broadcasting data, each of at least one computing device associated with the at least one nearby vehicle to provide a respective graphical user interface (GUI) including a respective display of (i) a respective indication of at least one description of the one or more conditions impacting vehicle travel, the respective indication of the at least one description of the one or more conditions impacting vehicle travel including at least one of a respective text indication of the at least one description or a respective graphical indication of the at least one description, and (ii) a respective indication of the at least one location corresponding to the one or more conditions impacting vehicle travel, the respective indication of the at least one location corresponding to the one or more conditions impacting vehicle travel including at least one of a respective text indication of the at least one location, a respective graphical indication of the at least one location, or a respective map indicating the at least one location; and
   cause an insurance provider remote server to at least one of adjust or generate an insurance discount associated with the vehicle based upon an indication that the mobile computing device is configured to generate and broadcast the at least one of (1) the alert based upon the telematics data and the images, or (2) the broadcasting data including the images and the telematics data when the one or more conditions impacting vehicle travel correspond to the at least one location within the threshold distance of the at least one of the at least one nearby vehicle or the at least one smart infrastructure component.

2. The system of claim 1, wherein the telematics data further includes at least one of speed, direction, heading, route, lane, gyroscope, left turn, right turn, or telephone usage data associated with the vehicle.

3. The system of claim 1, wherein the one or more conditions impacting vehicle travel include at least one of (1) that at least one of a train or an emergency response system (EMS) vehicle is within the threshold distance of at least one of the at least one nearby vehicle, (2) that the at least one of the train or the EMS vehicle will be within the threshold distance of a current route of at least one of the at least one nearby vehicle, (3) one or more hazardous conditions on a current route of at least one of the at least one nearby vehicle, or (4) one or more accidents on a current route of at least one of the at least one nearby vehicle.

4. The system of claim 1, wherein the mobile computing device is configured to:
   analyze the telematics data and the images using at least one of computer analysis or object recognition techniques so as to determine the one or more conditions impacting vehicle travel; and
   generate the alert based upon the analysis of the telematics data and the images.

5. The system of claim 1, the system further comprising the at least one nearby vehicle, wherein the at least one nearby vehicle is configured to generate at least one local alert indicative of the one or more conditions impacting vehicle travel in response to receiving the at least one of the alert or the broadcasting data from the vehicle.

6. The system of claim 1, the system further comprising the at least one smart infrastructure component, wherein the at least one smart infrastructure component is configured to generate at least one local alert indicative of the one or more conditions impacting vehicle travel in response to receiving the at least one of the alert or the broadcasting data from the vehicle.

7. The system of claim 1, further comprising the insurance provider remote server, wherein the insurance provider remote server is configured to at least one of adjust or generate the insurance discount for the vehicle.

8. A mobile computing device for facilitating safer vehicle travel, the mobile computing device comprising:
   a controller configured to:
      determine whether the mobile computing device is mounted in a vehicle;
      collect, when it is determined that the mobile computing device is mounted in the vehicle, (1) telematics data associated with the vehicle, the telematics data including location data, braking data, cornering data, and at least one of acceleration data or deceleration data of the vehicle, and (2) digital data including at least one of digital image, digital audio, or digital video data associated with at least one of an interior or exterior of the vehicle; and analyze the telematics data and the digital data to determine whether one or more conditions impacting vehicle travel correspond to at least one location within a threshold distance of at least one of (1) a second vehicle, or (2) a smart infrastructure component; and at least one of a communication unit or a transceiver configured to:

broadcast an indication of the one or more conditions impacting vehicle travel to at least one of a second mobile computing device located within the second vehicle or the smart infrastructure component when the one or more conditions impacting vehicle travel correspond to the at least one location within the threshold distance of the at least one of the second vehicle or the smart infrastructure component, so as to cause the second mobile computing device to provide a graphical user interface (GUI) including a display of (1) an indication of at least one description of the one or more conditions impacting vehicle travel, the indication of the at least one description of the one or more conditions impacting vehicle travel including at least one of a text indication of the at least one description or a graphical indication of the at least one description, and (2) an indication of the at least one location corresponding to the one or more conditions impacting vehicle travel, the indication of the at least one location corresponding to the one or more conditions impacting vehicle travel including at least one of a text indication of the at least one location, a graphical indication of the at least one location, or a map indicating the at least one location; and cause an insurance provider remote server to at least one of adjust or generate an insurance discount associated with the vehicle based upon an indication that the mobile computing device is configured to broadcast the indication of the one or more conditions impacting vehicle travel when the one or more conditions impacting vehicle travel correspond to the at least one location within the threshold distance of the at least one of the second vehicle or the smart infrastructure component.

9. The mobile computing device of claim 8, wherein the at least one of the communication unit or the transceiver is configured to broadcast the indication of the one or more conditions impacting vehicle travel to the at least one of the second mobile computing device or the smart infrastructure component so as to cause at least one of (1) the second mobile computing device to issue an alert notifying a driver of the second vehicle of at least one of the one or more conditions impacting vehicle travel, or (2) the smart infrastructure component to transmit at least one of (a) an alert or (b) the indication of the one or more conditions impacting vehicle travel to at least one of the second vehicle or at least one other vehicle within the threshold distance of at least one of the at least one location corresponding to the one or more conditions impacting vehicle travel.

10. The mobile computing device of claim 8, wherein the one or more conditions impacting vehicle travel include at least one of (1) that at least one of a train or an emergency response system (EMS) vehicle is within the threshold distance of the second vehicle, (2) that the at least one of the train or the EMS vehicle will be within the threshold distance of a current route of the second vehicle, (3) one or more hazardous conditions on a current route of the second vehicle, or (4) one or more accidents on a current route of the second vehicle.

11. The mobile computing device of claim 10, wherein the one or more hazardous conditions on the current route of the second vehicle include one or more of a pedestrian, an animal, or another vehicle.

12. The mobile computing device of claim 8, wherein the indication of the one or more conditions impacting vehicle travel includes at least one of (1) an indication of a GPS (Global Positioning System) location of at least one of the one or more conditions impacting vehicle travel, or (2) a description of at least one of the one or more conditions impacting vehicle travel.

13. The mobile computing device of claim 8, wherein the controller is configured to analyze the telematics data and the digital data to determine whether the one or more conditions impacting vehicle travel correspond to the at least one location within the threshold distance of the at least one of the second vehicle or the smart infrastructure component using at least one of computer analysis or object recognition techniques.

14. The mobile computing device of claim 8, wherein the mobile computing device is configured to monitor an amount of time or mileage that the vehicle is driven with risk mitigation or prevention functionality associated with (1) analyzing the telematics data and the digital data, and (2) broadcasting the indication of the one or more conditions impacting vehicle travel, and wherein the at least one of the communication unit or the transceiver is configured to cause the insurance provider remote server to at least one of adjust or generate the insurance discount as a time or mileage usage-based insurance discount.

15. A computer-implemented method of broadcasting information related to vehicle travel conditions, the method comprising:

collecting images forward of a vehicle, via at least one of a camera or one or more processors of a mobile device that is mounted within a vehicle dashboard cradle;

collecting, via the one or more processors, telematics data, including location data, braking data, cornering data, and at least one of acceleration data or deceleration data of the vehicle;

generating, via the one or more processors, at least one of (1) an alert based upon the images forward of the vehicle and the telematics data, or (2) a broadcast including the images forward of the vehicle and the telematics data;

broadcasting, via at least one of the one or more processors, a communication unit, or a transceiver, when one or more conditions impacting vehicle travel correspond to at least one location within a threshold distance of at least one of (1) at least one nearby vehicle, or (2) at least one smart infrastructure component, the at least one of the alert or the broadcast via wireless communication or data transmission to the at least one of the at least one nearby vehicle or the at least one smart infrastructure component to cause each of at least one additional mobile device associated with the at least one nearby vehicle to provide a respective graphical user interface (GUI) including a respective display of (i) a respective indication of at least one description of the one or more conditions impacting vehicle travel, the respective indication of the at least one description of the one or more conditions impacting vehicle travel including at least one of a respective text indication of the at least one description or a respective graphical indication of the at least one description, and (ii) a respective indication of the at least one location corresponding to the one or more conditions impacting vehicle travel, the respective indication of the at least one location corresponding to the one or more conditions impacting vehicle travel including at least one of a respective text indication of the at least one location, a respective graphical indication of the at least one location, or a respective map indicating the at least one location; and causing an insurance provider remote server to at least one of adjust or generate an insurance discount associated with the vehicle based upon an indication that the mobile device is configured to generate and broadcast the at least one of (1) the alert or (2) the broadcast including the images forward of the vehicle and the telematics data when the one or more conditions impacting vehicle travel correspond to the at least one location within the threshold distance of the at least one of the at least one nearby vehicle or the at least one smart infrastructure component.

16. The computer-implemented method of claim 15, wherein the one or more conditions impacting vehicle travel include at least one of (1) that at least one of a train or an emergency response system (EMS) vehicle is within the threshold distance of at least one of the at least one nearby vehicle, (2) that the at least one of the train or the EMS vehicle will be within the threshold distance of a current route of at least one of the at least one nearby vehicle, (3) one or more hazardous conditions on a current route of at least one of the at least one nearby vehicle, or (4) one or more accidents on a current route of at least one of the at least one nearby vehicle.

17. The computer-implemented method of claim 15, the method comprising broadcasting the at least one of the alert or the broadcast including the images forward of the vehicle and the telematics data to one of the at least one additional mobile device located within one of the at least one nearby vehicle so as to cause the one of the at least one additional mobile device to issue a local alert notifying a driver of the one of the at least one nearby vehicle of at least one of the one or more conditions impacting vehicle travel.

18. The computer-implemented method of claim 15, the method comprising analyzing the telematics data and the images forward of the vehicle using at least one of computer analysis or object recognition techniques to determine the one or more conditions impacting vehicle travel, wherein generating the alert is performed based upon the analysis of the telematics data and the images forward of the vehicle.

19. The computer-implemented method of claim 18, wherein analyzing the telematics data and the images forward of the vehicle using the at least one of the computer analysis or the object recognition techniques includes using the at least one of the computer analysis or the object recognition techniques to detect one or more of a pedestrian, an animal, vehicle congestion, or an accident on a current route of one of the at least one nearby vehicle.

20. The computer-implemented method of claim 15, the method comprising:
  monitoring an amount of time or mileage that the vehicle is driven with risk mitigation or prevention functionality associated with (1) analyzing the telematics data and the images forward of the vehicle, and (2) broadcasting the at least one of the alert or the broadcast including the images forward of the vehicle and the telematics data when the one or more conditions impacting vehicle travel correspond to the at least one location within the threshold distance of the at least one of the at least one nearby vehicle or the at least one smart infrastructure component; and
  causing the insurance provider remote server to at least one of adjust or generate the insurance discount as a time or mileage usage-based insurance discount based upon the amount of time or mileage that the vehicle is driven with the risk mitigation or prevention functionality.

\* \* \* \* \*